US011100434B2

(12) United States Patent
Lord et al.

(10) Patent No.: US 11,100,434 B2
(45) Date of Patent: *Aug. 24, 2021

(54) REAL-TIME CARPOOLING COORDINATING SYSTEM AND METHODS

(71) Applicant: Uber Technologies, Inc., San Francisco, CA (US)

(72) Inventors: Richard T. Lord, Gig Harbor, WA (US); Robert W. Lord, Seattle, WA (US); Nathan P. Myhrvold, Medina, WA (US); Clarence T. Tegreene, Mercer Island, WA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/414,711

(22) Filed: May 16, 2019

(65) Prior Publication Data

US 2019/0272486 A1    Sep. 5, 2019

Related U.S. Application Data

(63) Continuation of application No. 15/889,117, filed on Feb. 5, 2018, now Pat. No. 10,339,474, which is a
(Continued)

(51) Int. Cl.
*G06Q 50/30* (2012.01)
*G06Q 10/04* (2012.01)
*G06Q 10/06* (2012.01)

(52) U.S. Cl.
CPC ..... *G06Q 10/047* (2013.01); *G06Q 10/06311* (2013.01); *G06Q 50/30* (2013.01)

(58) Field of Classification Search
CPC .. G06Q 50/30; G06Q 10/06311; G06Q 10/06; G06Q 10/063114; G06Q 10/047;
(Continued)

(56) References Cited

U.S. PATENT DOCUMENTS 4,007,469 A    2/1977  Land et al.
4,922,443 A    5/1990  Coetsier et al.
(Continued)

FOREIGN PATENT DOCUMENTS

EP    2 708 850 A1    3/2014
GB    2 501 075 A    10/2013
(Continued)

OTHER PUBLICATIONS

Fay et al., Decentralized routing control for guided transportation systems, 2008, IEEE, p. (Year: 2008).*
(Continued)

*Primary Examiner* — McDieunel Marc
(74) *Attorney, Agent, or Firm* — Mahamedi IP Law LLP

(57) ABSTRACT

Computationally implemented methods, devices and systems that are designed for transmitting a request for one or more identities of a transportation vehicle unit for transporting a first end user; receiving the one or more identities of the transportation vehicle unit for transporting the first end user, the transportation vehicle unit currently en route to or is currently transporting a second end user and having been identified based, at least in part, on a determination that the transportation vehicle unit is able to accommodate transport of the first end user while transporting the second end user; and directing the identified transportation vehicle unit to rendezvous with the first end user in order to transport the first end user.

19 Claims, 26 Drawing Sheets

Related U.S. Application Data continuation of application No. 14/597,631, filed on Jan. 15, 2015, now Pat. No. 9,886,671, which is a continuation of application No. 14/596,904, filed on Jan. 14, 2015, now Pat. No. 9,483,744, which is a continuation-in-part of application No. 14/318,182, filed on Jun. 27, 2014, now abandoned, and a continuation-in-part of application No. 14/329,451, filed on Jul. 11, 2014, now abandoned, which is a continuation of application No. 14/328,002, filed on Jul. 10, 2014, now Pat. No. 10,458,801, said application No. 14/596,904 is a continuation-in-part of application No. 14/456,627, filed on Aug. 11, 2014, now Pat. No. 9,534,912, which is a continuation of application No. 14/455,534, filed on Aug. 8, 2014, now Pat. No. 9,581,455, said application No. 14/596,904 is a continuation-in-part of application No. 14/476,042, filed on Sep. 3, 2014, now Pat. No. 9,488,484, which is a continuation of application No. 14/474,587, filed on Sep. 2, 2014, now Pat. No. 9,599,481, said application No. 14/596,904 is a continuation-in-part of application No. 14/511,706, filed on Oct. 10, 2014, now Pat. No. 9,767,423, which is a continuation of application No. 14/510,383, filed on Oct. 9, 2014, now Pat. No. 9,569,740, said application No. 14/596,904 is a continuation-in-part of application No. 14/537,313, filed on Nov. 10, 2014, now Pat. No. 9,558,469, which is a continuation of application No. 14/536,967, filed on Nov. 10, 2014, now Pat. No. 9,792,574, said application No. 14/596,904 is a continuation-in-part of application No. 14/564,358, filed on Dec. 9, 2014, now Pat. No. 9,689,694, which is a continuation of application No. 14/563,134, filed on Dec. 8, 2014, now Pat. No. 9,671,239.

(60) Provisional application No. 61/989,394, filed on May 6, 2014.

(58) Field of Classification Search
CPC ............ G01C 21/343; G01C 21/3438; B60W 60/005; G08G 1/005; G08G 1/096758; G08G 1/096791; G08G 1/20; G08G 1/202; G08G 1/205; G08G 1/22; G06F 17/30; G06F 15/18; G06F 17/50; G06F 3/048; H04W 24/00; H04W 4/02; H04W 4/04; G07B 15/02
See application file for complete search history.

(56) References Cited

U.S. PATENT DOCUMENTS

| | | |
|---|---|---|
| 5,023,934 A | 6/1991 | Wheeless |
| 5,146,557 A | 9/1992 | Yamrom et al. |
| 5,222,127 A | 6/1993 | Fukui |
| 5,247,575 A | 9/1993 | Sprague et al. |
| 5,282,061 A | 1/1994 | Farrell |
| 5,287,102 A | 2/1994 | McKiel, Jr. |
| 5,287,448 A | 2/1994 | Nicol et al. |
| 5,303,393 A | 4/1994 | Noreen et al. |
| 5,311,434 A | 5/1994 | Tamai |
| 5,388,251 A | 2/1995 | Makino et al. |
| 5,404,295 A | 4/1995 | Katz et al. |
| 5,410,326 A | 4/1995 | Goldstein |
| 5,442,759 A | 8/1995 | Chiang et al. |
| 5,452,222 A | 9/1995 | Gray et al. |
| 5,475,835 A | 12/1995 | Hickey |
| 5,524,140 A | 6/1996 | Klausner et al. |
| 5,561,705 A | 10/1996 | Allard et al. |
| 5,568,536 A | 10/1996 | Tiller et al. |
| 5,572,576 A | 11/1996 | Klausner et al. |
| 5,612,669 A | 3/1997 | Allen et al. |
| 5,648,897 A | 7/1997 | Johnson et al. |
| 5,654,688 A | 8/1997 | Allen et al. |
| 5,663,704 A | 9/1997 | Allen et al. |
| 5,729,191 A | 3/1998 | Allen et al. |
| 5,802,467 A | 9/1998 | Salazar et al. |
| 5,802,492 A | 9/1998 | DeLorme et al. |
| 5,805,672 A | 9/1998 | Barkat et al. |
| 5,812,977 A | 9/1998 | Douglas |
| 5,818,329 A | 10/1998 | Allen |
| 5,825,355 A | 10/1998 | Palmer et al. |
| 5,877,757 A | 3/1999 | Baldwin et al. |
| 5,887,171 A | 3/1999 | Tada et al. |
| 5,890,905 A | 4/1999 | Bergman |
| 5,898,400 A | 4/1999 | Jones et al. |
| 5,910,800 A | 6/1999 | Shields et al. |
| 5,920,697 A | 7/1999 | Masters et al. |
| 5,923,325 A | 7/1999 | Barber et al. |
| 5,933,139 A | 8/1999 | Feigner et al. |
| 5,936,611 A | 8/1999 | Yoshida |
| 5,938,721 A | 8/1999 | Dussell et al. |
| 5,940,007 A | 8/1999 | Brinkmeyer et al. |
| 5,965,858 A | 10/1999 | Suzuki et al. |
| 5,982,277 A | 11/1999 | Flick |
| 5,985,858 A | 11/1999 | Miyata et al. |
| 5,991,739 A | 11/1999 | Cupps et al. |
| 6,005,299 A | 12/1999 | Hengst |
| 6,005,613 A | 12/1999 | Endsley et al. |
| 6,021,403 A | 2/2000 | Horvitz et al. |
| 6,068,485 A | 5/2000 | Linebarger et al. |
| 6,083,104 A | 7/2000 | Choi |
| 6,107,938 A | 8/2000 | Du et al. |
| 6,112,181 A | 8/2000 | Shear et al. |
| 6,130,606 A | 10/2000 | Flick |
| 6,160,926 A | 12/2000 | Dow et al. |
| 6,167,255 A | 12/2000 | Kennedy, III et al. |
| 6,169,902 B1 | 1/2001 | Kawamoto |
| 6,182,006 B1 | 1/2001 | Meek |
| 6,184,780 B1 | 2/2001 | Allen et al. |
| 6,230,170 B1 | 5/2001 | Zellweger et al. |
| 6,253,058 B1 | 6/2001 | Murasaki et al. |
| 6,256,378 B1 | 7/2001 | Iggulden et al. |
| 6,259,362 B1 | 7/2001 | Lin |
| 6,259,409 B1 | 7/2001 | Fulton et al. |
| 6,271,835 B1 | 8/2001 | Hoeksma |
| 6,308,120 B1 | 10/2001 | Good |
| 6,321,158 B1 | 11/2001 | DeLorme et al. |
| 6,344,793 B1 | 2/2002 | Geck et al. |
| 6,366,198 B1 | 4/2002 | Allen et al. |
| 6,377,825 B1 | 4/2002 | Kennedy et al. |
| 6,385,541 B1 | 5/2002 | Blumberg et al. |
| 6,462,660 B1 | 10/2002 | Cannon et al. |
| 6,463,343 B1 | 10/2002 | Emens et al. |
| 6,466,899 B1 | 10/2002 | Yano et al. |
| 6,480,098 B2 | 11/2002 | Flick |
| 6,490,493 B1 | 12/2002 | Dharnipragada |
| 6,526,335 B1 | 2/2003 | Treyz et al. |
| 6,542,163 B2 | 4/2003 | Gorbet et al. |
| 6,542,814 B2 | 4/2003 | Polidi et al. |
| 6,556,899 B1 | 4/2003 | Harvey et al. |
| 6,584,496 B1 | 6/2003 | Ludtke |
| 6,608,650 B1 | 8/2003 | Torres et al. |
| 6,611,739 B1 | 8/2003 | Harvey et al. |
| 6,628,233 B2 | 9/2003 | Knockeart et al. |
| 6,639,550 B2 | 10/2003 | Knockeart et al. |
| 6,647,328 B2 | 11/2003 | Walker |
| 6,650,902 B1 | 11/2003 | Richton |
| 6,651,053 B1 | 11/2003 | Rothschild |
| 6,664,924 B2 | 12/2003 | Knockeart et al. |
| 6,680,694 B1 | 1/2004 | Knockeart et al. |
| 6,681,174 B1 | 1/2004 | Harvey et al. |
| 6,707,421 B1 | 3/2004 | Drury et al. |
| 6,711,474 B1 | 3/2004 | Treyz et al. |
| 6,727,830 B2 | 4/2004 | Lui et al. |
| 6,784,832 B2 | 8/2004 | Knockeart et al. |
| 6,788,313 B1 | 9/2004 | Heil |
| 6,795,011 B1 | 9/2004 | Berthoud et al. |
| 6,799,205 B2 | 9/2004 | Ludtke |

(56) References Cited

U.S. PATENT DOCUMENTS

| | | |
|---|---|---|
| 6,812,888 B2 | 11/2004 | Drury et al. |
| 6,816,881 B1 | 11/2004 | Mohindra et al. |
| 6,819,986 B2 | 11/2004 | Hong et al. |
| 6,823,188 B1 | 11/2004 | Stern |
| 6,829,668 B2 | 12/2004 | Keskar et al. |
| 6,832,092 B1 | 12/2004 | Suarez |
| 6,845,486 B2 | 1/2005 | Yamada et al. |
| 6,873,840 B1 | 3/2005 | Von Alten |
| 6,874,037 B1 | 3/2005 | Abram et al. |
| 6,879,828 B2 | 4/2005 | Virtanen et al. |
| 6,882,712 B1 | 4/2005 | Iggulden et al. |
| 6,892,936 B2 | 5/2005 | Riggert et al. |
| 6,904,565 B1 | 6/2005 | Lentz |
| 6,909,398 B2 | 6/2005 | Knockeart et al. |
| 6,919,792 B1 | 7/2005 | Battini et al. |
| 6,920,612 B2 | 7/2005 | Makinen |
| 6,967,576 B2 | 11/2005 | Hayes et al. |
| 6,968,272 B2 | 11/2005 | Knockeart et al. |
| 6,970,783 B2 | 11/2005 | Knockeart et al. |
| 6,980,092 B2 | 12/2005 | Turnbull et al. |
| 7,023,379 B2 | 4/2006 | Turnbull |
| 7,036,076 B2 | 4/2006 | Anwar |
| 7,043,691 B1 | 5/2006 | Kwon et al. |
| 7,055,737 B1 | 6/2006 | Tobin et al. |
| 7,065,348 B1 | 6/2006 | Aoki |
| 7,068,163 B2 | 6/2006 | Sari et al. |
| 7,082,365 B2 | 7/2006 | Sheha et al. |
| 7,103,556 B2 | 9/2006 | Del Rey et al. |
| 7,107,081 B1 | 9/2006 | Fujisaki |
| 7,129,927 B2 | 10/2006 | Mattsson |
| 7,135,962 B2 | 11/2006 | Durbin et al. |
| 7,142,096 B2 | 11/2006 | Eisenman |
| 7,155,674 B2 | 12/2006 | Breen et al. |
| 7,158,006 B2 | 1/2007 | Lee et al. |
| 7,200,801 B2 | 4/2007 | Agassi et al. |
| 7,202,783 B2 | 4/2007 | Want et al. |
| 7,212,827 B1 | 5/2007 | Veschl |
| 7,224,262 B2 | 5/2007 | Simon et al. |
| 7,231,496 B2 | 6/2007 | Curtis |
| 7,240,067 B2 | 7/2007 | Timmons |
| 7,245,258 B2 | 7/2007 | Velhal et al. |
| 7,254,779 B1 | 8/2007 | Rezvani et al. |
| 7,259,357 B2 | 8/2007 | Walker |
| 7,277,884 B2 | 10/2007 | Vadai et al. |
| 7,286,857 B1 | 10/2007 | Walker et al. |
| 7,293,034 B2 | 11/2007 | Paya et al. |
| 7,312,712 B1 | 12/2007 | Worrall |
| 7,327,226 B2 | 2/2008 | Turnbull et al. |
| 7,332,998 B2 | 2/2008 | Beehler et al. |
| 7,346,015 B2 | 3/2008 | Shipman |
| 7,446,655 B2 | 11/2008 | Jha et al. |
| 7,457,628 B2 | 11/2008 | Blumberg et al. |
| 7,490,763 B2 | 2/2009 | Keohane et al. |
| 7,548,697 B2 | 6/2009 | Hudson et al. |
| 7,643,913 B2 | 1/2010 | Taki et al. |
| 7,664,736 B2 | 2/2010 | Jung et al. |
| 7,684,321 B2 | 3/2010 | Muirhead et al. |
| 7,694,881 B2 | 4/2010 | Jung et al. |
| 7,725,077 B2 | 5/2010 | Jung et al. |
| 7,798,401 B2 | 9/2010 | Jung et al. |
| 7,840,427 B2 | 11/2010 | O'Sullivan |
| 7,876,706 B2 | 1/2011 | Ekl et al. |
| 7,899,468 B2 | 3/2011 | Lohtia et al. |
| 7,922,086 B2 | 4/2011 | Jung et al. |
| 7,957,871 B1 | 6/2011 | Echeruo |
| 8,009,121 B1 | 8/2011 | Stuart et al. |
| 8,046,004 B2 | 10/2011 | Tsuchiya |
| 8,126,400 B2 | 2/2012 | Jung et al. |
| 8,180,293 B2 | 5/2012 | Jung et al. |
| 8,271,876 B2 | 9/2012 | Brugler et al. |
| 8,282,003 B2 | 10/2012 | Jung et al. |
| 8,284,034 B2 | 10/2012 | Stewart et al. |
| 8,358,976 B2 | 1/2013 | Jung et al. |
| 8,406,791 B1 | 3/2013 | Daily et al. |
| 8,504,090 B2 | 8/2013 | Klein et al. |
| 8,538,331 B2 | 9/2013 | Jung et al. |
| 8,626,366 B2 | 1/2014 | Noffsinger et al. |
| 8,660,498 B2 | 2/2014 | Gurney et al. |
| 8,688,532 B2 | 4/2014 | Khunger et al. |
| 8,712,857 B1 | 4/2014 | Adornato et al. |
| 8,762,839 B2 | 6/2014 | Jung et al. |
| 8,775,070 B1 | 7/2014 | Bhatia |
| 8,831,677 B2 | 9/2014 | Villa-Real |
| 9,038,899 B2 | 5/2015 | Jung et al. |
| 9,307,577 B2 | 4/2016 | Jung et al. |
| 9,483,744 B2 | 11/2016 | Lord et al. |
| 9,488,484 B2 | 11/2016 | Lord et al. |
| 9,552,559 B2 | 1/2017 | Lord et al. |
| 9,569,740 B2 | 2/2017 | Lord et al. |
| 9,599,481 B2 | 2/2017 | Lord et al. |
| 9,621,701 B2 | 4/2017 | Jung et al. |
| 9,671,239 B2 | 6/2017 | Lord et al. |
| 9,689,694 B2 | 6/2017 | Lord et al. |
| 9,715,667 B2 | 7/2017 | Lord et al. |
| 9,767,423 B2 | 9/2017 | Lord et al. |
| 9,886,671 B2 * | 2/2018 | Lord ................ G06Q 10/06311 |
| 9,939,279 B2 | 4/2018 | Pan et al. |
| 9,946,978 B2 | 4/2018 | Francis |
| 9,959,512 B2 | 5/2018 | Camp et al. |
| 10,002,333 B2 * | 6/2018 | Lord .................... G06Q 50/30 |
| 2001/0025558 A1 | 10/2001 | Ishida |
| 2001/0049277 A1 | 12/2001 | Meyer et al. |
| 2001/0050611 A1 | 12/2001 | Achterholt |
| 2001/0052858 A1 | 12/2001 | Vincent et al. |
| 2001/0055976 A1 | 12/2001 | Crouch et al. |
| 2002/0002552 A1 | 1/2002 | Schultz et al. |
| 2002/0004703 A1 | 1/2002 | Gaspard, II |
| 2002/0007225 A1 | 1/2002 | Costello et al. |
| 2002/0019881 A1 | 2/2002 | Bokhari et al. |
| 2002/0021288 A1 | 2/2002 | Schug |
| 2002/0022961 A1 | 2/2002 | Sepanaho |
| 2002/0023144 A1 | 2/2002 | Linyard et al. |
| 2002/0032497 A1 | 3/2002 | Jorgenson et al. |
| 2002/0032510 A1 | 3/2002 | Turnbull et al. |
| 2002/0038384 A1 | 3/2002 | Kahn et al. |
| 2002/0062280 A1 | 5/2002 | Zachariassen et al. |
| 2002/0069030 A1 | 6/2002 | Xydis |
| 2002/0072347 A1 | 6/2002 | Dunko et al. |
| 2002/0075243 A1 | 6/2002 | Newton |
| 2002/0083025 A1 | 6/2002 | Robarts et al. |
| 2002/0084893 A1 | 7/2002 | Eisenman |
| 2002/0087279 A1 | 7/2002 | Hall |
| 2002/0105550 A1 | 8/2002 | Biebesheimer et al. |
| 2002/0105582 A1 | 8/2002 | Ikeda |
| 2002/0107610 A1 | 8/2002 | Kaehler et al. |
| 2002/0120459 A1 | 8/2002 | Dick et al. |
| 2002/0123880 A1 | 9/2002 | Brown |
| 2002/0130765 A1 | 9/2002 | Flick |
| 2002/0133545 A1 | 9/2002 | Fano et al. |
| 2002/0137505 A1 | 9/2002 | Eiche et al. |
| 2002/0152173 A1 | 10/2002 | Rudd |
| 2002/0164997 A1 | 11/2002 | Parry et al. |
| 2002/0186144 A1 | 12/2002 | Meunier |
| 2003/0016238 A1 | 1/2003 | Sullivan et al. |
| 2003/0018428 A1 | 1/2003 | Knockeart et al. |
| 2003/0018742 A1 | 1/2003 | Imago |
| 2003/0020759 A1 | 1/2003 | Cancilla et al. |
| 2003/0022701 A1 | 1/2003 | Gupta |
| 2003/0032426 A1 | 2/2003 | Gilbert et al. |
| 2003/0034998 A1 | 2/2003 | Kodosky et al. |
| 2003/0035075 A1 | 2/2003 | Butler et al. |
| 2003/0040944 A1 | 2/2003 | Hileman |
| 2003/0043178 A1 | 3/2003 | Gusler et al. |
| 2003/0048288 A1 | 3/2003 | Drif et al. |
| 2003/0055542 A1 | 3/2003 | Knockeart et al. |
| 2003/0055553 A1 | 3/2003 | Knockeart et al. |
| 2003/0055555 A1 | 3/2003 | Knockeart et al. |
| 2003/0058266 A1 | 3/2003 | Dunlap et al. |
| 2003/0058267 A1 | 3/2003 | Warren |
| 2003/0064805 A1 | 4/2003 | Wells |
| 2003/0067541 A1 | 4/2003 | Joao |
| 2003/0069673 A1 | 4/2003 | Hong et al. |
| 2003/0098876 A1 | 5/2003 | Makinen |
| 2003/0100964 A1 | 5/2003 | Kluge et al. |

(56) References Cited

U.S. PATENT DOCUMENTS

| | | |
|---|---|---|
| 2003/0101178 A1 | 5/2003 | Miyata et al. |
| 2003/0110035 A1 | 6/2003 | Thong et al. |
| 2003/0123446 A1 | 7/2003 | Murihead et al. |
| 2003/0125057 A1 | 7/2003 | Pesola |
| 2003/0125963 A1 | 7/2003 | Haken |
| 2003/0132854 A1 | 7/2003 | Swan et al. |
| 2003/0160824 A1 | 8/2003 | Szumla |
| 2003/0186734 A1 | 10/2003 | LeMay et al. |
| 2003/0191820 A1 | 10/2003 | Ludtke |
| 2003/0192947 A1 | 10/2003 | Toedtli |
| 2003/0193404 A1 | 10/2003 | Joao |
| 2003/0206102 A1 | 11/2003 | Joao |
| 2003/0218629 A1 | 11/2003 | Terashima et al. |
| 2003/0222897 A1 | 12/2003 | Moore et al. |
| 2003/0227392 A1 | 12/2003 | Ebert et al. |
| 2004/0034651 A1 | 2/2004 | Gupta et al. |
| 2004/0049324 A1 | 3/2004 | Walker |
| 2004/0049336 A1 | 3/2004 | Knockeart et al. |
| 2004/0049337 A1 | 3/2004 | Knockeart et al. |
| 2004/0056797 A1 | 3/2004 | Knockeart et al. |
| 2004/0064245 A1 | 4/2004 | Knockeart et al. |
| 2004/0064248 A1 | 4/2004 | Holze et al. |
| 2004/0066330 A1 | 4/2004 | Knockeart et al. |
| 2004/0067773 A1 | 4/2004 | Rachabathuni et al. |
| 2004/0076444 A1 | 4/2004 | Badovinac et al. |
| 2004/0078721 A1 | 4/2004 | Williams |
| 2004/0088228 A1 | 5/2004 | Mercer et al. |
| 2004/0088696 A1 | 5/2004 | Kawano et al. |
| 2004/0090451 A1 | 5/2004 | Lay et al. |
| 2004/0093102 A1 | 5/2004 | Liiri et al. |
| 2004/0095480 A1 | 5/2004 | Battles et al. |
| 2004/0103153 A1 | 5/2004 | Chang et al. |
| 2004/0104842 A1 | 6/2004 | Drury et al. |
| 2004/0107043 A1 | 6/2004 | de Silva |
| 2004/0107144 A1 | 6/2004 | Short |
| 2004/0111273 A1 | 6/2004 | Sakagami et al. |
| 2004/0117131 A1 | 6/2004 | Peters et al. |
| 2004/0117634 A1 | 6/2004 | Letterer et al. |
| 2004/0121764 A1 | 6/2004 | Rivero |
| 2004/0128613 A1 | 7/2004 | Sinisi |
| 2004/0136574 A1 | 7/2004 | Kozakaya et al. |
| 2004/0139180 A1 | 7/2004 | White et al. |
| 2004/0162896 A1 | 8/2004 | Cen et al. |
| 2004/0174434 A1 | 9/2004 | Walker et al. |
| 2004/0179545 A1 | 9/2004 | Erola et al. |
| 2004/0183676 A1 | 9/2004 | Eisenman |
| 2004/0196179 A1 | 10/2004 | Turnbull |
| 2004/0201633 A1 | 10/2004 | Barsness et al. |
| 2004/0201867 A1 | 10/2004 | Katano |
| 2004/0203381 A1 | 10/2004 | Cahn et al. |
| 2004/0204129 A1 | 10/2004 | Payne et al. |
| 2004/0205191 A1 | 10/2004 | Smith et al. |
| 2004/0242224 A1 | 12/2004 | Janik et al. |
| 2004/0260407 A1 | 12/2004 | Wimsatt |
| 2004/0260470 A1 | 12/2004 | Rast |
| 2005/0006478 A1 | 1/2005 | Patel |
| 2005/0021225 A1 | 1/2005 | Kantarjiev et al. |
| 2005/0055287 A1 | 3/2005 | Schmidtberg et al. |
| 2005/0060436 A1 | 3/2005 | Kienhoefer |
| 2005/0064814 A1 | 3/2005 | Matsuo et al. |
| 2005/0073388 A1 | 4/2005 | Lee et al. |
| 2005/0076302 A1 | 4/2005 | Okamoto |
| 2005/0080879 A1 | 4/2005 | Kim et al. |
| 2005/0080902 A1 | 4/2005 | Parupudi et al. |
| 2005/0081152 A1 | 4/2005 | Commarford et al. |
| 2005/0088280 A1 | 4/2005 | Beehler et al. |
| 2005/0108044 A1 | 5/2005 | Koster |
| 2005/0136903 A1 | 6/2005 | Kashima et al. |
| 2005/0154985 A1 | 7/2005 | Burkhart et al. |
| 2005/0160270 A1 | 7/2005 | Goldberg et al. |
| 2005/0168071 A1 | 8/2005 | Durbin et al. |
| 2005/0203752 A1 | 9/2005 | Shinada |
| 2005/0219223 A1 | 10/2005 | Kotzin et al. |
| 2005/0228869 A1 | 10/2005 | Imago |
| 2005/0262062 A1 | 11/2005 | Xia |
| 2005/0268234 A1 | 12/2005 | Rossi, Jr. et al. |
| 2006/0026304 A1 | 2/2006 | Price |
| 2006/0028428 A1 | 2/2006 | Dai et al. |
| 2006/0031517 A1 | 2/2006 | Gossweiler et al. |
| 2006/0055805 A1 | 3/2006 | Stockton et al. |
| 2006/0061458 A1 | 3/2006 | Simon et al. |
| 2006/0073815 A1 | 4/2006 | Pines et al. |
| 2006/0076398 A1 | 4/2006 | Jung et al. |
| 2006/0080188 A1 | 4/2006 | Jung et al. |
| 2006/0081695 A1 | 4/2006 | Jung et al. |
| 2006/0086781 A1 | 4/2006 | Jung et al. |
| 2006/0090132 A1 | 4/2006 | Jung et al. |
| 2006/0092033 A1 | 5/2006 | Hoff et al. |
| 2006/0097855 A1 | 5/2006 | Turnbull et al. |
| 2006/0100912 A1 | 5/2006 | Kumar et al. |
| 2006/0115802 A1 | 6/2006 | Reynolds |
| 2006/0116979 A1 | 6/2006 | Jung et al. |
| 2006/0117001 A1 | 6/2006 | Jung et al. |
| 2006/0157550 A1 | 7/2006 | Jung et al. |
| 2006/0164239 A1 | 7/2006 | Loda |
| 2006/0170687 A1 | 8/2006 | Nakamura et al. |
| 2006/0173816 A1 | 8/2006 | Jung et al. |
| 2006/0173841 A1* | 8/2006 | Bill .................. G01C 21/3492 |
| 2006/0190428 A1 | 8/2006 | Jung et al. |
| 2006/0206817 A1 | 9/2006 | Jung et al. |
| 2006/0214813 A1 | 9/2006 | Witkowski et al. |
| 2006/0226949 A1 | 10/2006 | Reene |
| 2006/0232377 A1 | 10/2006 | Witkowski |
| 2006/0261931 A1 | 11/2006 | Cheng |
| 2007/0005233 A1 | 1/2007 | Pinkus et al. |
| 2007/0008189 A1 | 1/2007 | Amari et al. |
| 2007/0027595 A1 | 2/2007 | Nou |
| 2007/0027903 A1 | 2/2007 | Evans et al. |
| 2007/0032225 A1 | 2/2007 | Konicek et al. |
| 2007/0033414 A1 | 2/2007 | Dunko |
| 2007/0038529 A1 | 2/2007 | Jung et al. |
| 2007/0040013 A1 | 2/2007 | Jung et al. |
| 2007/0064644 A1 | 3/2007 | Dowling et al. |
| 2007/0152798 A1 | 7/2007 | Witkowski |
| 2007/0176736 A1 | 8/2007 | Chuey et al. |
| 2007/0197172 A1 | 8/2007 | Witkowski et al. |
| 2007/0201381 A1 | 8/2007 | Ekl et al. |
| 2007/0201382 A1 | 8/2007 | Ekl et al. |
| 2007/0204021 A1 | 8/2007 | Ekl et al. |
| 2007/0224937 A1 | 9/2007 | Jung et al. |
| 2007/0224938 A1 | 9/2007 | Jung et al. |
| 2007/0270159 A1 | 11/2007 | Lohtia et al. |
| 2008/0027590 A1 | 1/2008 | Phillips et al. |
| 2008/0061967 A1 | 3/2008 | Corrado |
| 2008/0063400 A1 | 3/2008 | Hudson et al. |
| 2008/0065274 A1 | 3/2008 | Taki et al. |
| 2008/0068205 A1 | 3/2008 | Witkowski |
| 2008/0086241 A1 | 4/2008 | Phillips et al. |
| 2008/0091309 A1 | 4/2008 | Walker |
| 2008/0103640 A1 | 5/2008 | Watanabe et al. |
| 2008/0103655 A1 | 5/2008 | Turnbull et al. |
| 2008/0129449 A1 | 6/2008 | Beehler et al. |
| 2008/0143686 A1 | 6/2008 | Yeh et al. |
| 2008/0164972 A1 | 7/2008 | Taki et al. |
| 2008/0183376 A1 | 7/2008 | Knockeart et al. |
| 2008/0195428 A1 | 8/2008 | O'Sullivan |
| 2008/0229198 A1 | 9/2008 | Jung et al. |
| 2008/0266254 A1 | 10/2008 | Robbins et al. |
| 2008/0309451 A1 | 12/2008 | Zellweger et al. |
| 2009/0005963 A1 | 1/2009 | Jarvinen |
| 2009/0037033 A1 | 2/2009 | Phillips et al. |
| 2009/0216600 A1 | 8/2009 | Hill |
| 2009/0235176 A1* | 9/2009 | Jayanthi ............ H04L 12/189 |
| | | 715/738 |
| 2009/0248587 A1 | 10/2009 | Van Buskirk |
| 2010/0005153 A1 | 1/2010 | Tsao |
| 2010/0146390 A1 | 6/2010 | Jung et al. |
| 2010/0207812 A1 | 8/2010 | Demirdjian et al. |
| 2010/0218095 A1 | 8/2010 | Jung et al. |
| 2010/0223162 A1 | 9/2010 | Jung et al. |
| 2010/0253507 A1 | 10/2010 | Jung et al. |
| 2010/0255785 A1 | 10/2010 | Jung et al. |
| 2010/0280748 A1 | 11/2010 | Mundinger et al. |
| 2010/0280853 A1 | 11/2010 | Petralia et al. |

(56) References Cited

U.S. PATENT DOCUMENTS

| | | |
|---|---|---|
| 2010/0280884 A1 | 11/2010 | Levine et al. |
| 2010/0309011 A1 | 12/2010 | Jung et al. |
| 2010/0332131 A1 | 12/2010 | Horvitz et al. |
| 2011/0059693 A1 | 3/2011 | O'Sullivan |
| 2011/0145089 A1 | 6/2011 | Khunger et al. |
| 2011/0224893 A1 | 9/2011 | Scofield et al. |
| 2011/0237287 A1 | 9/2011 | Klein et al. |
| 2011/0257883 A1 | 10/2011 | Kuznetsov |
| 2011/0288762 A1 | 11/2011 | Kuznetsov |
| 2012/0041675 A1 | 2/2012 | Juliver |
| 2012/0109721 A1 | 5/2012 | Cebon et al. |
| 2012/0112696 A1 | 5/2012 | Ikeda et al. |
| 2012/0253654 A1 | 10/2012 | Sun et al. |
| 2013/0054139 A1 | 2/2013 | Bodin et al. |
| 2013/0095757 A1 | 4/2013 | Abdelsamie et al. |
| 2013/0131909 A1 | 5/2013 | Cooper et al. |
| 2013/0158861 A1 | 6/2013 | Lerenc |
| 2013/0158869 A1 | 6/2013 | Lerenc |
| 2013/0226365 A1 | 8/2013 | Brozovich |
| 2013/0237156 A1 | 9/2013 | Jung et al. |
| 2013/0237273 A1 | 9/2013 | Klein et al. |
| 2013/0244713 A1 | 9/2013 | Klein et al. |
| 2013/0244714 A1 | 9/2013 | Klein et al. |
| 2013/0310101 A1 | 11/2013 | Klein et al. |
| 2013/0344859 A1 | 12/2013 | Abramson et al. |
| 2014/0012498 A1 | 1/2014 | Gustafson et al. |
| 2014/0094998 A1 | 4/2014 | Cooper et al. |
| 2014/0171013 A1 | 6/2014 | Varoglu et al. |
| 2014/0173511 A1 | 6/2014 | Lehmann et al. |
| 2014/0342670 A1 | 11/2014 | Kang et al. |
| 2015/0006005 A1 | 1/2015 | Yu et al. |
| 2015/0006072 A1 | 1/2015 | Goldberg et al. |
| 2015/0019132 A1 | 1/2015 | Gusikhin et al. |
| 2015/0025932 A1 | 1/2015 | Ross et al. |
| 2015/0045068 A1* | 2/2015 | Soffer ............... G01C 21/20 455/456.3 |
| 2015/0081362 A1 | 3/2015 | Chadwick et al. |
| 2015/0094093 A1 | 4/2015 | Pierce et al. |
| 2015/0141043 A1 | 5/2015 | Abramson et al. |
| 2015/0161564 A1 | 6/2015 | Sweeney et al. |
| 2015/0278759 A1 | 10/2015 | Harris et al. |
| 2015/0294431 A1 | 10/2015 | Fiorucci et al. |
| 2015/0312404 A1 | 10/2015 | Abramson et al. |
| 2015/0317100 A1 | 11/2015 | Shimohata et al. |
| 2015/0323330 A1* | 11/2015 | Lord ............... G01C 21/3438 701/410 |
| 2015/0323333 A1 | 11/2015 | Lord et al. |
| 2015/0323336 A1 | 11/2015 | Lord et al. |
| 2015/0324717 A1 | 11/2015 | Lord et al. |
| 2015/0324729 A1 | 11/2015 | Lord et al. |
| 2015/0324735 A1 | 11/2015 | Lord et al. |
| 2015/0324944 A1 | 11/2015 | Lord et al. |
| 2015/0324945 A1 | 11/2015 | Lord et al. |
| 2015/0325128 A1 | 11/2015 | Lord et al. |
| 2016/0034845 A1 | 2/2016 | Hiyama et al. |
| 2016/0202079 A1 | 7/2016 | Konig et al. |
| 2017/0223164 A1 | 8/2017 | Jung et al. |

FOREIGN PATENT DOCUMENTS

| | | |
|---|---|---|
| JP | 6-224832 A | 8/1994 |
| JP | 2002-123349 A | 4/2002 |
| JP | 2003-030207 A | 1/2003 |
| JP | 2003-084954 A | 3/2003 |
| JP | 2003-114897 A | 4/2003 |
| JP | 2003-128253 A | 5/2003 |
| JP | 2003-228451 A | 8/2003 |
| JP | 2012-215921 A | 11/2012 |
| KR | 10-2007-0049336 A | 5/2007 |
| KR | 10-2010-0053717 A | 5/2010 |
| KR | 10-2013-0040430 A | 4/2013 |
| KR | 10-2013-0051265 A | 5/2013 |
| KR | 10-2014-0041665 A | 4/2014 |

OTHER PUBLICATIONS

Vaqar et al., Smart Protocol for Communication in Mobile Ad Hoc Network of Vehicles, 2007, IEEE, p. 1-6 (Year: 2007).*

Fay et al., Decentralized control strategies for transportation systems, 2005, IEEE, p. 898-903 (Year: 2005).*

Dessouky et al., Real-time scheduling rules for demand responsive transit systems, 1998, IEEE, p. 2956-2961 (Year: 1998).*

Amey et al., "'Real-Time' Ridesharing—The Opportunities and Challenges of Utilizing Mobile Phone Technology to Improve Rideshare Services," Paper submitted to the 2011 Transporation Research Board Annual Meeting, Aug. 1, 2010, pp. 1-17.

Boufraied, "A Diagnostic Approach for Advanced Tracking of Commercial Vehicles With Time Window Constraints," IEEE Transactions on Intelligent Transportation Systems, 2013, vol. 14, No. 3, pp. 1470-1479.

Dillenburg et al., "The Intelligent Travel Assistant," IEEE 5th International Conference on Intelligent Transportation Systems, Sep. 3-6, 2002, pp. 691-696.

Fougeres et al., "A Push Service for Carpooling," IEEE International Conference on Green Computing and Communications, 2012, pp. 685-691.

Guc et al., "Real-time, Scalable Route Planning Using a Stream-Processing Infrastructure," 13th International IEEE Conference on Intelligent Transportation Systems, Sep. 19-22, 2010, pp. 986-991.

Lalos et al., "A Framework for Dynamic Car and Taxi Pools with the Use of Positioning Systems," IEEE Computer Society; Computation World: Future Computing, Service Computation, Cognitive, Adaptive, Content, Patterns, 2009, pp. 385-391.

Megalingam et al., "Automated Wireless Carpooling System for an Eco-Friendly Travel," 3rd International Conference on Electronics Computer Technology, IEEE 2011, pp. 325-329.

Shahzada et al., "Dynamic Vehicle Navigation: An A* Algorithm Based Appropch Using Traffic and Road Information," IEEE International Conference on Computer Applications and Industrial Electronics, 2011, pp. 3514-518.

Vaughn-Nichols, "Will Mobile Computing's Future Be Location, Location, Location?," 2009, IEEE, pp. 14-17.

Supplementary Partial European Search Report, Appl. No. EP 15788789, dated Dec. 19, 2017.

U.S. Appl. No. 14/597,631, Non-Final Rejection dated Sep. 30, 2015.

U.S. Appl. No. 14/597,631, Final Rejection dated Mar. 21, 2016.

U.S. Appl. No. 14/597,631, Notice of Allowance dated Aug. 17, 2016.

Duchon et al., Distributed Cooperative On-Demand Transportation, 2011, IEEE, p. 1-5 (2011).

Shengguang et al., Internet of Things for Special Materials Transportation Vehicles, 2013, IEEE, p. 1891-1894 ( 2013).

Morenz et al., An Estimation-based Automatic Vehicle Location System for Public Transport Vehicles, 2008, IEEE, p. 850-856 (2008).

Garofalaki et al., Transport services within the loT ecosystem using localisation parameters, 2016, IEEE, p. 1-5 (2016).

Excerpt from The Cambridge Dictionary Online; dated 2009; printed on Oct. 23, 2009; pp. 1-2; Cambridge University Press; located at: http://dictionary.cambridge.org/define.asp?key=62453&dict=CALD (as provided by examiner).

Heywood, "Drew Heywood's Windows 2000 Network Services"; dated Feb. 28, 2001; printed on Mar. 13, 2008; pp. 1-17; Publisher: Sams; located at: http//proquest.safaribooksonline.com/print?xmlid=0672317419/ch01lev1sec4.

Alexander et al., "IBM Business Consulting Services—Applying Auto-ID to Reduce Losses Associated with Shrink"; Auto-ID Center Massachusetts Institute of Technology; dated Nov. 1, 2002, Feb. 1, 2003, Jun. 2002 and Nov. 2002; pp. 1-56; printed on Feb. 3, 2005; Auto-ID Center, IBM-AUTOID-BC-003; located at: http://quintessenz.org/rfid.docs/www.autoidcenter.org/publishedresearch/ibm-autoid-bc-003.pdf.

ProfitLogic, "Capabilities"; pp. 1-2; printed on Feb. 3, 2005; located at: http://www.profitlogic.com/capabilities.htm.

Emigh, "IBM Unleashes New RFID Middlewear"; eWeek Enterprise News & Reviews, Health Care Technology Experts; dated

(56) References Cited

OTHER PUBLICATIONS

Dec. 16, 2004 and 2005; pp. 1-2; located at: http://www.eweek.com/print_article2/0,2533,a=141068,00.asp.
"EPC RFID-based Inventory Management Solution Delivers Faster, Better Goods Logistics"; solution Architects; dated 2003; pp. 1-15; printed on Jan. 10, 2005; located at: www.intel.com/business/bss/solutions/blueprints/pdf/30034101.pdf.
"Get real time warehouse management with Cadence WMS"; Cadre Cadence Warehouse Management System Software; p. 1; printed on Jan. 10, 2005; located at: http://www.cadretech.com/warehouse_mgmt.html.
"IBM RFID solution for asset tracking and inventory management"; pp. 1-3; printed on Feb. 3, 2005; located at: http://www-1.ibm.com/industries/wireless/doc/content/solution/1025230104.html.
"IBM RFID solution for asset tracking and inventory management"; pp. 1-3; printed on Feb. 3, 2005; located at: http://www-1.ibm.com/industries/wireless/doc/content/solution/1025230204.html.
Kuchinskas, "IBM in Major RFID Expansion"; Jupiterimages; dated Sep. 27, 2004; pp. 1-2; printed on Feb. 3, 2005; located at: http://www.internetnews.com/wireless/print.php/3412991.
Kuchinskas, "IBM Takes on Flood of RFID Data"; Jupiterimages; dated Jul. 19, 2004; pp. 1-3; printed on Feb. 3, 2005; located at: http://www.internetnews.com/ent-news/print.php/3382621.
"Nordstrom: Inventory Management Transformation"; Accenture.com; dated 1995-2005; pp. 1-2; printed on Feb. 3, 2005; located at: http://www.accenture.com/xd/xd.asp?it=enweb&xd=industries%5Cproducts%5Cretail%5Ccase%5Creta_Nordstrom.xml.
ProfitLogic, "Solutions"; pp. 1-2; printed on Feb. 3, 2005; located at: http://www.profitlogic.com/solutions.htm.
"The EPCglobal Network™ : Overview of Design, Benefits, & Security"; EPCglobal Inc.; dated Sep. 24, 2004; pp. 1-11; printed on Feb. 3, 2005; located at: http://www.epcglobalinc.org/news/position_papers.html.photo.net, "How to prevent condensation in camera/lens? What cause it?", https://www.photo.net/discuss/threads/how-to-prevent-condensation-in-camera-lens-what-cause-it.77624/; dated Nov. 2, 2003, printout pp. 1-2.
"Electronic Device", Wikipedia; dated 2003-2015; printed on Jun. 8, 2015; pp. 1-2; located at: http://www.thefreedictionary.com/electronic+device.
"Input Device", Wikipedia; dated Jun. 6, 2015; printed on Jun. 8, 2015; pp. 1-4; located at: http://en.wikipedia.org/wiki/Input_device.
"Applications: eCash on the Move at Volkswagen," iButton Applications, Dallas Semiconductor MAXIM, dated 2006; pp. 1-2; printed on Feb. 27, 2006; located at http://www.maxim-ic.com/products/ibutton/applications/index.cfm?Action=DD&id=21; Maxim Integrated Products.
"Applications: Mass Transit in Istanbul, Turkey," and "Parking in Argentina," iButton Applications, Dallas Semiconductor MAXIM; dated 2006, pp. 1-3, printed on Feb. 27, 2006; located at: http://www.maxim-ic.com/products/ibutton/applications/index.cfm?Action=DD&id=8; Maxim Integrated Products.
Cameron et al., "Knuckletop Computing: The Java Ring," pp. 1-4; located at: http://java.sun.com/features/1998/03/rings.html.
"Cellport Announces First Universal, Hands-Free Cell Phone System for Cars," Intelligent Transportation Society of America; dated Jul. 16, 2001, pp. 1-2, printed on Feb. 24, 2006; located at: http://www.itsa.org/itsnews.nsf/key/5FAA?OpenDocument.
"City of Caen, France, to demonstrate simplicity of Near Field Communication (NFC) technology," dated Oct. 18, 2005; pp. 1-3, printed on Mar. 20, 2006; located at: http://www.semiconductors.philips.com/news/content/file_1193.html; Koninklijke Philips Electronics N.V.
"Ecma welcomes ISO/IEC adoption of NFC Standard for short range wireless communication," Ecma International; dated Dec. 8, 2003; pp. 1-3; printed on Feb. 24, 2006; located at: http://www.ecma-international.org/news/Ecma-340-NFCIP-1.htm.
Kiser, "Newall Electronics Introduces Wearable DRO Technology," Industrial Product News Online; pp. 1-2; printed on Feb. 24, 2006; located at: http://www.ipnews.com/archives/dro/jan02/newall%5Felect.htm.
Lewis, "Put on your human-machine interface," Design News; dated Aug. 20, 2001 and 1997-2006; pp. 1-4; printed on Feb. 24, 2006; located at: http//designnews.com/article/CA150040.html; Reed Business Information.
"Near Field Communication: Encyclopedia," What You Need to Know About; dated 2006; pp. 1-3; printed on Mar. 3, 2006; located at: http://experts.about.com/e/n/ne/Near_Field_Communication.htm; About, Inc.
"Near Field Communication," Wikipedia; dated Feb. 17, 2006; pp. 1-2; printed on Feb. 24, 2006; located at: http://en.wikipedia.org/wiki/Near_Field_Communication.
"Near Field Communication, White Paper," dated 2005; pp. 1-9; located at: http://www.ecma-international.org/activities/Communications/tc32-tg19-2005-012.pdf; ECMA International.
"Near field communication set for full-scale trial," dated Oct. 20, 2005, pp. 1-3; printed on Mar. 20, 2006; located at: http://www.electronicstalk.com/news/phi/phi328.html; Pro-Talk Ltd, UK.
"Philips, Samsung and Telefonica Moviles Espana Demonstrate Simplicity of Near Field Communication Technology at 3GSM World Congress; 200 Attendees Can Enjoy Easy Payment and Convenient Access at Fira de Barcelona Convention Center," dated Feb. 7, 2006, pp. 1-4; printed on Mar. 20, 2006; located at: http://home.Businesswire.com/portal/site/google/index.jsp?ndmViewId=news_view&newsId=20060207005492&newsLang=en; Business Wire.
"Secure Website Logon and Transactions," iButton Applications; dated 2004; pp. 1-2; printed on Mar. 3, 2006; located at: http://72.14.207.104/search?q=cache:4JM396tN_ToJ:db.maxim-ic.com/ibutton/applications/index.cfm; Maxim/Dallas Semiconductor Corp.
Swedberg, "Developing RFID-Enabled Phones," RFID Journal; dated Jul. 9, 2004 and 2002-2006; pp. 1-3; printed on Mar. 20, 2006; located at: http://www.rfidjournal.com/article/articleview/2020/1/1/; RFID Journal, LLC.
Thomson, "Industry giants tout touch computing," Computing, dated Mar. 19, 2004 and 1995-2006; pp. 1-2; printed on Feb. 24, 2006; located at: http://www.computing.co.uk/vnunet/news/2124597/industry-giants-tout-touch-computing; vnu business publications.
Oswald, "blinkx Looks to Make Search Automatic," BetaNews; dated Mar. 7, 2006 and 1998-2006; pp. 1-6; printed on Mar. 22, 2006; BetaNews, Inc.; located at: http://www.betanews.com/article/blinkx_Looks_to_Make_Search_Automatic/1141754474.
"Welcome," NFC-Forum; dated 2005; pp. 1-2; printed on May 31, 2006; located at: http://www.nfc-forum.org/home; NFC Forum.

\* cited by examiner

202* Request Transmitting Module
- 301 End User Request Receiving Module
- 302 Location Data Transmitting Module
- 304 Preference Data Transmitting Module
- 306 Image Data Transmitting Module
- 308 Carpooling Request Transmitting Module
- 310 Non-Carpooling Vehicle Availability Determining Module

FIG. 3A

204* Transportation Vehicle Unit Identity Acquiring Module
- 312 Transportation Vehicle Unit Confirming Module
- 314 Transport Rate Acquiring Module
- 315 Transport Rate Generating Module

FIG. 3B

206* Transportation Vehicle Unit Directing Module
- 316 Directive Transmitting Module
- 318 Transport Rate Data Transmitting Module

FIG. 3C

504 Receiving the one or more identities of the transportation vehicle unit for transporting the first end user, the transportation vehicle unit currently en route to or is currently transporting a second end user and having been identified based, at least in part, on a determination that the transportation vehicle unit is able to accommodate transport of the first end user while transporting the second end user 738 Receiving the one or more identities of the transportation vehicle unit for transporting the first end user, the transportation vehicle unit having been identified based, at least in part, on a determination that the transportation vehicle unit will be transporting the second end user to a second end user destination location that is the same as a first end user destination location of the first end user 739 Receiving the one or more identities of the transportation vehicle unit for transporting the first end user, the transportation vehicle unit having been identified based, at least in part, on a determination that the transportation vehicle unit has sufficient available space to transport the first end user while transporting the second end user 740 Receiving the one or more identities of the transportation vehicle unit for transporting the first end user, the transportation vehicle unit having been identified based, at least in part, on a determination that transport of the first end user by the transportation vehicle unit will not significantly delay transport of the second end user to a second end user destination location 741 Receiving the one or more identities of the transportation vehicle unit for transporting the first end user, the transportation vehicle unit having been identified based, at least in part, on a determination that transport of the first end user by the transportation vehicle unit will not add more than a predefined amount of permitted delay time for transporting the second end user to a second end user destination location, a delay time being an amount of additional time added to overall travel time for transporting the second end user to the second end user destination location as a result of transporting the first end user 742 Receiving the one or more identities of the transportation vehicle unit for transporting the first end user, the transportation vehicle unit having been identified based, at least in part, on a determination that transport of the first end user by the transportation vehicle unit will not add more than the predefined amount of permitted delay time for transporting the second end user to a second end user destination location, the predefined amount of permitted delay time being defined by the second end user and not being greater than 20 minutes

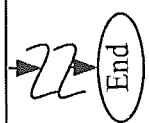

FIG. 7E

REAL-TIME CARPOOLING COORDINATING SYSTEM AND METHODS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is a continuation of application Ser. No. 15/889,117, filed Feb. 5, 2018, which is a continuation of application Ser. No. 14/597,631 filed Jan. 15, 2015, now U.S. Pat. No. 9,886,671, which is incorporated herein by reference thereto. Also, the present application is related to and/or claims the benefit of the earliest available effective filing date(s) from the following listed application(s) (the "Priority Applications"), listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

For purposes of the USPTO extra-statutory requirements, the present application claims benefit of priority of U.S. provisional patent application Ser. No. 61/989,394 titled RIDESHARING SCENARIOS, naming Richard T. Lord and Robert W. Lord as inventors, filed May 6, 2014, which was filed within the twelve months preceding the filing date of the present application or is an application of which a currently co-pending application is entitled to the benefit of the filing date.

The present application constitutes a continuation-in-part of U.S. patent application Ser. No. 14/318,182, entitled METHODS, SYSTEMS, AND DEVICES FOR PROVIDING TRANSPORTATION SERVICES, naming Richard T. Lord, Robert W. Lord, Nathan P. Myhrvold, and Clarence T. Tegreene, as inventors, filed Jun. 27, 2014.

The present application constitutes a continuation-in-part of U.S. patent application Ser. No. 14/329,451, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Jul. 11, 2014, which is currently co-pending or is an application of which a currently co-pending application is entitled to the benefit of the filing date, and which is a continuation of U.S. patent application Ser. No. 14/328,002, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Jul. 10, 2014.

The present application constitutes a continuation-in-part of U.S. patent application Ser. No. 14/456,627, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Aug. 11, 2014, now U.S. Pat. No. 9,534,912, which is currently co-pending or is an application of which a currently co-pending application is entitled to the benefit of the filing date, and which is a continuation of U.S. patent application Ser. No. 14/455,534, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Aug. 8, 2014, now U.S. Pat. No. 9,581,455.

The present application constitutes a continuation-in-part of U.S. patent application Ser. No. 14/476,042, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed Sep. 3, 2014, now U.S. Pat. No. 9,488,484, which is currently co-pending or is an application of which a currently co-pending application is entitled to the benefit of the filing date, and which is a continuation of U.S. patent application Ser. No. 14/474,587, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed Sep. 2, 2014, now U.S. Pat. No. 9,599,481.

The present application constitutes a continuation-in-part of U.S. patent application Ser. No. 14/511,706, entitled SYSTEM AND METHODS FOR DIRECTING ONE OR MORE TRANSPORTATION VEHICLE UNITS TO TRANSPORT ONE OR MORE END USERS, naming Richard T. Lord, Robert W. Lord, Nathan P. Myhrvold, and Clarence T. Tegreene, as inventors, filed Oct. 10, 2014, now U.S. Pat. No. 9,767,423, which is currently co-pending or is an application of which a currently co-pending application is entitled to the benefit of the filing date, and which is a continuation of U.S. patent application Ser. No. 14/510,383, entitled SYSTEM AND METHODS FOR DIRECTING ONE OR MORE TRANSPORTATION VEHICLE UNITS TO TRANSPORT ONE OR MORE END USERS, naming Richard T. Lord, Robert W. Lord, Nathan P. Myhrvold, and Clarence T. Tegreene, as inventors, filed Oct. 9, 2014, now U.S. Pat. No. 9,569,740.

The present application constitutes a continuation-in-part of U.S. patent application Ser. No. 14/537,313, entitled SYSTEM AND METHODS FOR VERIFYING THAT ONE OR MORE END USER TRANSPORT DIRECTIVES DO NOT CONFLICT WITH ONE OR MORE PACKAGE DELIVERY DIRECTIVES, naming Richard T. Lord, Robert W. Lord, Nathan P. Myhrvold, and Clarence T. Tegreene, as inventors, filed Nov. 10, 2014, now U.S. Pat. No. 9,558,469, which is currently co-pending or is an application of which a currently co-pending application is entitled to the benefit of the filing date, and which is a continuation of U.S. patent application Ser. No. 14/536,967, entitled SYSTEM AND METHODS FOR VERIFYING THAT ONE OR MORE END USER TRANSPORT DIRECTIVES DO NOT CONFLICT WITH ONE OR MORE PACKAGE DELIVERY DIRECTIVES, naming Richard T. Lord, Robert W. Lord, Nathan P. Myhrvold, and Clarence T. Tegreene, as inventors, filed Nov. 10, 2014, now U.S. Pat. No. 9,792,574.

The present application constitutes a continuation-in-part of U.S. patent application Ser. No. 14/564,358, entitled SYSTEM AND METHODS FOR FACILITATING REAL-TIME CARPOOLING, naming Richard T. Lord, Robert W. Lord, Nathan P. Myhrvold, and Clarence T. Tegreene, as inventors, filed Dec. 9, 2014, now U.S. Pat. No. 9,689,694, which is currently co-pending or is an application of which a currently co-pending application is entitled to the benefit of the filing date, and which is a continuation of U.S. patent application Ser. No. 14/563,134, entitled SYSTEM AND METHODS FOR FACILITATING REAL-TIME CARPOOLING, naming Richard T. Lord, Robert W. Lord, Nathan P. Myhrvold, and Clarence T. Tegreene, as inventors, filed Dec. 8, 2014, now U.S. Pat. No. 9,671,239.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, transmitting a request for one or more identities of a transportation vehicle unit for transporting a first end user, receiving the one or more identities of the transportation vehicle unit for transporting the first end user, the transportation vehicle unit currently en route to or is currently transporting a second end user and having been identified based, at least in part, on a determination that the transportation vehicle unit is able to accommodate transport of the first end user while transporting the second end user; and directing the identified transportation vehicle unit to rendezvous with the first end user in order to transport the first end user. In various implementations, at least one of the above described operations is performed by a machine or an article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for transmitting a request for one or more identities of a transportation vehicle unit for transporting a first end user, means for receiving the one or more identities of the transportation vehicle unit for transporting the first end user, the transportation vehicle unit currently en route to or is currently transporting a second end user and having been identified based, at least in part, on a determination that the transportation vehicle unit is able to accommodate transport of the first end user while transporting the second end user; and means for directing the identified transportation vehicle unit to rendezvous with the first end user in order to transport the first end user. In addition to the foregoing, other system aspects are described in the claims, drawings, and text forming a part of the disclosure set forth herein.

In one or more various aspects, a system includes, but is not limited to, circuitry for transmitting a request for one or more identities of a transportation vehicle unit for transporting a first end user, circuitry for receiving the one or more identities of the transportation vehicle unit for transporting the first end user, the transportation vehicle unit currently en route to or is currently transporting a second end user and having been identified based, at least in part, on a determination that the transportation vehicle unit is able to accommodate transport of the first end user while transporting the second end user; and circuitry for directing the identified transportation vehicle unit to rendezvous with the first end user in order to transport the first end user. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, transmitting a request for one or more identities of a transportation vehicle unit for transporting a first end user, receiving the one or more identities of the transportation vehicle unit for transporting the first end user, the transportation vehicle unit currently en route to or is currently transporting a second end user and having been identified based, at least in part, on a determination that the transportation vehicle unit is able to accommodate transport of the first end user while transporting the second end user, and directing the identified transportation vehicle unit to rendezvous with the first end user in order to transport the first end user. In addition to the foregoing, other computer program product aspects are described in the claims, drawings, and text forming a part of the disclosure set forth herein.

In one or more various aspects, a system includes, but is not limited to, a transportation vehicle unit identity acquiring module configured to acquire one or more identities of a transportation vehicle unit for transporting a first end user, the transportation vehicle unit to be identified currently en route to or is currently transporting a second end user and having been identified based, at least in part, on a determination that the identified transportation vehicle is able to accommodate transport of the first end user while transporting the second end user; a transportation vehicle unit directing module configured to direct the identified transportation vehicle unit to rendezvous with the first end user in order to transport the first end user; and one or more processors.

In one or more various aspects, a system includes, but is not limited to, acquiring one or more identities of a transportation vehicle unit for transporting a first end user, the transportation vehicle unit to be identified currently en route to or is currently transporting a second end user and having been identified based, at least in part, on a determination that the identified transportation vehicle is able to accommodate transport of the first end user while transporting the second end user; and circuitry for directing the identified transportation vehicle unit to rendezvous with the first end user in order to transport the first end user.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3A shows another perspective of the request transmitting module 202* of FIGS. 2A and 2B (e.g., the request transmitting module 202' of FIG. 2A or the request transmitting module 202" of FIG. 2B) in accordance with various embodiments.

FIG. 3B shows another perspective of the transportation vehicle unit identity acquiring module 204* of FIGS. 2A and 2B (e.g., the transportation vehicle unit identity acquiring module 204' of FIG. 2A or the transportation vehicle unit identity acquiring module 204" of FIG. 2B) in accordance with various embodiments.

FIG. 3C shows another perspective of the transportation vehicle unit directing module 206* of FIGS. 2A and 2B (e.g., the transportation vehicle unit directing module 206' of FIG. 2A or the transportation vehicle unit directing module 206" of FIG. 2B) in accordance with various embodiments.

FIG. 7E is a high-level logic flowchart of a process depicting alternate implementations of the transportation vehicle unit identity receiving operation 504 of FIG. 5.

DETAILED DESCRIPTION

Figure 1:
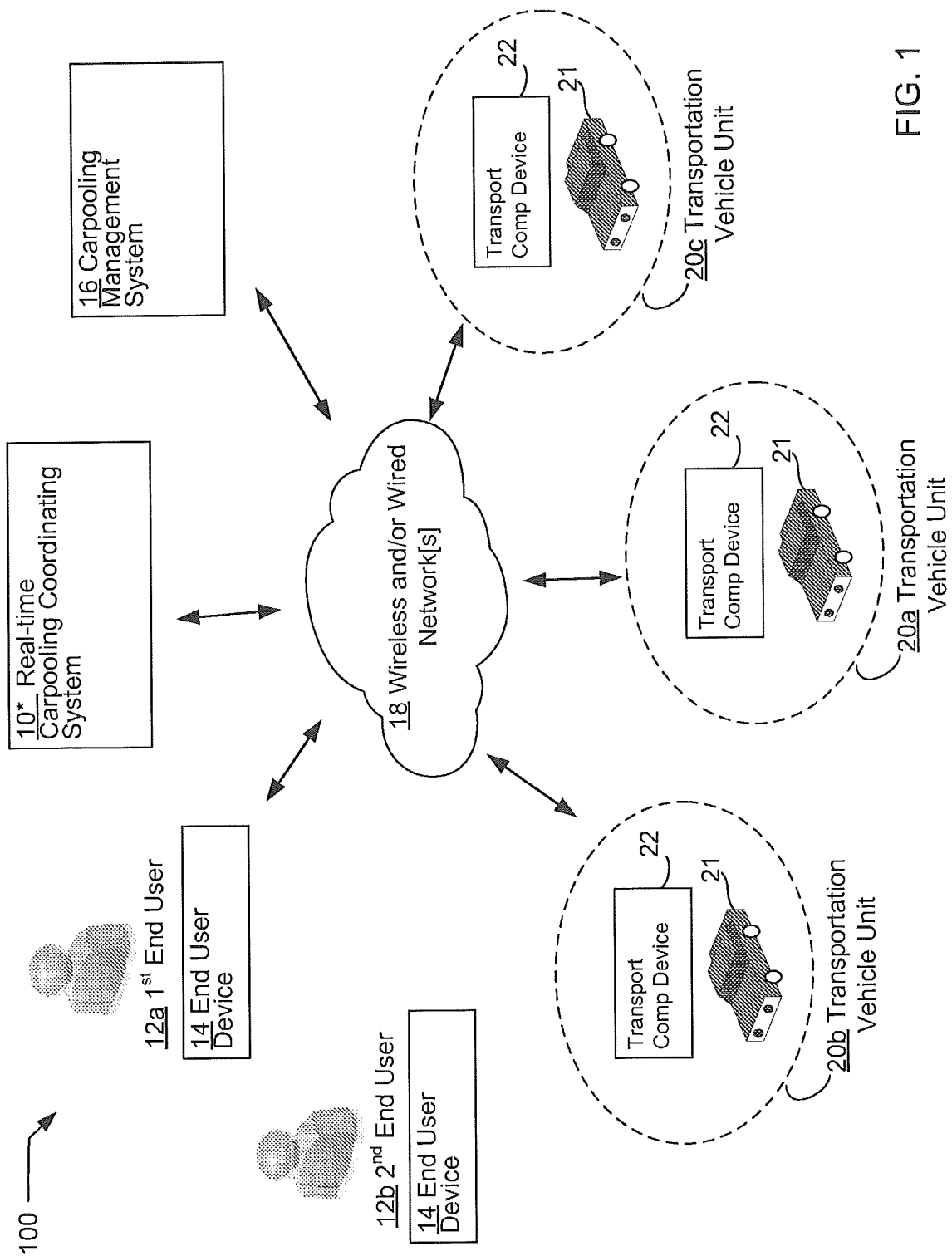
FIG. 1 illustrates a real-time carpooling coordinating system 10* operating in an exemplary environment

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., WIKIPEDIA, High-level programming language (as of Jun. 5, 2012, 21:00 GMT). In order to facilitate human comprehension, in many instances, high-level programming languages resemble or even share symbols with natural languages. See, e.g., WIKIPEDIA (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.)

that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., WIKIPEDIA, Logic gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., WIKIPEDIA, Computer architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., WIKIPEDIA, Instructions per second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and RACK-SPACE). PaaS may include, e.g., one or more software and/or development tools hosted on an infrastructure (e.g., a computing platform and/or a solution stack from which the client can create software interfaces and applications, e.g., MICROSOFT AZURE). SaaS may include, e.g., software hosted by a service provider and accessible over a network (e.g., the software for the application and/or the data associated with that software application may be kept on the network, e.g., GOOGLE APPS, SALES FORCE). DaaS may include, e.g., providing desktop, applications, data, and/or services for the user over a network (e.g., providing a multi-application framework, the applications in the framework, the data associated with the applications, and/or services related to the applications and/or the data over the network, e.g., CITRIX). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation/commuting particularly in urban settings is the development of transportation networking services provided by web-based companies such as Uber and Lyft that allow users to retain drivers/vehicles for transportation services through, for example, mobile applications. The increasingly popularity of such "ridesharing" services have already made some of the early entrants in this new field household names. As with many new technological ventures, the functionalities provided through such services are somewhat limited. However there appears to be ample opportunities for adding new and value adding functionalities to such services (as well as to more traditional transportation services such as Taxi services) in order to provide more robust transportation networking systems.

Generally, these types of online transportation services appear to provide services and functionalities that are basically already provided by traditional taxi and limo companies but being provided through the latest technological innovations (e.g., using the Internet and mobile devices, such as Smartphones, in order to request transport services). One possible future avenue for growth is providing true ridesharing services (e.g., carpooling) where nonaffiliated passengers (e.g., unassociated end users) are assigned for transport by a single vehicle. There are already a few online carpooling services that provide some level of true carpooling services. However, these carpooling services generally provide basic carpooling services (e.g., providing a listing of vehicles/drivers that are scheduled to depart at a particular future time from one departure point and going to a particular destination point) that typically require arrangements in advance of a trip.

In accordance with various embodiments, systems and methods are presented herein that coordinate matching of for-hire passenger vehicles (herein "transportation vehicle units") that are designated carpooling vehicles to prospective passengers (e.g., end users) in real-time (e.g., to assign a prospective passenger to a carpooling vehicle that is already en route to or is already transporting other passengers). In some cases, these systems and methods may be able to acquire one or more identities of a transportation vehicle unit for transporting a first end user, the transportation vehicle unit that is identified being currently en route to or is currently transporting a second end user and having been identified based, at least in part, on a determination that the transportation vehicle is able to accommodate transport of the first end user while transporting the second end user; and to direct the identified transportation vehicle unit to rendezvous with the first end user in order to transport the first end user.

In various embodiments, a transportation vehicle unit may comprise of a passenger vehicle such as a gas or electric powered automobile, a human or robotic driver, and a transport computing device such as a mobile computing device or a specialized dedicated computing device for receiving directives/assignments and for transmitting status information. In some embodiments, a transportation vehicle unit may be "currently en route" to transporting a second end user when the transportation vehicle unit is spatially approaching (e.g., nearing and being within 3 miles of) a rendezvous location to rendezvous with the second end user. Note that the phrase "currently" may correspond to a point in time when the transportation vehicle unit is identified for transporting the first end user. As will be further described herein, a variety of factors may be considered when determining whether a particular transportation vehicle unit that is currently en route to or is already transporting a second end user is able to accommodate transport of the first end user while transporting the second end user. Some of these factors include, for example, whether the amount of delay time that is estimated to incur for transporting the second end user to a destination location and that is as a result of transporting the first end user does not exceed the maximum acceptable amount of time delay, whether the first and second end users are to be picked-up (e.g., secured) from the same rendezvous location and/or to be transported to the same destination location, and so forth.

In some cases, "candidate" transportation vehicle units that are candidates for transport of the first end user may be ranked based on their suitability for transporting the first end user as well as other end users (e.g., a second end user). The ranking of the candidate transportation vehicle units may be particular useful, for example, when the initially selected transportation vehicle unit is unable to transport the first end user (for a variety of reasons including vehicle breakdowns or traffic delays) and a "backup" transportation vehicle unit is needed in order to transport the first end user. As will be further described herein, a variety of factors may be considered when ranking the candidate transportation vehicle units including, for example, their ability to efficiently transport their passengers to their destinations (e.g., destination locations).

In some cases, the systems and methods to be described herein may be designed to obtain and then provide transport rates for the first end user and the second end user based, at least in part, on the identified transportation vehicle unit (which is en route to or is already transporting the second end user) transporting both the first and the second end users. In some cases, a discounted transported rate for the second end user may be provided based, at least in part, on the identified transportation vehicle unit being assigned to transport the first end user. In some cases, a premium transport rate (e.g., a relatively high transport rate) may be provided for the first end user as a result of the first end user being transported by the identified transportation vehicle unit that is already assigned to transport the second end user. The providing of the premium transport rate for the first end user may be for a variety of reasons including, for example, to pay for a larger percentage of the total fee charged to all of the passengers being transported by the identified transportation vehicle unit (as a result, the second end user who may already be transported by the selected transportation vehicle unit may have to pay less).

Turning now to FIG. 1, which illustrates a real-time carpooling coordinating system 10* operating in an exemplary environment 100 in accordance with various embodiments. In various embodiments, the various operations and functionalities to be described herein may be implemented by the real-time carpooling coordinating system 10*. In various embodiments, the real-time carpooling coordinating system 10* may be a network device such as a server or a workstation, or a plurality of network devices such as servers, workstations, storage, and so forth (e.g., "the cloud"). In some embodiments, the real-time carpooling coordinating system 10* may be a dedicated computing system that is designed to specifically implement the various functions/operations to be described herein. In alternative embodiments, the real-time carpooling coordinating system 10* may be a general purpose computing system that has been programmed to perform the various functions/operations to be described herein. Note that for purposes of the following description "*" represents a wildcard. Thus, references in the following description to, for example, "real-time carpooling coordinating system 10*" may be in reference to the real-time carpooling coordinating system 10' of FIG. 2A, as well as to the real-time carpooling coordinating system 10" of FIG. 2B, which are two different implementations of the real-time carpooling coordinating system 10* of FIG. 1.

As further illustrated in FIG. 1, the real-time carpooling coordinating system 10* may communicate with a plurality of end users 12* (e.g., a first end user 12a and a second end user 12b) through end user devices 14, a carpooling management system 16, and multiple transportation vehicle units 20* (e.g., a transportation vehicle unit 20a, a transportation vehicle unit 20b, and a transportation vehicle unit 20c) via one or more wireless and/or wired networks 18. The one or more wireless and/or wired networks 18 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth. Note that for ease of illustration and simplicity, only two end users 12* (e.g., the first end user 12a and the second end user 12b) and only three transportation vehicle units 20* (e.g., the transportation vehicle unit 20a, the transportation vehicle unit 20b, and the transportation vehicle unit 20c) are illustrated. However, and as those of ordinary skill in the art will recognize, a greater number of end users 12* and/or a greater number of transportation vehicle units 20* may be in communication with the real-time carpooling coordinating system 10* in alternative embodiments. Each transportation vehicle unit 20* may include a transport computing device 22, a human or robotic driver (not illustrated), and a transport vehicle 21.

For purposes of the following discussion, a particular end user device 14 may be associated with a particular end user 12*. An end user device 14 may be a mobile device (e.g., a Smartphone or tablet computer) or a personal computer (e.g., a laptop computer, a desktop computer, a workstation, and so forth). Although not clearly illustrated in FIG. 1, in various embodiments, the real-time carpooling coordinating system 10* may communicate with a transportation vehicle unit 20* (which may comprise of, among other things, a transportation vehicle and a robotic or human driver) via a transport computing device 22 (e.g., a dedicated computing device or a general purpose mobile device such as a Smartphone or tablet computer) associated with the transportation vehicle unit 20* (or associated with a human driver of the transportation vehicle unit 20*). Note that in various embodiments, and as illustrated in FIG. 1, a transport computing device 22 may be part of a transportation vehicle unit 20*.

In various embodiments, the real-time carpooling coordinating system 10* may communicate with a carpooling management system 16 via the one or more wireless and/or wired network 18. For these embodiments, the real-time carpooling coordinating system 10*, upon receiving an end user request for transportation services (e.g., a request for a carpooling vehicle) from a first end user 12a, may transmit to the carpooling management system 16, a request for one or more identities of a transportation vehicle unit 20* for transporting the first end user 12a.

The carpooling management system 16, upon receiving the request, may be design to select/identify a transportation vehicle unit (e.g., the transportation vehicle unit 20a of FIG. 1, which may be referred to herein as the selected or "identified" transportation vehicle unit 20a in the following description) that is currently en route to or is currently transporting a second end user 12b for transporting the first end user 12a, the selection or identification of the transportation vehicle unit 20a being based, at least in part, on ascertaining that the transportation vehicle unit 20a is able to accommodate transport of the first end user 12a while transporting the second end user 12b.

The determination as to whether the transportation vehicle unit 20a is able to accommodate transport of the first end user 12a while transporting the second end user 12b may be based on a number of factors including, for example, whether there is sufficient space to accommodate additional passengers, whether a transportation vehicle unit 20a is currently located near the first end user 12a, whether assigning the first end user 12a to a transportation vehicle unit 20a will add significant delays to transport of other passengers to their destinations and who already being transported by the transportation vehicle unit 20a, and so forth. If a determination is made that multiple transportation vehicle units 20* qualify (e.g., meet minimum standards including their proximity to the current location of the first end user 12a, sufficient available cabin space to accommodate the first end user 12a, and so forth) for being able to accommodate transport of the first end user 12a, then a determination may be made as to which of the qualitied transportation vehicle units 20* is the "best fit" (e.g., which of the qualitied transportation vehicle units 20* can most efficiently transport the first end user 12* with minimal delays, which of the qualitied transportation vehicle units 20* is nearest to the current location of the first end user 12a, and so forth).

After the carpooling management system 16 identifies a transportation vehicle unit 20a for transporting the first end user 12a (while transporting a second end user 12b), the carpooling management system 16 may transmit to the real-time carpooling coordinating system 10* one or more identities (e.g., vehicle identifier, driver name, telephone number, uniform resource locator or URL, email address, etc.) associated with the identified transportation vehicle unit 20a. In some cases, the real-time carpooling coordinating system 10* upon receiving the one or more identities of the transportation vehicle unit 20a may confirm that the identified transportation vehicle unit 20a is, in fact, able to (and in some cases, best suited to) accommodate transport of the first end user 12a while transporting one or more other end users including the second end user 12b. That is, in various embodiments, both the carpooling management system 16 and the real-time carpooling coordinating system 10* may be designed to concurrently keep track of the statuses of various transportation vehicle units 20*. There may be, however, many situations where the real-time carpooling coordinating system 10* may have access to more current status information of the transportation vehicle units 20* than the carpooling management system 16. Thus, if the real-time carpooling coordinating system 10* is unable to confirm that the identified transportation vehicle unit 20* is unable to accommodate the first end user 12a or is not the best fit for transporting the first end user 12a, than the real-time carpooling coordinating system 10* may transmit another request to the carpooling management system 16 for one or more identifies for another transportation vehicle units 20* for transporting the first end user 12a.

Upon receiving the one or more identities of the transportation vehicle unit 20a and/or upon confirming that the identified transportation vehicle unit 20a should, in fact, transport the first end user 12a, the real-time carpooling coordinating system 10* may direct the identified transportation vehicle unit 20a to rendezvous with the first end user 12a. In some embodiments, the real-time carpooling coordinating system 10* may direct the identified transportation vehicle unit 20a to rendezvous with the first end user 12a by transmitting one or more directives to a transport computing device 22 (e.g., a dedicated device or a mobile device such as a tablet computer or a Smartphone) associated with the identified transportation vehicle unit 20a.

In some embodiments, the real-time carpooling coordinating system 10* may be further designed to transmit to one or more end user devices 14 one or more notifications that provide a notification that the identified transportation vehicle unit 20a has been selected to transport the first end user 12a. In some embodiments, the one or more notifications that may be transmitted to the one or more end user devices 14 may indicate a transport rate for the first end user 12a or for the second end user 12b that is as a result of the first end user 12a being assigned to be transported by the identified transportation vehicle unit 20a.

The above described example of the real-time carpooling coordinating system 10* arranging the transport of a first end user 12a by a transportation vehicle unit 20a (which is already en route to or is already transporting a second end user 12b not affiliated with the first end user 12a) may be executed in real-time. That is, to have for example the first end user 12a be picked-up by the carpooling vehicle (e.g., transportation vehicle unit 20a) within a small time window, such as within a 15 minute time window, which starts at a point in time when the first end user 12a initially submits a request for transport by a carpooling vehicle.

Figure 4A:
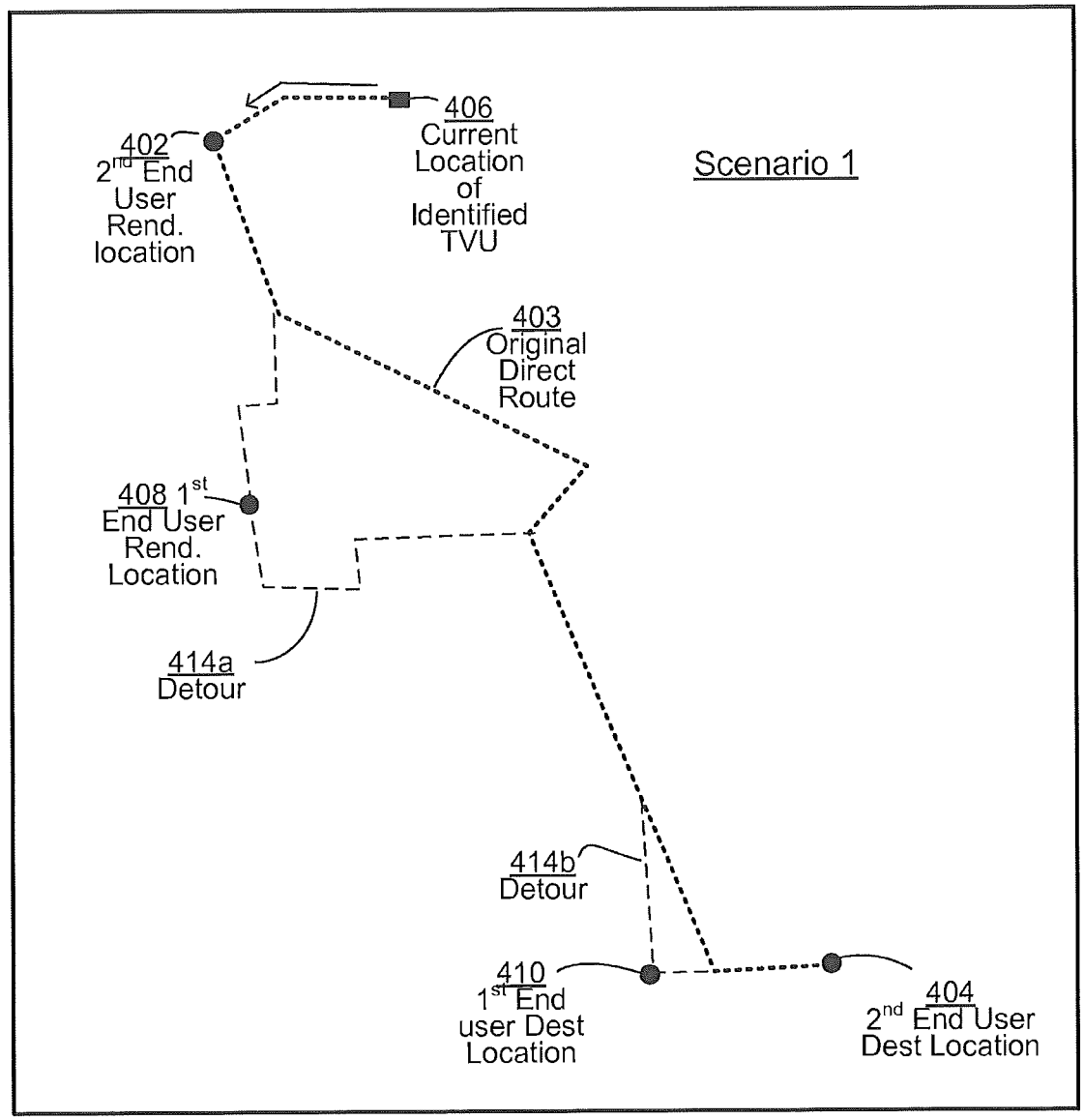
FIG. 4A illustrates an exemplary route that an example transportation vehicle unit 20a of FIG. 1 may use in order to transport carpooling passengers.

Turning now to FIGS. 4A to 4D, which illustrate various routes that the identified/selected transportation vehicle unit 20a of FIG. 1 may use in order to transport the first end user 12a and the second end user 12b to their destination(s) (e.g., destination location(s)) for different example scenarios (e.g., scenario 1, scenario 2, scenario 3, and scenario 4). These scenarios may better facilitate understanding of the various concepts to be introduced with respect to the various operations and processes to be described herein. Referring particularly now to FIG. 4A, which illustrates a route that the selected transportation vehicle unit 20a of FIG. 1 may take in order to transport the first end user 12a and the second end user 12b to their destination locations (e.g., 1.sup.st end user destination location 410 and 2.sup.nd end user destination location 404) in accordance with scenario 1. In scenario 1, the transportation vehicle unit 20a (e.g., "identified" transportation vehicle unit or "identified TVU") is en route to rendezvous with the second end user 12b at a second end user rendezvous location 402 when it is identified for transport of the first end user 12a.

As illustrated, the identified TVU is depicted as being currently located at current location 406 when it is selected/identified for transport of the first end user 12a. FIG. 4A further illustrates an original direct route 403 that the identified TVU (e.g., transportation vehicle unit 20a of FIG. 1) could have taken to transport the second end user 12b from the second end user rendezvous location 402 to a second end user destination location 404 if the identified TVU was not selected/identified for transporting the first end user 12a. However, because the identified TVU is selected to transport the first end user 12a, the identified TVU must take detour 414a in order to secure the first end user 12a from first end user rendezvous location 408 and take detour 414b to drop off the first end user 12a at a first end user destination location 410. As a result, the second end user 12b may be delayed in being transported to his/her destination location (e.g., second end user destination location 404). In various embodiments, the transport of the first end user 12a by the identified TVU may be permitted so long as the delay in transporting the second end user 12b is permitted by the second end user 12b and/or permitted by a third party such as a ridesharing company associated with the real-time carpooling coordinating system 10*.

Figure 4B:
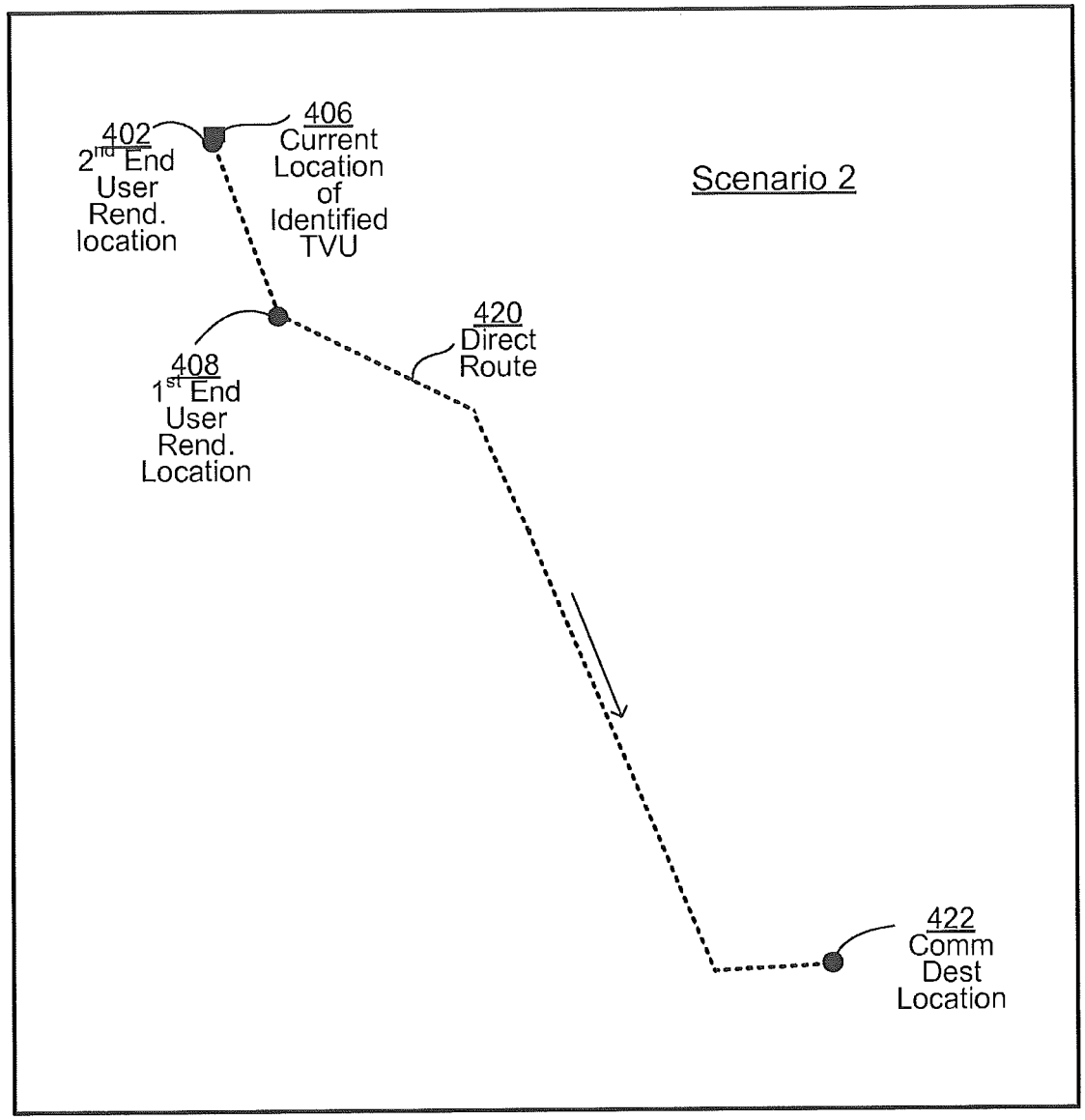
FIG. 4B illustrates another exemplary route that the example transportation vehicle unit 20a of FIG. 1 may use in order to transport carpooling passengers.

Turning now to FIG. 4B, which illustrates a scenario 2 in which the identified TVU (e.g., the identified transportation vehicle unit 20a of FIG. 1) uses a particular route (e.g., direct route 420) to transport the first end user 12a and the second end user 12b to a common destination location 422. In contrast to scenario 1 illustrated in FIG. 4A, in scenario 2 both the first end user 12a and the second end user 12b are scheduled to go to the same destination (e.g., common destination location 422). Further, the first end user rendezvous location 408 for rendezvousing with the first end user 12a is located along the direct route 420 for transporting the second end user 12b from a second end user rendezvous location 402 to the second end user's destination location (e.g., common destination location 422). In FIG. 4B, the identified TVU is currently located, at a point in time when the identified TVU (e.g., transportation vehicle unit 20a) is identified/selected for transport of the first end user 12a, at current location 406 that is the same as the second end user rendezvous location 402. Thus, in scenario 2, the second end user 12b will not incur a significant delay because the first end user rendezvous location 408 is located along the direct route 420 and the first end user 12a is going to the same common destination location 422 as the second end user 12b. Scenario 2 reflects many true life situations. For example, scenario 2 may occur when a number of end users from the same general neighborhood are intent on attending the same sporting or concert event.

Figure 4C:
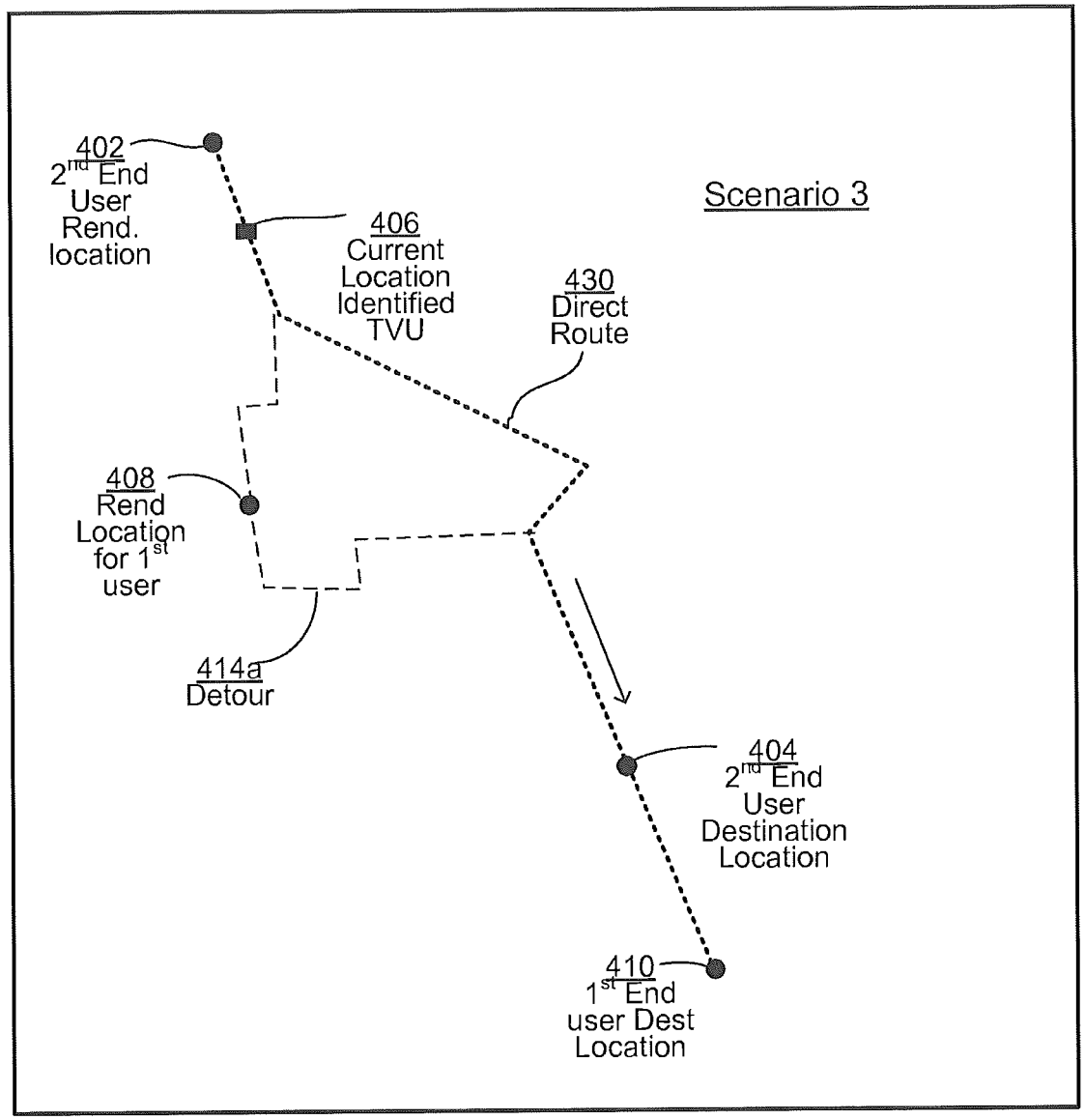
FIG. 4C illustrates another exemplary route that the example transportation vehicle unit 20a of FIG. 1 may use in order to transport carpooling passengers.

FIG. 4C illustrates a scenario 3 in which the identified TVU (e.g., the transportation vehicle unit 20a of FIG. 1) is already transporting the second end user 12b when the transportation vehicle unit 20a is selected/identified for transporting the first end user 12a. As illustrated, when the transportation vehicle unit 20a is selected/identified for transport of the first end user 12a, the identified TVU is located at current location 406 along the direct route 430 from the second end user rendezvous location 402 to the second end user destination location 404 (which continues on to first end user destination location 410). In order to transport the first end user 12a, the identified TVU uses a detour 414a to secure the first end user at rendezvous location 408. Note that in scenario 3, the first end user 12a is designated to be dropped off at first end user destination location 410, which is scheduled to occur after the second end user 12b has already been dropped off at a second end user destination location 404. Thus, the delay to transport of the second end user 12b to his or her destination location (e.g., second end user destination location 404) as a result of the transportation vehicle unit 20a transporting the first end user 12a may be relatively minimal. That is, the only delay to the transport of the second end user 12b may be as a result of the transportation vehicle unit 20a being rerouted to rendezvous with the first end user 12a at the rendezvous location 408 using detour 414a.

Figure 4D:
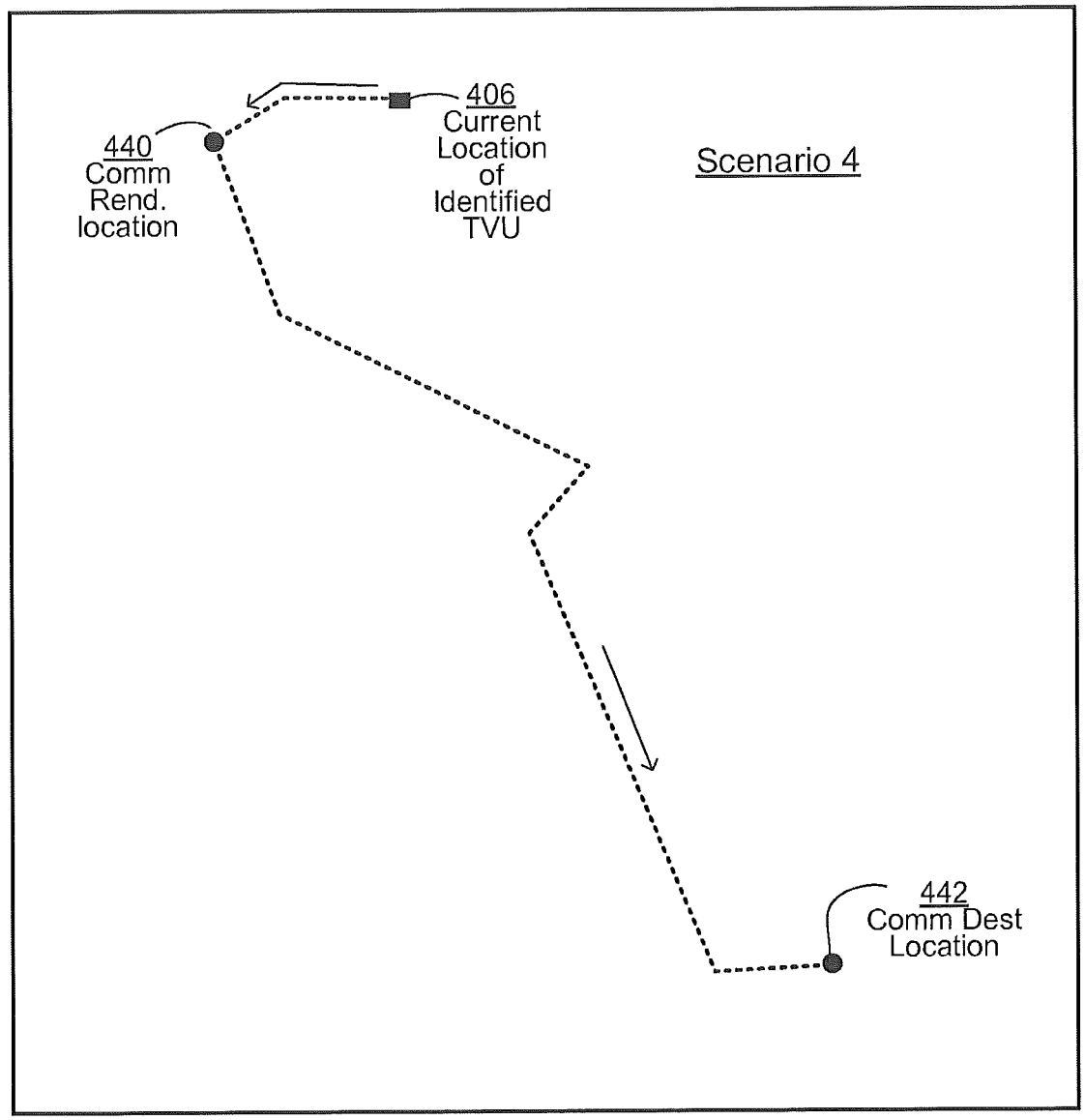
FIG. 4D illustrates another exemplary route that the example transportation vehicle unit 20a of FIG. 1 may use in order to transport carpooling passengers.

FIG. 4D illustrates a scenario 4 in which the identified TVU (e.g., the transportation vehicle unit 20a of FIG. 1) is to rendezvous with the first end user 12a and the second end user 12b at a common rendezvous location 440 and to transport the first end user 12a and the second end user 12b to a common destination location 442. Because there are no detours, there is little or no delay to transport of the second end user 12b to his/her destination (e.g., common destination location 442) except for any extended time that the transportation vehicle unit 20a may have to stay at the common rendezvous location 440 in order to wait for the arrival of the first end user 12a. There are several real life situations in which scenario can occur. For example, at the end of a sporting event such as at a football game and a number of the spectators leaving the stadium with the intent to go to a popular bar/nightclub.

Figure 2A:
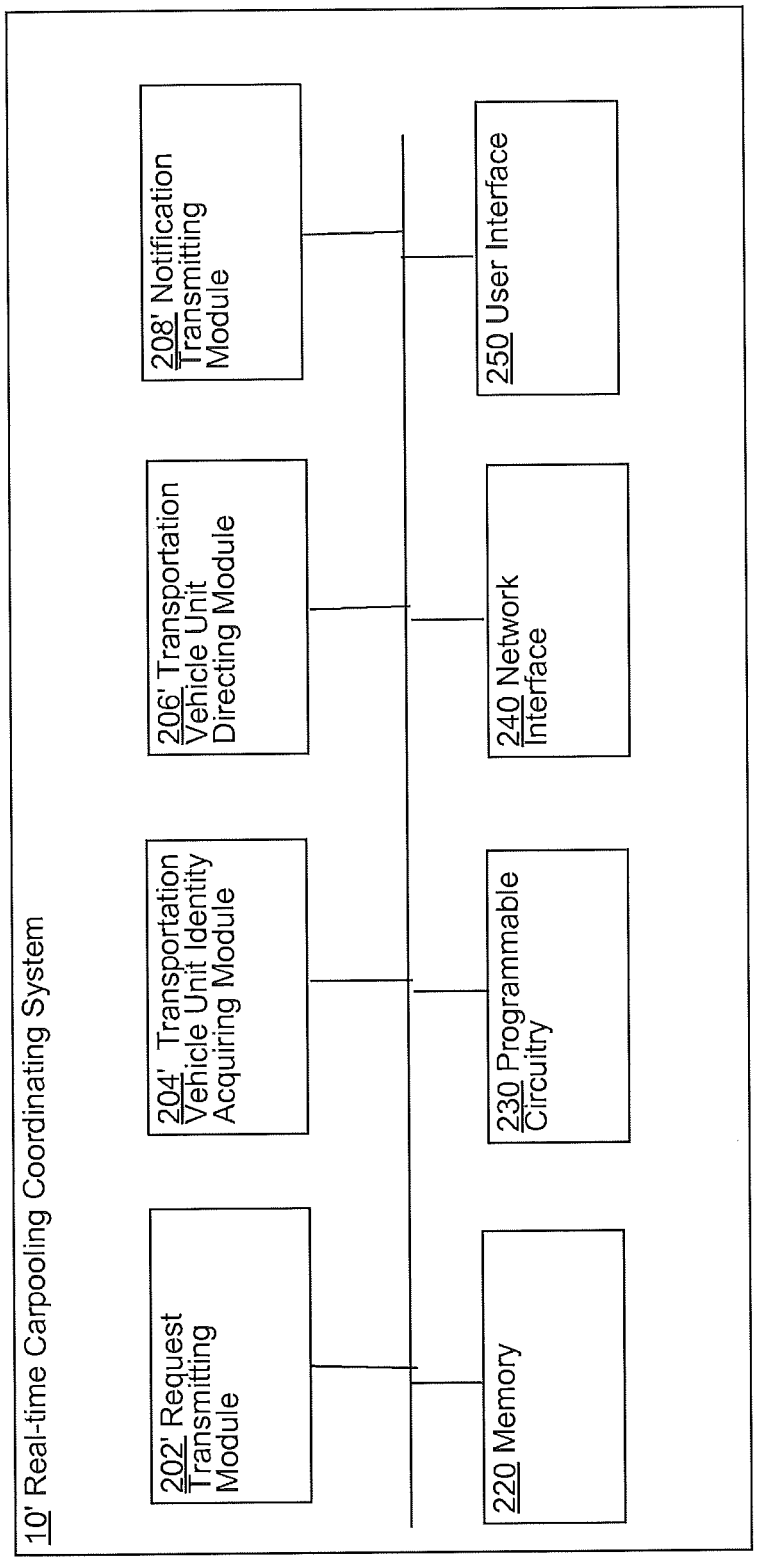
FIG. 2A shows a high-level block diagram of a particular implementation of the real-time carpooling coordinating system 10* of FIG. 1.
Figure 2B:
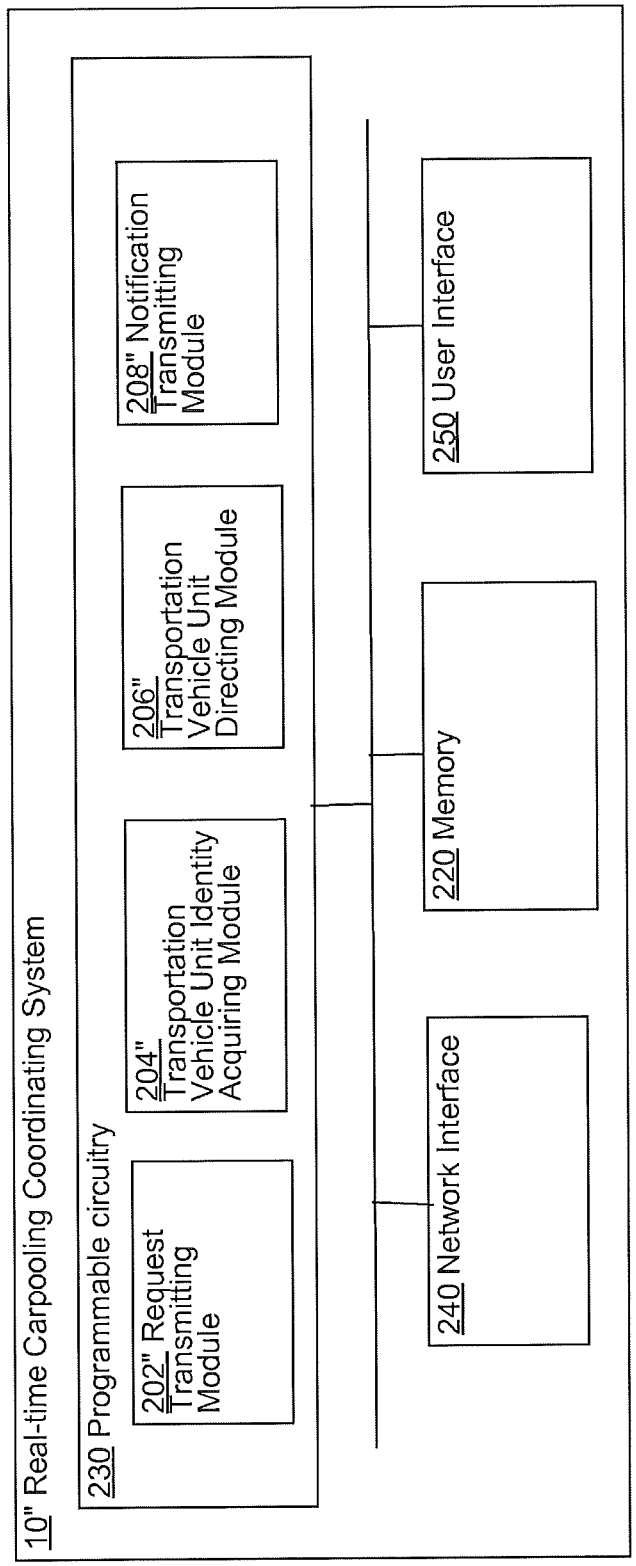
FIG. 2B shows another high-level block diagram of another implementation of the real-time carpooling coordinating system 10* of FIG. 1.

Referring now to FIGS. 2A and 2B, which illustrate two block diagrams representing two different implementations of the real-time carpooling coordinating system 10* of FIG. 1. In particular, and as will be further described herein, FIG. 2A illustrates a real-time carpooling coordinating system 10' that is the "hardwired" or "hard" implementation of the real-time carpooling coordinating system 10* that can implement the operations and processes to be described herein. The real-time carpooling coordinating system 10' includes certain logic modules including a request transmitting module 202', a transportation vehicle unit identity acquiring module 204', a transportation vehicle unit directing module 206', and a notification transmitting module 208' that are implemented using purely hardware or circuitry components (e.g., application specific integrated circuit (or ASIC). In contrast, FIG. 2B illustrates a real-time carpooling coordinating system 10" that is the "soft" implementation of the real-time carpooling coordinating system 10' of FIG. 2A in which certain logic modules including a request transmitting module 202", a transportation vehicle unit identity acquiring module 204", a transportation vehicle unit directing module 206", and a notification transmitting module 208" are implemented using programmable circuitry 230 (e.g., one or more processors such as one or more microprocessors, controllers, CPUs, GPUs, etc.) executing one or more programming instructions (e.g., software).

The embodiments of the real-time carpooling coordinating system 10* illustrated in FIGS. 2A and 2B (e.g., the real-time carpooling coordinating system 10' of FIG. 2A and the real-time carpooling coordinating system 10" of FIG. 2B) are two extreme implementations of the real-time carpooling coordinating system 10* of FIG. 1 in which all of the logic modules (e.g., the request transmitting module 202', the transportation vehicle unit identity acquiring module 204', the transportation vehicle unit directing module 206', and the notification transmitting module 208') are implemented using purely hardware solutions (e.g., circuitry such as ASIC) as illustrated in FIG. 2A or in which all of the logic modules (e.g., the request transmitting module 202", the transportation vehicle unit identity acquiring module 204", the transportation vehicle unit directing module 206", and the notification transmitting module 208") are implemented using software solutions (e.g., programmable instructions being executed by programmable circuitry 230 such as field programmable gate array (FPGA) or one or more processors) as illustrated in FIG. 2B. Since there are many ways of combining hardware, software, and/or firmware in order to implement the various logic modules (e.g., the request transmitting module 202*, the transportation vehicle unit identity acquiring module 204*, the transportation vehicle unit directing module 206*, and the notification transmitting module 208*), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry 230 such as one or more processors 230 (or FPGAs) are still needed in order to execute the software. Further details related to the two implementations of real-time carpooling coordinating system 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the real-time carpooling coordinating system 10', in addition to the request transmitting module 202', the transportation vehicle unit identity acquiring module 204', the transportation vehicle unit directing module 206', and the notification transmitting module 208' may further include programmable circuitry 230 (e.g., microprocessors, controllers, and so forth), a network interface 240 (network interface card or NIC), a user interface 250 (e.g., a display monitor and/or speakers) and/or memory 220. In various embodiments, memory 220 may comprise of volatile and/or non-volatile memory. In some embodiments, memory 220 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including data indicating end user preferences, vehicle characteristics including whether a particular vehicle is designated as a carpooling or non-carpooling vehicle, transport rates, vehicle statuses (e.g., whether a particular transportation vehicle unit 20* is currently on a run or is available for new pickups), and so forth.

Turning now to FIG. 2B, which illustrates a real-time carpooling coordinating system 10" in which certain logic modules (the request transmitting module 202", the transportation vehicle unit identity acquiring module 204", the transportation vehicle unit directing module 206", and the notification transmitting module 208") are implemented using programmable circuitry 230. In addition, the real-time carpooling coordinating system 10" may further include a memory 220 (which may include programming instructions to execute the various logic modules), a user interface 250, and a network interface 240 similar to the real-time carpooling coordinating system 10' of FIG. 2A.

In various embodiments the request transmitting module 202* of FIG. 2A or 2B (e.g., the request transmitting module 202' of FIG. 2A or the request transmitting module 202" of FIG. 2B) may be configured to, among other things, transmit a request for one or more identities of a transportation vehicle unit 20* for transporting a first end user 12a. In contrast, the transportation vehicle unit identity acquiring module 204* of FIG. 2A or 2B (e.g., the transportation vehicle unit identity acquiring module 204' of FIG. 2A or the transportation vehicle unit identity acquiring module 204" of FIG. 2B) may be configured to, among other things, receive or acquire the one or more identities of the transportation vehicle unit 20a for transporting the first end user 12a, the transportation vehicle unit 20a currently en route to or is currently transporting a second end user 12b and having been identified based, at least in part, on a determination that the transportation vehicle unit 20a is able to accommodate transport of the first end user 12a while transporting the second end user 12b. Meanwhile, the transportation vehicle unit directing module 206* of FIG. 2A or 2B (e.g., the transportation vehicle unit directing module 206' of FIG. 2A or the transportation vehicle unit directing module 206" of FIG. 2B) may be configured to, among other things, direct the identified transportation vehicle unit 20a to rendezvous with the first end user 12a in order to transport the first end user 12a. On the other hand, the notification transmitting module 208* (e.g., the notification transmitting module 208' of FIG. 2A or the notification transmitting module 208" of FIG. 2B) may be configured to, among other things, transmit one or more end user devices 14 one or more notifications that provide a notification that the identified transportation vehicle unit 20a will be transporting the first end user 12a Referring now to FIG. 3A illustrating a particular implementation of the request transmitting module 202* (e.g., the request transmitting module 202' or the request transmitting module 202") of FIG. 2A or 2B. As illustrated, the request transmitting module 202* may include one or more sub-logic modules in various alternative implementations. For example, in various embodiments, the request transmitting module 202* may further include an end user request receiving module 301, a location data transmitting module 302, a preference data transmitting module 304, an image data transmitting module 306, a carpooling request transmitting module 308, and/or a non-carpooling vehicle availability determining module 310. Specific details related to the request transmitting module 202* as well as the above-described sub-modules of the request transmitting module 202* will be provided below with respect to the operations and processes to be described herein.

FIG. 3B illustrates a particular implementation of the transportation vehicle unit identity acquiring module 204* (e.g., the transportation vehicle unit identity acquiring module 204' or the transportation vehicle unit identity acquiring module 204") of FIG. 2A or 2B. As illustrated, the transportation vehicle unit identity acquiring module 204* may include one or more sub-logic modules in various alternative implementations. For example, in various embodiments, the transportation vehicle unit identity acquiring module 204* may further include a transportation vehicle unit confirming module 312, a transport rate acquiring module 314, and/or a transport rate generating module 315. Specific details related to the transportation vehicle unit identity acquiring module 204* as well as the above-described sub-modules of the transportation vehicle unit identity acquiring module 204* will be provided below with respect to the operations and processes to be described herein.

Referring now to FIG. 3C illustrating a particular implementation of the transportation vehicle unit directing module 206* (e.g., the transportation vehicle unit directing module 206' or the transportation vehicle unit directing module 206") of FIG. 2A or 2B. As illustrated, the transportation vehicle unit directing module 206* may include one or more sub-logic modules in various alternative implementations. For example, in various embodiments, the transportation vehicle unit directing module 206* may further include a directive transmitting module 316 and/or a transport rate data transmitting module 318. Specific details related to the transportation vehicle unit directing module 206* as well as the above-described sub-module of the transportation vehicle unit directing module 206* will be provided below with respect to the operations and processes to be described herein.

Figure 5:
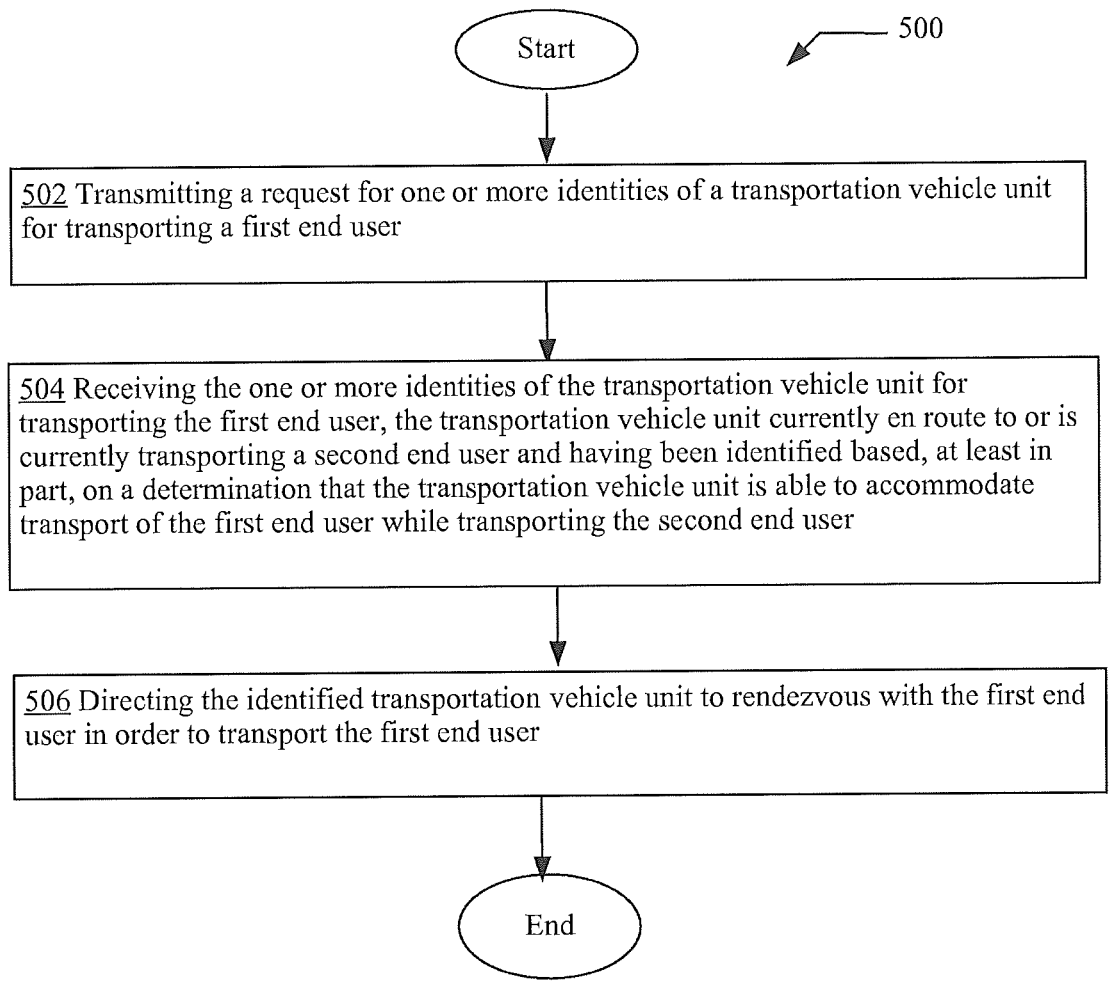
FIG. 5 is a high-level logic flowchart of a process, e.g., operational flow 500, according to some embodiments.

In the following, various operations associated with the above described real-time carpooling coordinating system 10* (e.g., the real-time carpooling coordinating system 10' of FIG. 2A or the real-time carpooling coordinating system 10" of FIG. 2B) will be presented in accordance with various alternative embodiments. FIG. 5, for example, illustrates an operational flow 500 representing example computationally-implemented operations that may be implemented for, among other things, receiving one or more identities of transportation vehicle unit 20* for transporting a first end user 12a, the transportation vehicle unit 20* currently en route to or is currently transporting a second end user 12b and having been identified based, at least in part, on a determination that the transportation vehicle unit 20* is able to accommodate transport of the first end user 12a while transporting the second end user 12b; and directing the identified transportation vehicle unit 20* to rendezvous with the first end user 12a in order to transport the first end user 12a.

In FIG. 5 and in the following figures that include various examples of operational flows, discussions and explanations will be provided with respect to the real-time carpooling coordinating system 10* described above and as illustrated in FIGS. 2A, 2B, 3A, 3B, and 3C, and/or with respect to other examples (e.g., as provided in FIGS. 1, 4A, 4B, 4C, and 4D) and contexts. However, it should be understood that the operational flows may be executed in a number of other environments and contexts, and/or in modified versions of FIGS. 1, 2A, 2B, 3A, 3B, 3C, 4A, 4B, 4C, and/or 4D. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a request transmitting operation 502 for transmitting a request for one or more identities of a transportation vehicle unit for transporting a first end user. For instance, and as illustration, the request transmitting module 202* of the real-time carpooling coordinating system 10* of FIG. 2A or 2B (e.g., the request transmitting module 202' of FIG. 2A or the request transmitting module 202" of FIG. 2B) transmitting a request for one or more identities of a transportation vehicle unit 20* for transporting a first end user 12*a*.

Operational flow 500 may also include a transportation vehicle unit identity receiving operation 504 for receiving the one or more identities of the transportation vehicle unit for transporting the first end user, the transportation vehicle unit currently en route to or is currently transporting a second end user and having been identified based, at least in part, on a determination that the transportation vehicle unit is able to accommodate transport of the first end user while transporting the second end user. For instance, the transportation vehicle unit identity acquiring module 204* (e.g., the transportation vehicle unit identity acquiring module 204' of FIG. 2A or the transportation vehicle unit identity acquiring module 204" of FIG. 2B) of the real-time carpooling coordinating system 10* of FIG. 2A or 2B receiving or acquiring the one or more identities of the transportation vehicle unit (e.g., transportation vehicle unit 20*a* of FIG. 1) for transporting the first end user 12*a*, the identified transportation vehicle unit (e.g., transportation vehicle unit 20*a*) to be identified currently en route to or is currently transporting a second end user 12*b* (e.g., the transportation vehicle unit 20*a* is traveling to a second end user rendezvous location to rendezvous with the second end user 12*b* or the second end user 12*b* has already been secured by the transportation vehicle unit 20*a*) and having been identified based, at least in part, on a determination (e.g., determination by the carpooling management system 16) that the transportation vehicle unit 20*a* is able to accommodate (e.g., has sufficient cabin space, is transporting the second end user 12*b* to a destination location that is near the destination location of the first end user 12*a*, transport of the first end user 12*a* meets end user preferences of the second end user 12*b*, and so forth) transport of the first end user 12*a* while transporting the second end user 12*b*.

As further illustrated in FIG. 5, operational flow 500 may further include a transportation vehicle unit directing operation 506 for directing the identified transportation vehicle unit to rendezvous with the first end user in order to transport the first end user. For instance, the transportation vehicle unit directing module 206* (e.g., the transportation vehicle unit directing module 206' of FIG. 2A or the transportation vehicle unit directing module 206" of FIG. 2B) of the real-time carpooling coordinating system 10* of FIG. 2A or 2B directing (e.g., instructing) the identified transportation vehicle unit 20*a* to rendezvous with (e.g., to meet with at a particular location) the first end user 12*a* in order to transport the first end user 12*a*.

Figure 6A:
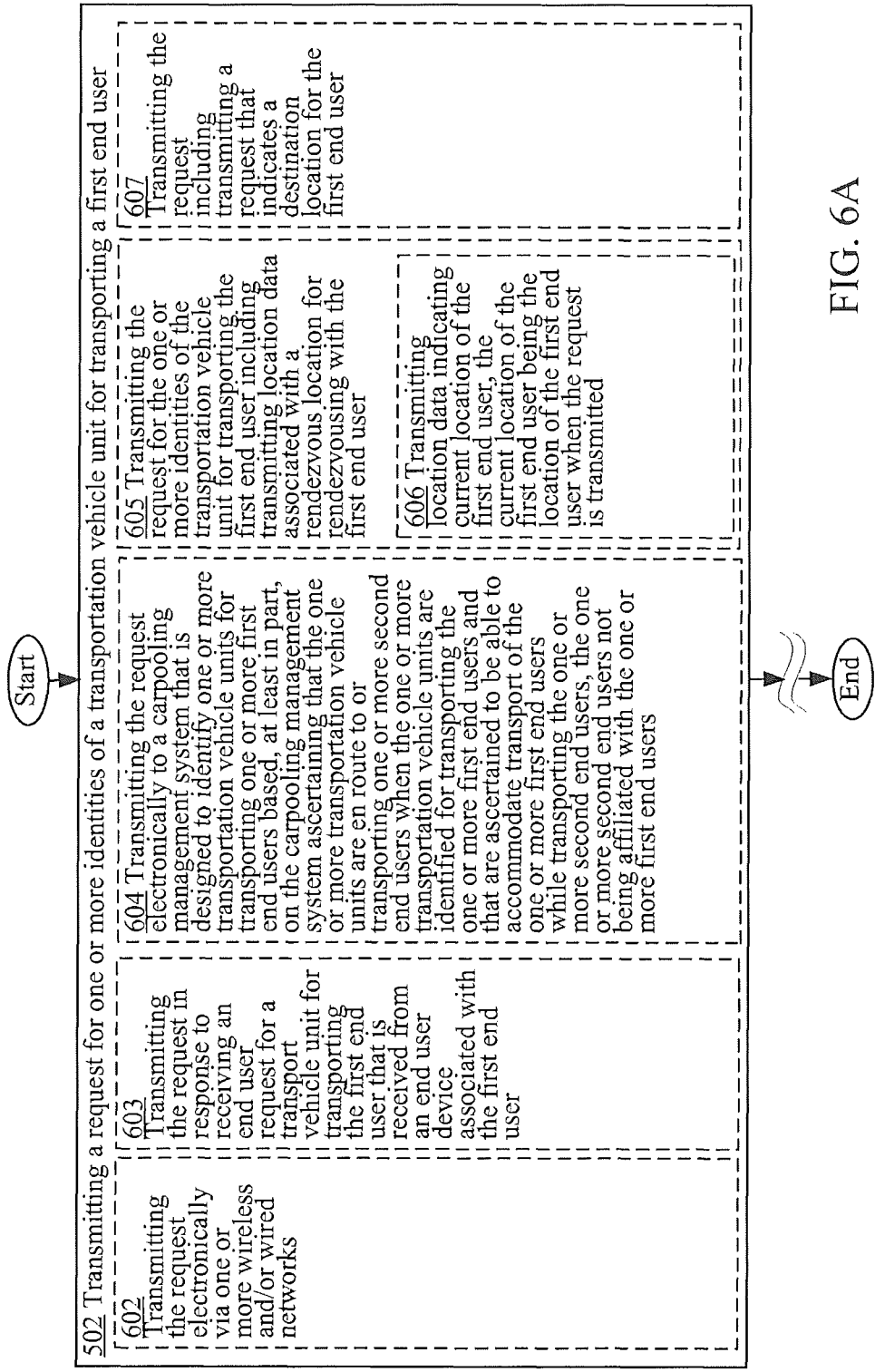
FIG. 6A is a high-level logic flowchart of a process depicting alternate implementations of the request transmitting operation 502 of FIG. 5.
Figure 6B:
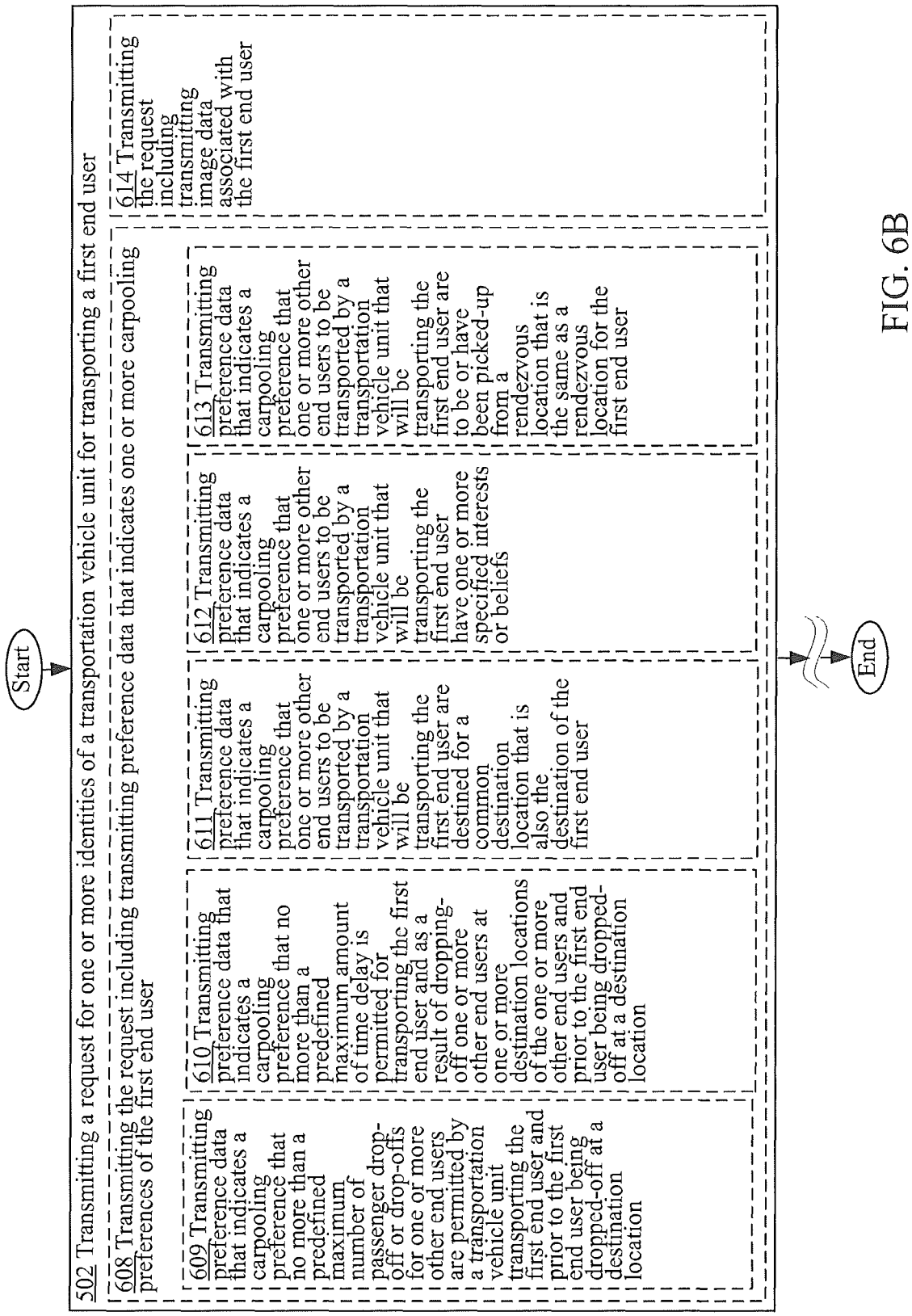
FIG. 6B is a high-level logic flowchart of a process depicting alternate implementations of the request transmitting operation 502 of FIG. 5.
Figure 6C:
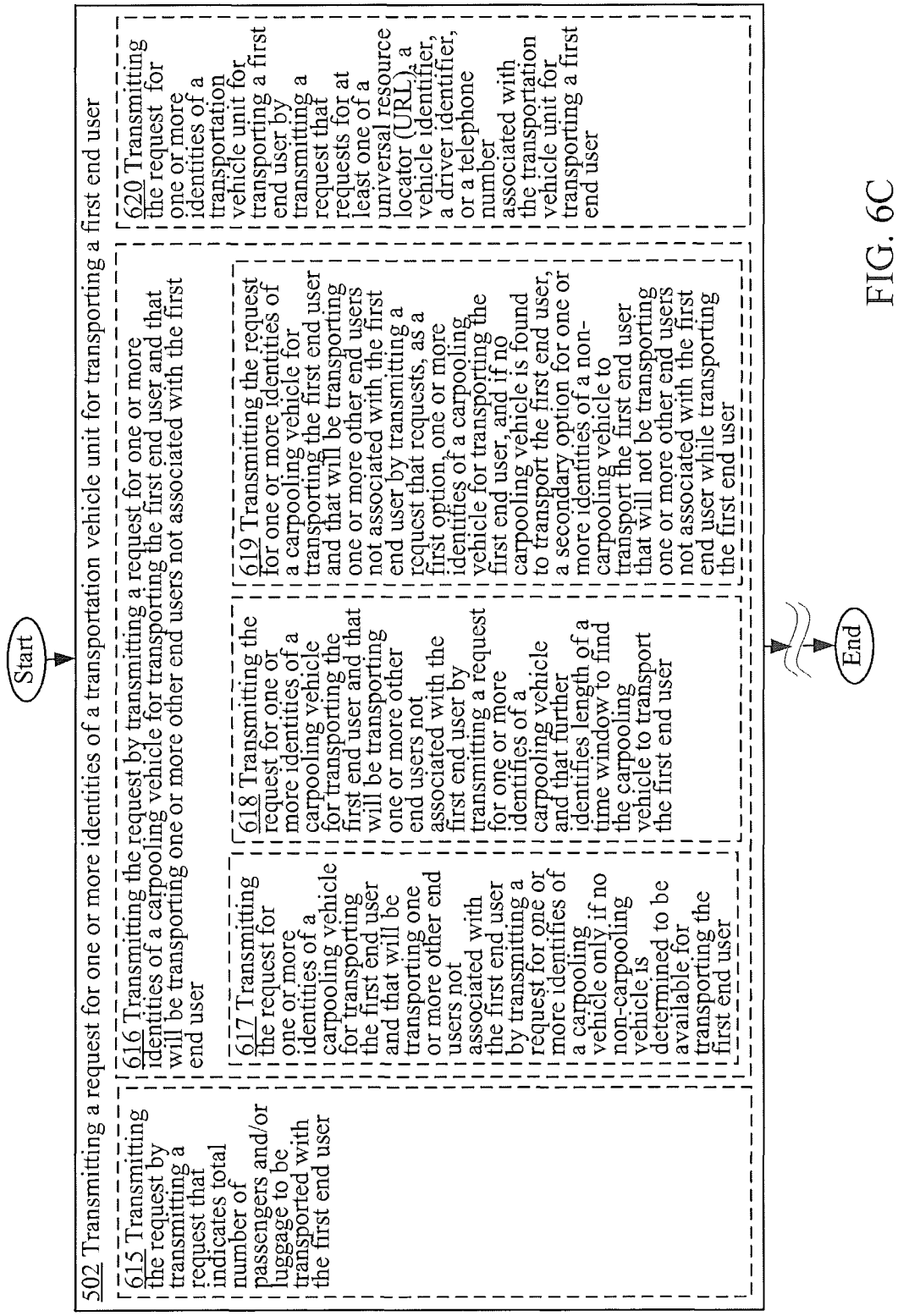
FIG. 6C is a high-level logic flowchart of a process depicting alternate implementations of the request transmitting operation 502 of FIG. 5.

As will be described below, the request transmitting operation 502, the transportation vehicle unit identity receiving operation 504, and the transportation vehicle unit directing operation 506 may be executed in a variety of different ways in various alternative implementations. FIGS. 6A, 6B, and 6C, for example, illustrate at least some of the alternative ways that the request transmitting operation 502 of FIG. 5 may be executed in various alternative implementations. In some cases, for example, the request transmitting operation 502 may include an operation 602 for transmitting the request electronically via one or more wireless and/or wired networks as illustrated in FIG. 6A. For instance, the request transmitting module 202* of the real-time carpooling coordinating system 10* (e.g., the real-time carpooling coordinating system 10' of FIG. 2A or the real-time carpooling coordinating system 10" of FIG. 2B) transmitting the request electronically via one or more wireless and/or wired networks 18 (e.g., cellular data network, WAN, WLAN, PTSN, Ethernet, and so forth).

In the same or alternative implementations, the request transmitting operation 502 may include an operation 603 for transmitting the request in response to receiving an end user request for a transport vehicle unit for transporting the first end user that is received from an end user device associated with the first end user. For instance, the request transmitting module 202* of the real-time carpooling coordinating system 10* of FIG. 2A or 2B transmitting the request in response to the end user request receiving module 301* (see FIG. 3A) receiving an end user request for a transport vehicle unit 20* for transporting the first end user 12*a* that is received from an end user device 14 associated with the first end user 12*a*.

In the same or alternative implementations, the request transmitting operation 502 may include an operation 604 for transmitting the request electronically to a carpooling management system that is designed to identify one or more transportation vehicle units for transporting one or more first end users based, at least in part, on the carpooling management system ascertaining that the one or more transportation vehicle units are en route to or transporting one or more second end users when the one or more transportation vehicle units are identified for transporting the one or more first end users and that are ascertained to be able to accommodate transport of the one or more first end users while transporting the one or more second end users, the one or more second end users not being affiliated with the one or more second end users. For instance, the request transmitting module 202* of the real-time carpooling coordinating system 10* of FIG. 2A or 2B transmitting the request electronically to a carpooling management system 16 that is designed to identify one or more transportation vehicle units 20* for transporting one or more first end users 12a (e.g., end users who are seeking transportation) based, at least in part, on the carpooling management system 16 ascertaining that the one or more transportation vehicle units 20* are en route to or transporting one or more second end users 12b (e.g., end users standing by at a rendezvous location to be picked-up or are already being transported) when the one or more transportation vehicle units 20* are identified for transporting the one or more first end users 12a and that are ascertained to be able to accommodate transport of the one or more first end users 12a while transporting the one or more second end users 12b, the one or more second end users 12b not being affiliated with the one or more first end users 12a (e.g., the one or more second end users 12b being strangers to and being completely independent of the one or more first end users 12a).

In the same or alternative implementations, the request transmitting operation 502 may include an operation 605 for transmitting the request for the one or more identities of the transportation vehicle unit for transporting the first end user including transmitting location data associated with a rendezvous location for rendezvousing with the first end user. For instance, the request transmitting module 202* including the location data transmitting module 302 (see FIG. 3A) of the real-time carpooling coordinating system 10* of FIG. 2A or 2B transmitting the request for the one or more identities of the transportation vehicle unit 20* for transporting the first end user 12a including transmitting location data associated with a rendezvous location for rendezvousing with the first end user 12a. In some cases, the rendezvous location may be a location that is requested by, for example, the first end user 12a for rendezvousing with a transportation vehicle unit 20a. In alternative embodiments, the rendezvous location may be the nearest street location (e.g., a street location where a transportation vehicle unit 20a is permitted to safely rendezvous with the first end user 12a) to the current location of the first end user 12a.

In some implementations, operation 605 may further include an operation 606 for transmitting location data indicating current location of the first end user, the current location of the first end user being the location of the first end user when the request is transmitted. For instance, the location data transmitting module 302) of the real-time carpooling coordinating system 10* of FIG. 2A or 2B transmitting location data (e.g., global positioning system (GPS) data) indicating current location of the first end user 12a, the current location of the first end user 12a being the location of the first end user 12a proximate to when the request is transmitted.

In the same or alternative implementations, the request transmitting operation 502 may alternatively or additionally include an operation 607 for transmitting the request including transmitting a request that indicates a destination location for the first end user. For instance, the request transmitting module 202* of the real-time carpooling coordinating system 10* of FIG. 2A or 2B transmitting the request including transmitting a request that indicates a destination location (e.g., the destination that the first end user 12a wishes to transported to) for the first end user 12a.

Referring to FIG. 6B, in the same or alternative implementations, the request transmitting operation 502 may alternatively or additionally include an operation 608 for transmitting the request including transmitting preference data that indicates one or more carpooling preferences or the first end user. For instance, the request transmitting module 202* including the preference data transmitting module 304 (see FIG. 3A) of the real-time carpooling coordinating system 10* of FIG. 2A or 2B transmitting (e.g., electronically transmitting to the carpooling management system 16) the request including transmitting preference data that indicates one or more carpooling preferences of the first end user 12a.

As further illustrated in FIG. 6B, operation 608 may further include one or more additional operations including, in some cases, an operation 609 for transmitting preference data that indicates a carpooling preference that no more than a predefined maximum number of passenger drop-off or drop-offs permitted by a transportation vehicle unit transporting the first end user and prior to the first end user being dropped-off at a destination location. For instance, the preference data transmitting module 304 of the real-time carpooling coordinating system 10* of FIG. 2A or 2B transmitting preference data that indicates a carpooling preference that no more than a predefined maximum number of passenger drop-off or drop-offs (e.g., one drop-off) for one or more other end users (e.g., one or more second end users 12b) are permitted by a transportation vehicle unit (e.g., transportation vehicle unit 20a) transporting the first end user 12a and prior to the first end user 12a being dropped-off at a destination location for the first end user 12a.

In the same or alternative implementations, operation 608 may alternatively or additionally include an operation 610 for transmitting preference data that indicates a carpooling preference that no more than a predefined amount of time delay permitted for transporting the first end user and as a result of dropping-off one or more other end users at one or more destination locations of the one or more other end users and prior to the first end user being dropped-off at a destination location. For instance, the preference data transmitting module 304 of the real-time carpooling coordinating system 10* of FIG. 2A or 2B transmitting preference data that indicates a carpooling preference that no more than a predefined amount of time delay (e.g., 15 minutes) is permitted for transporting the first end user 12a and as a result of dropping-off one or more other end users (e.g., one or more second end users 12b) at one or more destination locations of the one or more other end users and prior to the first end user 12a being dropped-off at a destination location. In some cases, the projected delay to dropping-off the first end user 12a may be calculated, for example, by estimating the time it would take to transport the first end user 12a to his destination if no extra stops are made for dropping-off other end users prior to dropping-off the first end user 12a and then determine the delta between that figure and the amount of time it will take to transport the first end user 12a to his destination if other end users will be dropped-off at their destination location(s) prior to the first end user 12a being dropped-off at his destination location. The determined delta will be the projected delay.

In the same or alternative implementations, operation 608 may alternatively or additionally include an operation 611 for transmitting preference data that indicates a carpooling preference that one or more other end users to be transported by a transportation vehicle unit that will be transporting the first end user are destined for a common destination location that is also the destination of the first end user. For instance, the preference data transmitting module 304 of the real-time carpooling coordinating system 10* of FIG. 2A or 2B transmitting preference data that indicates a carpooling preference that one or more other end users to be transported by a transportation vehicle unit (e.g., transportation vehicle unit 20a that will be transporting one or more other end user that are destined for a common destination location that is also the destination of the first end user 12a.) For example, prospective passengers leaving a sporting event such as a football game going to the same bar or arriving passengers at an airport wanting to go to the same hotel.

In the same or alternative implementations, operation 608 may alternatively or additionally include an operation 612 for transmitting preference data that indicates a carpooling preference that one or more other end users to be transported by a transportation vehicle unit that will be transporting the first end user have one or more specified interests or beliefs. For instance, the preference data transmitting module 304 of the real-time carpooling coordinating system 10* of FIG. 2A or 2B transmitting preference data that indicates a carpooling preference that that one or more other end users (e.g., one or more second end users 12b) to be transported by a transportation vehicle unit 20a that will be transporting the first end user 12a have one or more specified interests or beliefs (e.g., all end users to be transported by the transportation vehicle unit 20a transporting the first end user 12a should be fans of the NEW YORK JETS).

In the same or alternative implementations, operation 608 may alternatively or additionally include an operation 613 for transmitting preference data that indicates a carpooling preference that one or more other end users to be transported by a transportation vehicle unit that will be transporting the first end user are to be or have been picked-up from a rendezvous location that is the same as a rendezvous location for the first end user. For instance, the preference data transmitting module 304 of the real-time carpooling coordinating system 10* of FIG. 2A or 2B transmitting preference data that indicates a carpooling preference that one or more other end users (e.g., one or more second end users 12b) to be transported by a transportation vehicle unit 20a that will be transporting the first end user 12a are to be or have been picked-up from a rendezvous location that is the same as a rendezvous location for the first end user 12a. For example, after a football game, many people are leaving from the same location.

In the same or different implementations, the request transmitting operation 502 may additionally or alternatively include an operation 614 for transmitting the request including transmitting image data associated with the first end user. For instance, the request transmitting module 202* including the image data transmitting module 306 (see FIG. 3A) of the real-time carpooling coordinating system 10* of FIG. 2A or 2B transmitting the request including transmitting, by the image data transmitting module 306, image data (e.g., facial image data) associated with the first end user 12a.

Turning to FIG. 6C, in various implementations, the request transmitting operation 502 may include an operation 615 for transmitting the request by transmitting a request that indicates total number of passengers and/or luggage to be transported with the first end user. For instance, the request transmitting module 202* of the real-time carpooling coordinating system 10* of FIG. 2A or 2B transmitting the request by transmitting a request that indicates total number of passengers and/or luggage to be transported with the first end user 12a.

In the same or different implementations, the request transmitting operation 502 may additionally or alternatively include an operation 616 for transmitting the request by transmitting a request for one or more identities of a carpooling vehicle for transporting the first end user and that will be transporting one or more other end users not associated with the first end user. For instance, the request transmitting module 202* including the carpooling request transmitting module 308 (see FIG. 3A) of the real-time carpooling coordinating system 10* of FIG. 2A or 2B transmitting the request when the carpooling request transmitting module 308 transmits a request for one or more identities of a carpooling vehicle for transporting the first end user 12a and that will be transporting one or more other end users not associated or affiliated with the first end user 12a.

As further illustrated in FIG. 6C, in various alternative implementations, operation 616 may include one or more additional operations including, in some cases, an operation 617 for transmitting the request for one or more identities of a carpooling vehicle for transporting the first end user and that will be transporting one or more other end users not associated with the first end user by transmitting a request for one or more identifies of a carpooling vehicle only if no non-carpooling vehicle is determined to be available for transporting the first end user. For instance, the carpooling request transmitting module 308 of the real-time carpooling coordinating system 10* of FIG. 2A or 2B transmitting the request for one or more identities of a carpooling vehicle for transporting the first end user 12a and that will be transporting one or more other end users not associated with the first end user 12a by transmitting a request for one or more identifies of a carpooling vehicle only if no non-carpooling vehicle is determined by, for example, non-carpooling vehicle availability determining module 310, to be available for transporting the first end user 12a. In some embodiments, "availability" in this context may be in reference to the carpooling vehicle having sufficient passenger space to accommodate the first end user 12a and/or is currently located near the current location of the first end user 12a.

In the same or alternative implementations, operation 616 may additionally or alternatively include an operation 618 for transmitting the request for one or more identities of a carpooling vehicle for transporting the first end user and that will be transporting one or more other end users not associated with the first end user by transmitting a request for one or more identifies of a carpooling vehicle and that further identifies length of a time window to find the carpooling vehicle to transport the first end user. For instance, the carpooling request transmitting module 308 of the real-time carpooling coordinating system 10* of FIG. 2A or 2B transmitting the request for one or more identities of a carpooling vehicle for transporting the first end user 12a and that will be transporting one or more other end users (e.g., one or more second end users 12b) not associated with the first end user 12a by transmitting a request for one or more identifies of a carpooling vehicle and that further identifies length of a time window (e.g., 5 minutes or less) to find the carpooling vehicle to transport the first end user 12a.

In the same or alternative implementations, operation 616 may additionally or alternatively include an operation 619 for transmitting the request for one or more identities of a carpooling vehicle for transporting the first end user and that will be transporting one or more other end users not associated with the first end user by transmitting a request that requests, as a first option, one or more identities of a carpooling vehicle for transporting the first end user, and if no carpooling vehicle is found to transport the first end user, a secondary option for one or more identities of a non-carpooling vehicle to transport the first end user that will not be transporting one or more other end users not associated with the first end user while transporting the first end user. For instance, the carpooling request transmitting module 308 of the real-time carpooling coordinating system 10*  of FIG. 2A or 2B transmitting the request for one or more identities of a carpooling vehicle for transporting the first end user 12*a* and that will be transporting one or more other end users not associated with the first end user 12*a* by transmitting a request that requests, as a first option, one or more identities of a carpooling vehicle for transporting the first end user 12*a*, and if no carpooling vehicle is found (within a short predefined amount of time) to transport the first end user 12*a*, a secondary option for one or more identities of a non-carpooling vehicle to transport the first end user 12*a* that will not be transporting one or more other end users not associated with the first end user 12*a* while transporting the first end user 12*a*.

In the same or different implementations, the request transmitting operation 502 may additionally or alternatively include an operation 620 for transmitting the request for one or more identities of a transportation vehicle unit for transporting a first end user by transmitting a request that request for at least one of a universal resource locator (URL), a vehicle identifier, a driver identifier, or a telephone number associated with the transportation vehicle unit for transporting a first end user. For instance, the carpooling request transmitting module 308 of the real-time carpooling coordinating system 10*  of FIG. 2A or 2B transmitting the request for one or more identities of a transportation vehicle unit for transporting a first end user 12*a* by transmitting a request that requests for at least one of a universal resource locator (URL), a vehicle identifier, a driver identifier, or a telephone number associated with the transportation vehicle unit (e.g., transportation vehicle unit 20*a* of FIG. 1) for transporting a first end user 12*a*.

Figure 7A:
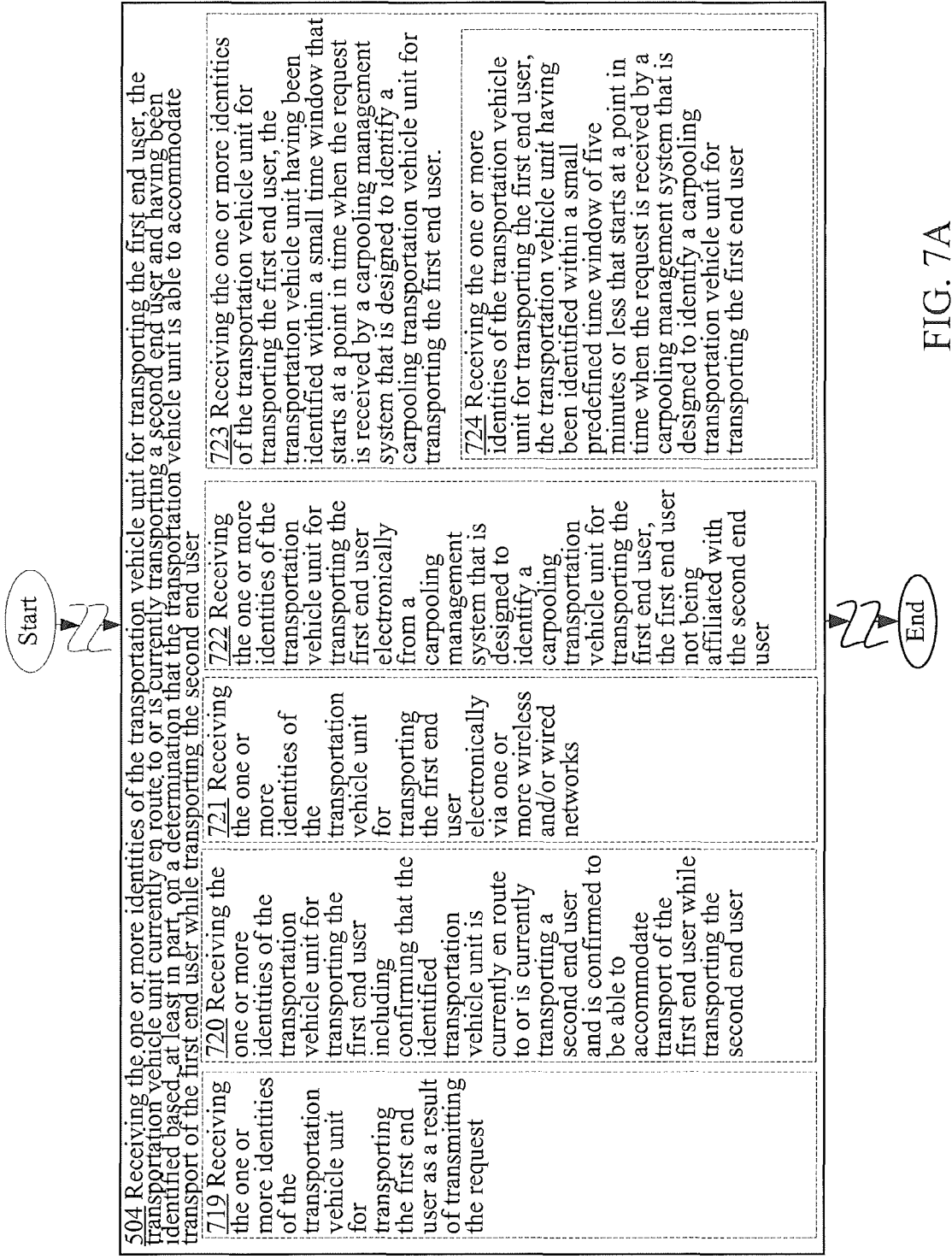
FIG. 7A is a high-level logic flowchart of a process depicting alternate implementations of the transportation vehicle unit identity receiving operation 504 of FIG. 5.

Referring back to the transportation vehicle unit identity receiving operation 504 of FIG. 5, the transportation vehicle unit identity receiving operation 504 similar to the request transmitting operation 502 of FIG. 5 may be executed in a number of different ways in various alternative embodiments as illustrated, for example, in FIGS. 7A, 7B, 7C, 7D, 7E, 7F, 7G, 7H, 7I, and 7J. In some cases, for example, the transportation vehicle unit identity receiving operation 504 may actually include an operation 719 for receiving the one or more identities of the transportation vehicle unit for transporting the first end user as a result of transmitting the request as illustrated in FIG. 7A. For instance, the transportation vehicle unit identity acquiring module 204*  of FIG. 2A or 2B receiving or acquiring the one or more identities of the transportation vehicle unit 20*a* for transporting the first end user 12*a* as a result of or in response to the request transmitting module 202*  transmitting the request.

In the same or alternative implementations, the transportation vehicle unit identity receiving operation 504 may include an operation 720 for receiving the one or more identities of the transportation vehicle unit for transporting the first end user including confirming that the identified transportation vehicle unit is currently en route to or is currently transporting a second end user and is confirmed to be able to accommodate transport of the first end user while transporting the second end user. For instance, the transportation vehicle unit identity acquiring module 204*  including the transportation vehicle unit confirming module 301 (see FIG. 3B) of FIG. 2A or 2B receiving or acquiring the one or more identities of the transportation vehicle unit 20*a* for transporting the first end user 12*a* including confirming, by the transportation vehicle unit confirming module 301, that the identified transportation vehicle unit is currently en route to or is currently transporting a second end user 12*b* and is confirmed to be able to accommodate transport of the first end user 12*a* while transporting the second end user 12*b*. That is, the real-time carpooling coordinating system 10*  in various embodiments may independently keep track of the current status of transportation vehicle units 20*  (including the status of the identified transportation vehicle unit 20*a*). Among the things that may be tracked include, for example, the current location of a transportation vehicle unit 20*, the passenger load of a transportation vehicle unit 20*, current trip assignment of a transportation vehicle unit 20*  (e.g., whether a transportation vehicle unit 20*  has already picked-up its passengers and is traveling to passenger destination(s)), carpooling preferences of passengers (e.g., end users) being already transported by a transportation vehicle unit 20*, and so forth.

In the same or alternative implementations, the transportation vehicle unit identity receiving operation 504 may include an operation 721 for receiving the one or more identities of the transportation vehicle unit for transporting the first end user electronically via one or more wireless and/or wired networks. For instance, the transportation vehicle unit identity acquiring module 204*  of the real-time carpooling coordinating system 10*  of FIG. 2A or 2B receiving or acquiring the one or more identities of the transportation vehicle unit 20*  for transporting the first end user 12*a* electronically via one or more wireless and/or wired networks 18.

In the same or alternative implementations, the transportation vehicle unit identity receiving operation 504 may include an operation 722 for receiving the one or more identities of the transportation vehicle unit for transporting the first end user electronically from a carpooling management system that is designed to identify a carpooling transportation vehicle unit for transporting the first end user, the first end user not being affiliated with the second end user. For instance, the transportation vehicle unit identity acquiring module 204*  of the real-time carpooling coordinating system 10*  of FIG. 2A or 2B receiving or acquiring the one or more identities of the transportation vehicle unit 20*a* for transporting the first end user 12*a* electronically from a carpooling management system 16 that is designed to identify a carpooling transportation vehicle unit (e.g., transportation vehicle unit 20*a*) for transporting the first end user 12*a*, the first end user 12*a* not being affiliated with the second end user 12*b*.

In the same or alternative implementations, the transportation vehicle unit identity receiving operation 504 may include an operation 723 for receiving the one or more identities of the transportation vehicle unit for transporting the first end user, the transportation vehicle unit having been identified within a small time window that starts at a point in time when the request is received by a carpooling management system that is designed to identify a carpooling transportation vehicle unit for transporting the first end user. For instance, the transportation vehicle unit identity acquiring module 204*  of the real-time carpooling coordinating system 10* of FIG. 2A or 2B receiving or acquiring the one or more identities of the transportation vehicle unit 20a for transporting the first end user 12a, the transportation vehicle unit 20a having been identified within a small time window (e.g., a time window of one minute or less) that starts at a point in time when the request is received by a carpooling management system 16 that is designed to identify a carpooling transportation vehicle unit for transporting the first end user 12a.

In some implementations, operation 723 may actually involve an operation 724 for receiving the one or more identities of the transportation vehicle unit for transporting the first end user, the transportation vehicle unit having been identified within a small predefined time window of five minutes or less that starts at a point in time when the request is received by a carpooling management system that is designed to identify a carpooling transportation vehicle unit for transporting the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified within a small predefined time window of five minutes or less (e.g., 5-minute time window) that starts at a point in time when the request is received by a carpooling management system 16 that is designed to identify a carpooling transportation vehicle unit (e.g., transportation vehicle unit 20a) for transporting the first end user 12a.

Figure 7B:
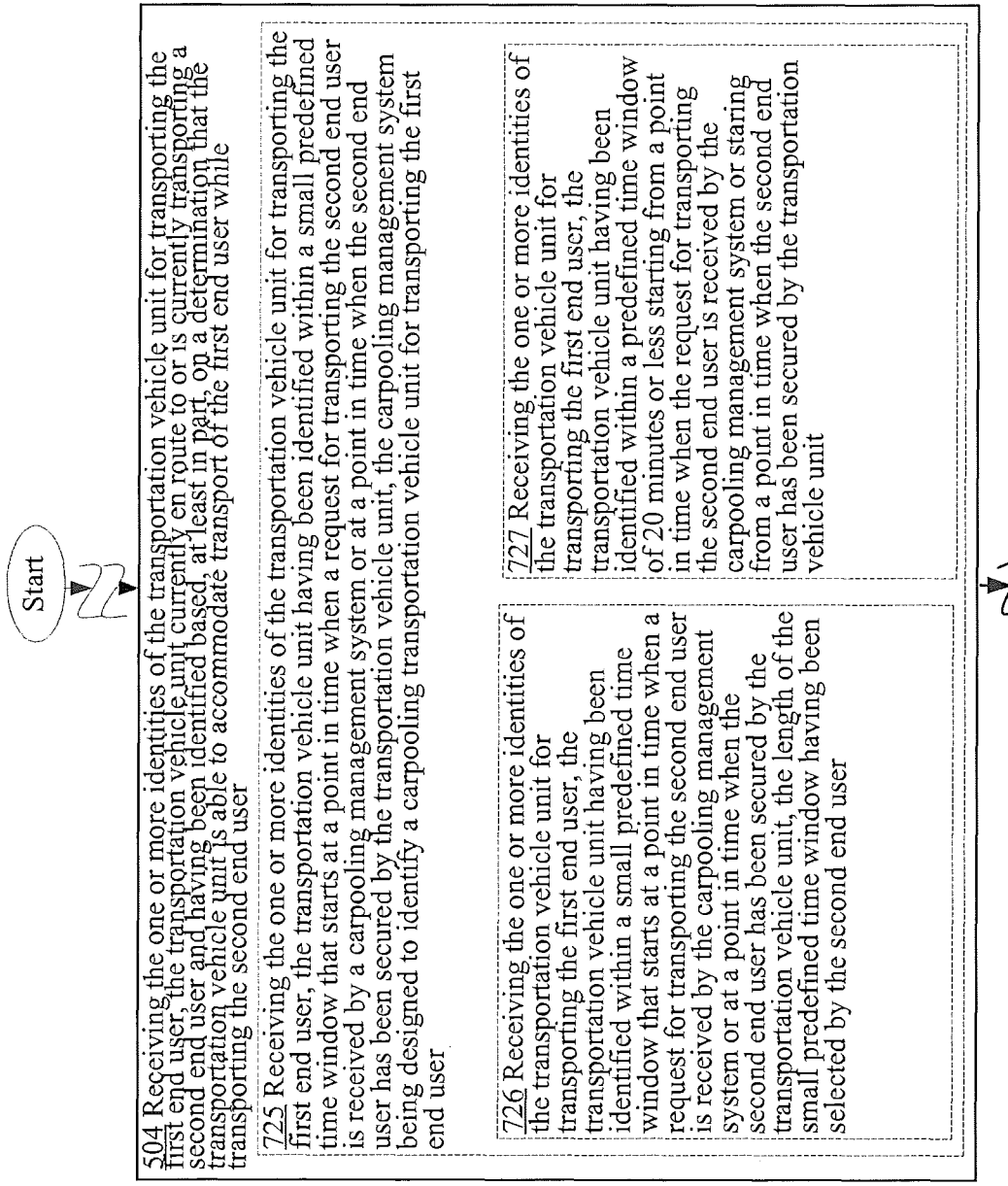
FIG. 7B is a high-level logic flowchart of a process depicting alternate implementations of the transportation vehicle unit identity receiving operation 504 of FIG. 5.

Turning now to FIG. 7B, in the same or alternative implementations, the transportation vehicle unit identity receiving operation 504 may include an operation 725 for receiving the one or more identities of the transportation vehicle unit for transporting the first end user, the transportation vehicle unit having been identified within a small predefined time window that starts at a point in time when a request for transporting the second end user is received by a carpooling management system or at a point in time when the second end user has been secured by the transportation vehicle unit, the carpooling management system being designed to identify a carpooling transportation vehicle unit for transporting the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) within a small predefined time window (e.g., a time window that is less than 30 seconds long) that starts at a point in time when a request for transporting the second end user 12b is received by a carpooling management system 16 or at a point in time when the second end user 12b has been secured by the transportation vehicle unit 20a, the carpooling management system 16 being designed to identify a carpooling transportation vehicle unit (e.g., transportation vehicle unit 20a) for transporting the first end user 12a.

In some cases, operation 725 may further include an operation 726 for receiving the one or more identities of the transportation vehicle unit for transporting the first end user, the transportation vehicle unit having been identified within a small predefined time window that starts at a point in time when a request for transporting the second end user is received by the carpooling management system or at a point in time when the second end user has been secured by the transportation vehicle unit, the length of the small predefined time window having been selected by the second end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) within a small predefined time window (e.g., time window of 1 minute or less) that starts at a point in time when a request for transporting the second end user 12b is received by the carpooling management system 16 or at a point in time when the second end user 12b has been secured by the transportation vehicle unit 20a, the length of the small predefined time window having been selected by the second end user 12b.

In the same or alternative implementations, the operation 725 may additionally or alternatively include an operation 727 for receiving the one or more identities of the transportation vehicle unit for transporting the first end user, the transportation vehicle unit having been identified within a predefined time window of 5 minutes or less starting from a point in time when the request for transporting the second end user is received by the carpooling management system or staring from a point in time when the second end user has been secured by the transportation vehicle unit. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified within a predefined time window of 20 minutes or less starting from a point in time when the request for transporting the second end user 12b is received by the carpooling management system 16 or staring from a point in time when the second end user 12b has been secured by the transportation vehicle unit 20a.

Figure 7C:
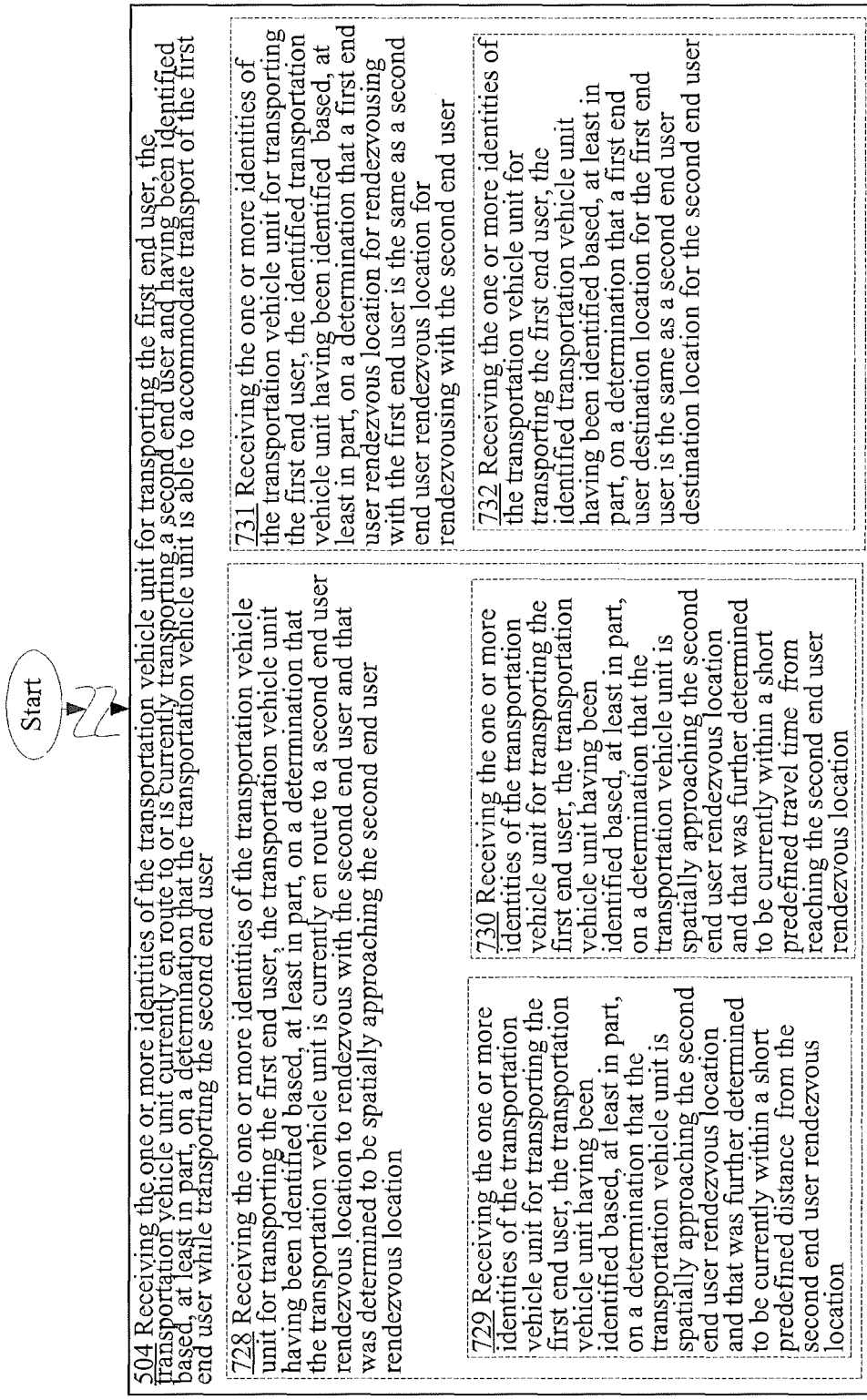
FIG. 7C is a high-level logic flowchart of a process depicting alternate implementations of the transportation vehicle unit identity receiving operation 504 of FIG. 5.

In the same or alternative implementations, the transportation vehicle unit identity receiving operation 504 may include an operation 728 for receiving the one or more identities of the transportation vehicle unit for transporting the first end user, the transportation vehicle unit having been identified based, at least in part, on a determination that the transportation vehicle unit is currently en route to a second end user rendezvous location to rendezvous with the second end user and that was determined to be spatially approaching the second end user rendezvous location as illustrated in FIG. 7C. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that the transportation vehicle unit 20a is currently (e.g., at the time of identification) en route to a second end user rendezvous location to rendezvous with the second end user 12b and that was determined to be spatially approaching the second end user rendezvous location. In some cases, the transportation vehicle unit confirming module 312 may confirm that the transportation vehicle unit 20a is, in fact, currently en route to the second end user rendezvous location to rendezvous with the second end user 12b based, for example, on location/status data provided by the transportation vehicle unit 20a. If there is no confirmation, then the real-time carpooling coordinating system 10* may transmit a request for one or more identities of an alternative transportation vehicle unit 20* for transporting the first end user 12a.

In some implementations, operation 728 may further include an operation 729 for receiving the one or more identities of the transportation vehicle unit for transporting the first end user, the transportation vehicle unit having been identified based, at least in part, on a determination that the transportation vehicle unit is spatially approaching the second end user rendezvous location and that was further determined to be currently within a short predefined distance from the second end user rendezvous location. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination that the transportation vehicle unit 20a is spatially approaching the second end user rendezvous location and that was further determined to be currently within a short predefined distance (e.g., within 2 miles) from the second end user rendezvous location. In some cases, the transportation vehicle unit confirming module 312 may confirm that the transportation vehicle unit 20a is, in fact, spatially approaching the second end user rendezvous location and that is currently within a short predefined distance from the second end user rendezvous location. If there is no confirmation, then the real-time carpooling coordinating system 10* may transmit a request for one or more identities of an alternative transportation vehicle unit 20* for transporting the first end user 12a.

In the same or alternative implementations, operation 728 may additionally or alternative include an operation 730 for receiving the one or more identities of the transportation vehicle unit for transporting the first end user, the transportation vehicle unit having been identified based, at least in part, on a determination that the transportation vehicle unit is spatially approaching the second end user rendezvous location and that was further determined to be currently within a short predefined travel time from reaching the second end user rendezvous location. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified based, at least in part, on a determination that the transportation vehicle unit 20a is spatially approaching the second end user rendezvous location and that was further determined to be currently within a short predefined travel time (e.g., within 10 minutes travel time) from reaching the second end user rendezvous location. In some cases, the transportation vehicle unit confirming module 312 may confirm that the transportation vehicle unit 20a is, in fact, spatially approaching the second end user rendezvous location and that is currently within a short predefined travel time (e.g., within 10 minutes travel time) from reaching the second end user rendezvous location. Again, if there is no confirmation, then the real-time carpooling coordinating system 10* may transmit a request for one or more identities of an alternative transportation vehicle unit 20* for transporting the first end user 12a.

In the same or alternative implementations, the transportation vehicle unit identity receiving operation 504 may include an operation 731 for receiving the one or more identities of the transportation vehicle unit for transporting the first end user, the identified transportation vehicle unit having been identified based, at least in part, on a determination that a first end user rendezvous location for rendezvousing with the first end user is the same as a second end user rendezvous location for rendezvousing with the second end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the identified transportation vehicle unit 20a having been identified (e.g., selected) based, at least in part, on a determination (e.g., as determined by the carpooling management system 16) that a first end user rendezvous location for rendezvousing with the first end user 12a is the same as a second end user rendezvous location for rendezvousing with the second end user 12b. In some cases, the transportation vehicle unit confirming module 312 may confirm that the first end user rendezvous location for rendezvousing with the first end user 12a is the same as the second end user rendezvous location for rendezvousing with the second end user 12b. If there is no confirmation, then the real-time carpooling coordinating system 10* may transmit a request for one or more identities of another transportation vehicle unit 20* for transporting the first end user 12a.

In some cases, operation 731 in turn may further include an operation 732 for receiving the one or more identities of the transportation vehicle unit for transporting the first end user, the identified transportation vehicle unit having been identified based, at least in part, on a determination that a first end user destination location for the first end user is the same as a second end user destination location for the second end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the identified transportation vehicle unit 20a having been identified (e.g., identified by the carpooling management system 16) based, at least in part, on a determination (e.g., as determined by the carpooling management system 16) that a first end user destination location for the first end user 12a is the same as a second end user destination location for the second end user 12b. In some cases, the transportation vehicle unit confirming module 312 may confirm that the first end user destination location for the first end user 12a is the same as the second end user destination location for the second end user 12b. If there is no confirmation, then the real-time carpooling coordinating system 10* may transmit a request for one or more identities of another transportation vehicle unit 20* for transporting the first end user 12a.

Figure 7D:
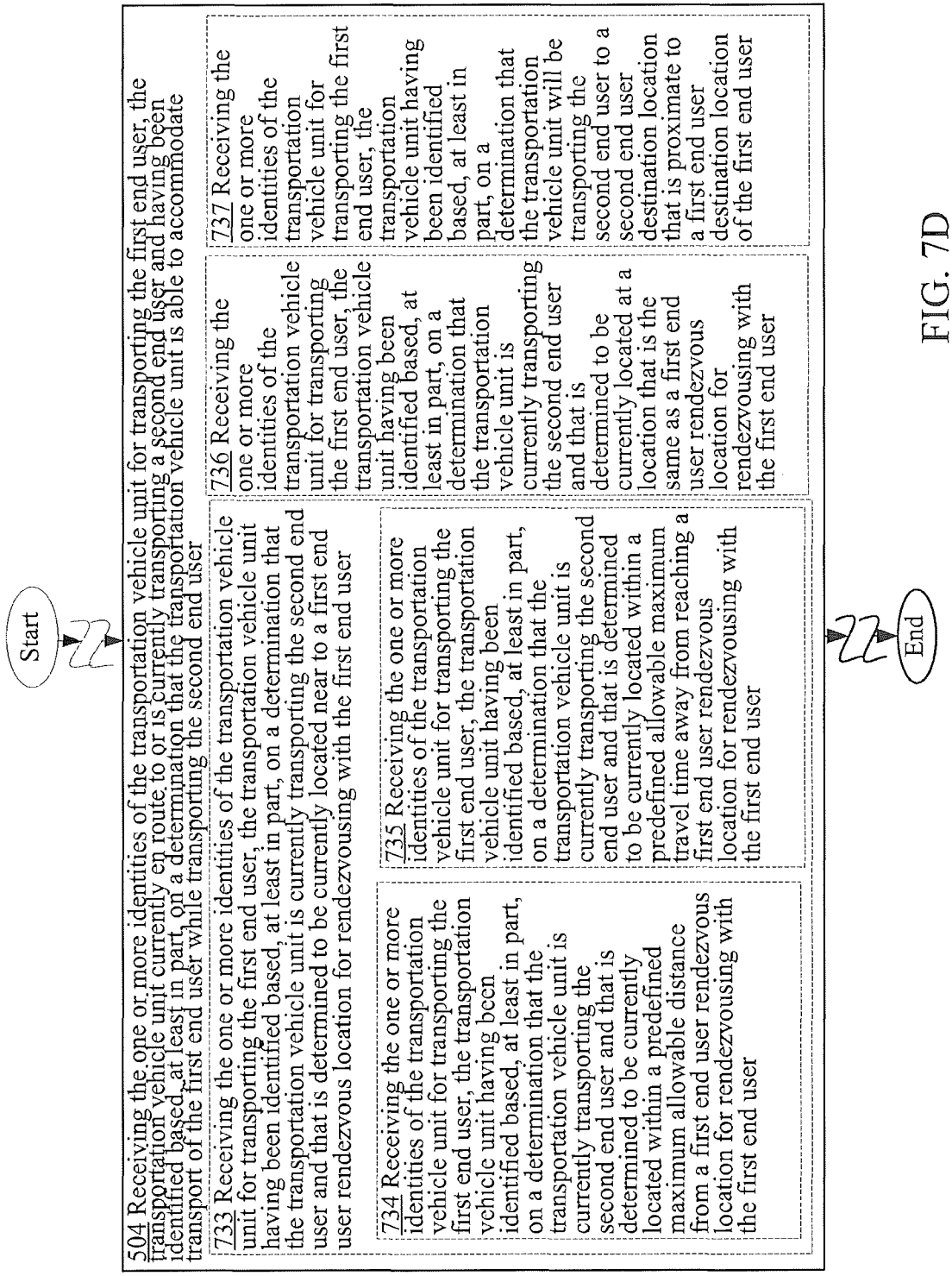
FIG. 7D is a high-level logic flowchart of a process depicting alternate implementations of the transportation vehicle unit identity receiving operation 504 of FIG. 5.

Turning now to FIG. 7D, in various implementations, the transportation vehicle unit identity receiving operation 504 may include an operation 733 for receiving the one or more identities of the transportation vehicle unit for transporting the first end user, the transportation vehicle unit having been identified based, at least in part, on a determination that the transportation vehicle unit is currently transporting the second end user and that is determined to be currently located near to a first end user rendezvous location for rendezvousing with the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that the transportation vehicle unit 20*a* is currently (e.g., at the time of the identification) transporting the second end user 12*b* and that is determined to be currently located near to a first end user rendezvous location for rendezvousing with the first end user 12*a*. In some cases, the transportation vehicle unit confirming module 312 may confirm that the transportation vehicle unit 20*a* is currently transporting the second end user 12*b* and that is currently located near to the first end user rendezvous location for rendezvousing with the first end user 12*a*. If there is no confirmation, then the real-time carpooling coordinating system 10* may transmit a request for one or more identities of another transportation vehicle unit 20* for transporting the first end user 12*a*.

In some implementations, operation 733 may further include an operation 734 for receiving the one or more identities of the transportation vehicle unit for transporting the first end user, the transportation vehicle unit having been identified based, at least in part, on a determination that the transportation vehicle unit is currently transporting the second end user and that is determined to be currently located within a predefined maximum allowable distance from a first end user rendezvous location for rendezvousing with the first end user. For instance, the transportation vehicle unit identity acquiring module 204* of the real-time carpooling coordinating system 10* of FIG. 2A or 2B receiving or acquiring the one or more identities of the transportation vehicle unit 20*a* for transporting the first end user 12*a*, the transportation vehicle unit 20*a* having been identified based, at least in part, on a determination (e.g., as determined by the carpooling management system 16) that the transportation vehicle unit 20*a* is currently transporting the second end user 12*b* and that is determined to be currently (e.g., at the time of the identification of the transportation vehicle unit 20*a*) located within a predefined maximum allowable distance (e.g., within 2 miles) from a first end user rendezvous location for rendezvousing with the first end user 12*a*. In some cases, the transportation vehicle unit confirming module 312 may confirm that the transportation vehicle unit 20*a* is currently transporting the second end user 12*b* and that is currently located within a predefined maximum allowable distance from the first end user rendezvous location for rendezvousing with the first end user 12*a*.

In the same or alternative implementations, operation 733 may additionally or alternatively include an operation 735 for receiving the one or more identities of the transportation vehicle unit for transporting the first end user, the transportation vehicle unit having been identified based, at least in part, on a determination that the transportation vehicle unit is currently transporting the second end user and that is determined to be currently located within a predefined allowable maximum travel time away from reaching a first end user rendezvous location for rendezvousing with the first end user. For instance, the transportation vehicle unit identity acquiring module 204* of the real-time carpooling coordinating system 10* of FIG. 2A or 2B receiving or acquiring the one or more identities of the transportation vehicle unit 20*a* for transporting the first end user 12*a*, the transportation vehicle unit 20*a* having been identified based, at least in part, on a determination (e.g., as determined by the carpooling management system 16) that the transportation vehicle unit 20*a* is currently transporting the second end user 12*b* and that is determined to be currently located within a predefined allowable maximum travel time (e.g., maximum of 15 minutes) away from reaching a first end user rendezvous location for rendezvousing with the first end user 12*a*. In some cases, the transportation vehicle unit confirming module 312 may confirm that the transportation vehicle unit 20*a* is currently transporting the second end user 12*b* and that is currently located within a predefined allowable maximum travel time away from a first end user rendezvous location for rendezvousing with the first end user 12*a*.

In various implementations, the transportation vehicle unit identity receiving operation 504 may include an operation 736 for receiving the one or more identities of the transportation vehicle unit for transporting the first end user, the transportation vehicle unit having been identified based, at least in part, on a determination that the transportation vehicle unit is currently transporting the second end user and that is determined to be currently located at a location that is the same as a first end user rendezvous location for rendezvousing with the first end user. For instance, the transportation vehicle unit identity acquiring module 204* of the real-time carpooling coordinating system 10* of FIG. 2A or 2B receiving or acquiring the one or more identities of the transportation vehicle unit 20*a* for transporting the first end user 12*a*, the transportation vehicle unit 20*a* having been identified based, at least in part, on a determination that the transportation vehicle unit 20*a* is currently (e.g., at the time of the identification) transporting the second end user 12*b* and that is determined to be currently located at a location that is the same as a first end user rendezvous location for rendezvousing with the first end user 12*a*. In some cases, the transportation vehicle unit confirming module 312 may confirm that the transportation vehicle unit 20*a* is currently transporting the second end user 12*b* and that is currently located at a location that is the same as a first end user rendezvous location for rendezvousing with the first end user 12*a*.

In some implementations, the transportation vehicle unit identity receiving operation 504 may include an operation 737 for receiving the one or more identities of the transportation vehicle unit for transporting the first end user, the transportation vehicle unit having been identified based, at least in part, on a determination that the transportation vehicle unit will be transporting the second end user to a second end user destination location that is proximate to a first end user destination location of the first end user. For instance, the transportation vehicle unit identity acquiring module 204* of the real-time carpooling coordinating system 10* of FIG. 2A or 2B receiving or acquiring the one or more identities of the transportation vehicle unit 20*a* for transporting the first end user 12*a*, the transportation vehicle unit 20*a* having been identified (e.g., identified by the carpooling management system 16) based, at least in part, on a determination that the transportation vehicle unit 20* will be transporting the second end user 12*b* to a second end user destination location that is proximate (e.g., within 2 miles) to a first end user destination location of the first end user 12*a*. In some cases, the transportation vehicle unit confirming module 312 may confirm that the transportation vehicle unit 20* will be transporting the second end user 12*b* to a second end user destination location that is proximate to the first end user destination location of the first end user 12*a*.

In some implementations, the transportation vehicle unit identity receiving operation 504 may include an operation 738 for receiving the one or more identities of the transportation vehicle unit for transporting the first end user, the transportation vehicle unit having been identified based, at least in part, on a determination that the transportation vehicle unit will be transporting the second end user to a second end user destination location that is the same as a first end user destination location of the first end user as illustrated in FIG. 7E. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that the transportation vehicle unit 20a will be transporting (e.g., scheduled to transport) the second end user 12b to a second end user destination location that is the same as a first end user destination location of the first end user 12a. In some cases, the transportation vehicle unit confirming module 312 may confirm that the transportation vehicle unit 20a will be transporting the second end user 12b to the second end user destination location that is the same as the first end user destination location of the first end user 12a.

In some implementations, the transportation vehicle unit identity receiving operation 504 may alternatively or additionally include an operation 739 for receiving the one or more identities of the transportation vehicle unit for transporting the first end user, the transportation vehicle unit having been identified based, at least in part, on a determination that the transportation vehicle unit has sufficient available space to transport the first end user while transporting the second end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that the transportation vehicle unit 20a has sufficient available passenger cabin and trunk space to transport the first end user 12a while transporting the second end user 12b. In some cases, the transportation vehicle unit confirming module 312 may confirm that the transportation vehicle unit 20a has sufficient available space to transport the first end user 12a while transporting the second end user 12b.

In the same or alternative implementations, the transportation vehicle unit identity receiving operation 504 may additionally or alternatively include an operation 740 for receiving the one or more identities of the transportation vehicle unit for transporting the first end user, the transportation vehicle unit having been identified based, at least in part, on a determination that transport of the first end user by the transportation vehicle unit will not significantly delay transport of the second end user to a second end user destination location. For instance, the transportation vehicle unit identity acquiring module 204* of the real-time carpooling coordinating system 10* of FIG. 2A or 2B receiving the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that transport of the first end user 12a by the transportation vehicle unit 20a will not significantly delay (e.g., 20 minutes delay) transport of the second end user 12b to a second end user destination location. In some cases, the transportation vehicle unit confirming module 312 may confirm that transport of the first end user 12a by the transportation vehicle unit 20a will not significantly delay the transport of the second end user 12b to a second end user destination location.

In some cases, operation 740 may further include an operation 741 for receiving the one or more identities of the transportation vehicle unit for transporting the first end user, the transportation vehicle unit having been identified based, at least in part, on a determination that transport of the first end user by the transportation vehicle unit will not add more than a predefined amount of permitted delay time for transporting the second end user to a second end user destination location, a delay time being an amount of additional time added to overall travel time for transporting the second end user to the second end user destination location as a result of transporting the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified based, at least in part, on a determination that transport of the first end user 12a by the transportation vehicle unit 20a will not add more than a predefined amount of permitted delay time (e.g., 15 minutes) for transporting the second end user 12b to a second end user destination location, a delay time being an amount of additional time added to overall travel time for transporting the second end user 12b to the second end user destination location as a result of transporting the first end user 12a.

In some cases, operation 741 may, in turn, further include an operation 742 for receiving the one or more identities of the transportation vehicle unit for transporting the first end user, the transportation vehicle unit having been identified based, at least in part, on a determination that transport of the first end user by the transportation vehicle unit will not add more than the predefined amount of permitted delay time for transporting the second end user to a second end user destination location, the predefined amount of permitted delay time being defined by the second end user and not being greater than 20 minutes. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified based, at least in part, on a determination that transport of the first end user 12a by the transportation vehicle unit 20a will not add more than the predefined amount of permitted delay time for transporting the second end user 12b to a second end user destination location, the predefined amount of permitted delay time being defined by the second end user 12b and not being greater than 20 minutes.

Figure 7F:
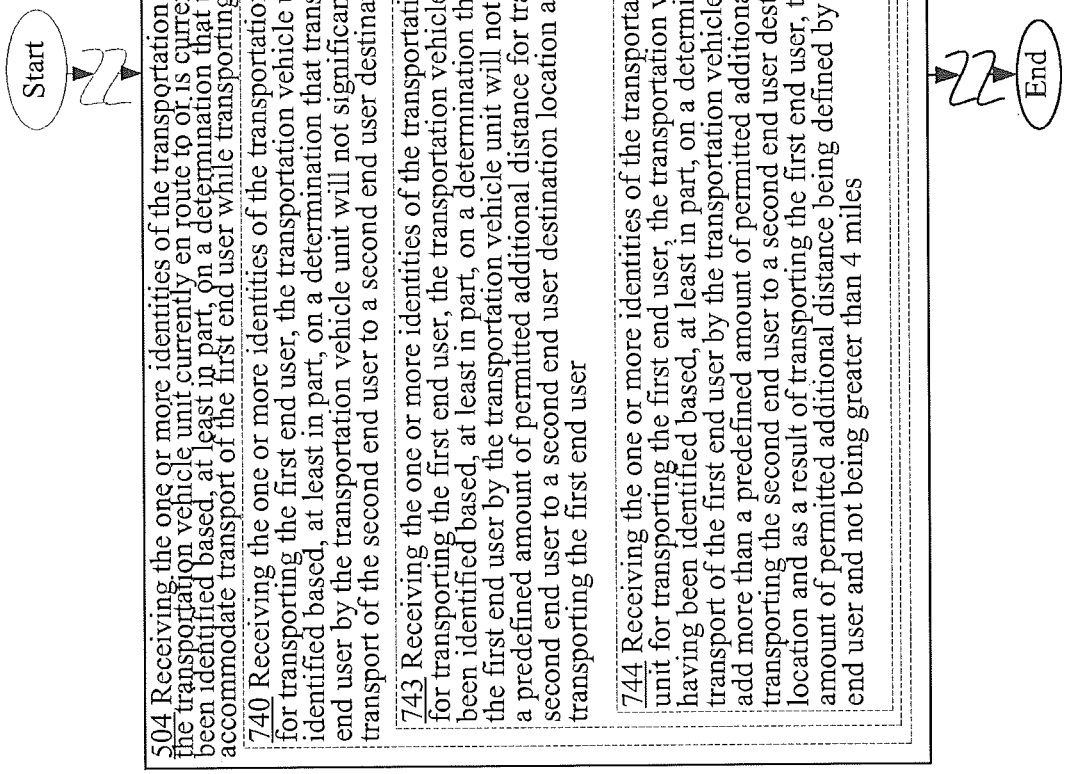
FIG. 7F is a high-level logic flowchart of a process depicting alternate implementations of the transportation vehicle unit identity receiving operation 504 of FIG. 5.

Turning now to FIG. 7F, in various implementations operation 740 may include an operation 743 for receiving the one or more identities of the transportation vehicle unit for transporting the first end user, the transportation vehicle unit having been identified based, at least in part, on a determination that transport of the first end user by the transportation vehicle unit will not add more than a predefined amount of permitted additional distance for transporting the second end user to a second end user destination location as a result of transporting the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified based, at least in part, on a determination that transport of the first end user 12a by the transportation vehicle unit 20a will not add more than a predefined amount of permitted additional distance (e.g., 3 miles) for transporting the second end user 12b to a second end user destination location as a result of the transportation vehicle unit 20a transporting the first end user 12a.

In some cases, operation 743 may in turn further include an operation 744 for receiving the one or more identities of the transportation vehicle unit for transporting the first end user, the transportation vehicle unit having been identified based, at least in part, on a determination that transport of the first end user by the transportation vehicle unit will not add more than a predefined amount of permitted additional distance for transporting the second end user to a second end user destination location and as a result of transporting the first end user, the predefined amount of permitted additional distance being defined by the second end user and not being greater than 4 miles. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified based, at least in part, on a determination that transport of the first end user 12a by the transportation vehicle unit 20a will not add more than a predefined amount of permitted additional distance for transporting the second end user 12b to a second end user destination location and as a result of transporting the first end user 12a, the predefined amount of permitted additional distance being defined by the second end user 12b and not being greater than 4 miles.

In the same or alternative implementations, the transportation vehicle unit identity receiving operation 504 may additionally or alternatively include an operation 745 for receiving the one or more identities of the transportation vehicle unit for transporting the first end user, the transportation vehicle unit having been identified based, at least in part, on a determination that transport of the first end user to a first end user destination location by the transportation vehicle unit will not result in the transportation vehicle unit to have a total number of passenger drop-offs that exceed a predefined number of maximum passenger drop-offs allowed for the transportation vehicle unit during one trip transporting a group of end users to one or more end user destination locations. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that transport of the first end user 12a to a first end user destination location by the transportation vehicle unit 20a will not result in the transportation vehicle unit 20a to have a total number of passenger drop-offs (e.g., passenger disembarking points) that exceed a predefined number of maximum passenger drop-offs allowed for the transportation vehicle unit 20a during one trip transporting a group of end users to one or more end user destination locations. In some cases, the transportation vehicle unit confirming module 312 may confirm that the transport of the first end user 12a to the first end user destination location by the transportation vehicle unit 20a will not result in the transportation vehicle unit 20a to have a total number of passenger drop-offs that exceed a predefined number of maximum passenger drop-offs allowed for the transportation vehicle unit 20a during one trip transporting a group of end users to one or more end user destination locations. If there is no confirmation, then the real-time carpooling coordinating system 10* may transmit a request for one or more identities of an alternative transportation vehicle unit 20* for transporting the first end user 12a.

Figure 7G:
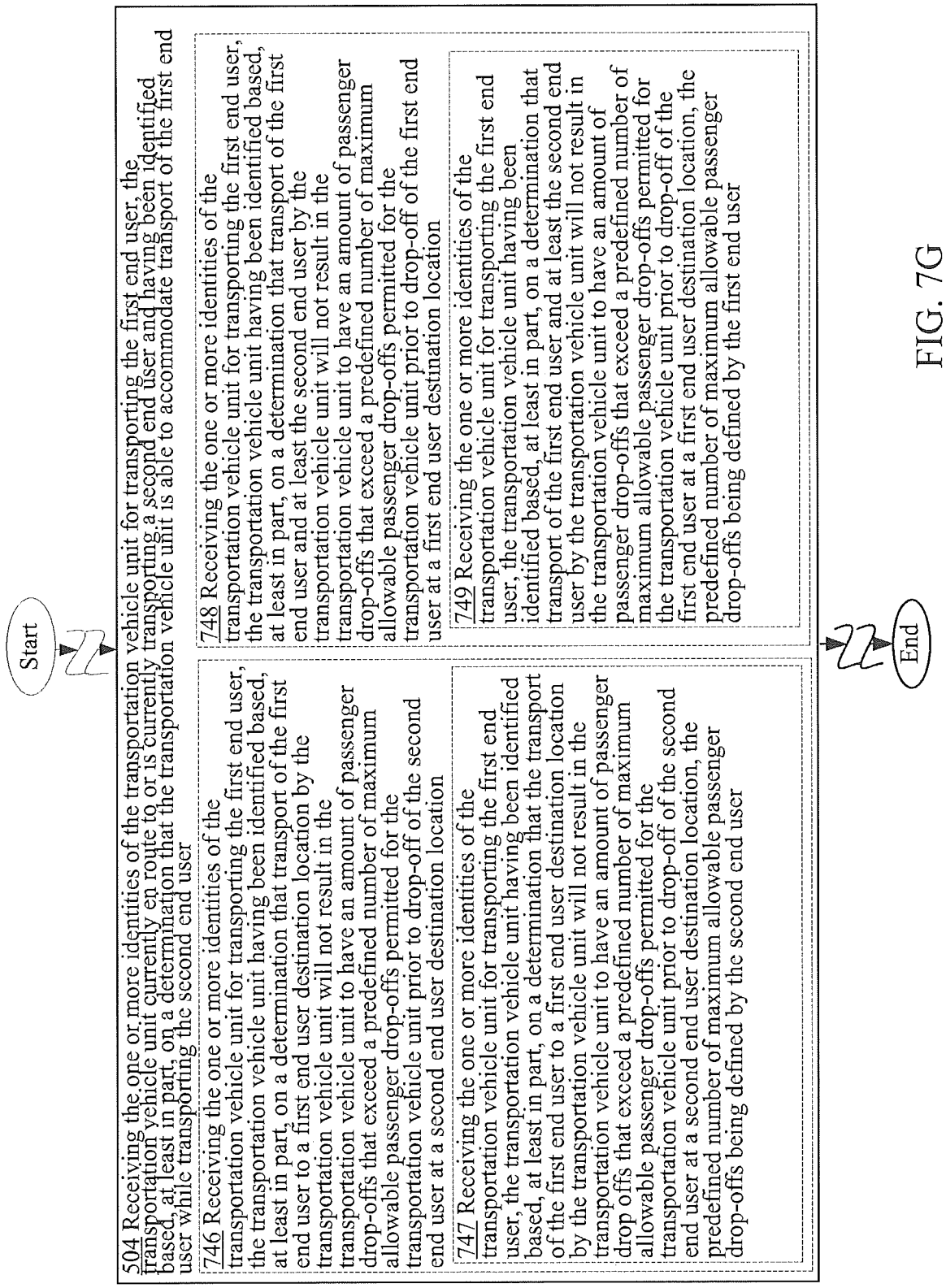
FIG. 7G is a high-level logic flowchart of a process depicting alternate implementations of the transportation vehicle unit identity receiving operation 504 of FIG. 5.

Referring now to FIG. 7G, in the same or alternative implementations, the transportation vehicle unit identity receiving operation 504 may additionally or alternatively include an operation 746 for receiving the one or more identities of the transportation vehicle unit for transporting the first end user, the transportation vehicle unit having been identified based, at least in part, on a determination that transport of the first end user to a first end user destination location by the transportation vehicle unit will not result in the transportation vehicle unit to have an amount of passenger drop-offs that exceed a predefined number of maximum allowable passenger drop-offs permitted for the transportation vehicle unit prior to drop-off of the second end user at a second end user destination location. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that transport of the first end user 12a to a first end user destination location by the transportation vehicle unit 20a will not result in the transportation vehicle unit 20a to have an amount of passenger drop-offs that exceed a predefined number of maximum allowable passenger drop-offs (e.g., two drop-offs) permitted for the transportation vehicle unit 20a prior to drop-off of the second end user 12b at a second end user destination location. In some cases, the transportation vehicle unit confirming module 312 may confirm that the transport of the first end user 12a to the first end user destination location by the transportation vehicle unit 20a will not result in the transportation vehicle unit 20a to have an amount of passenger drop-offs that exceed a predefined number of maximum allowable passenger drop-offs permitted for the transportation vehicle unit 20a prior to drop-off of the second end user 12b at the second end user destination location. If there is no confirmation, then the real-time carpooling coordinating system 10* may transmit a request for one or more identities of an alternative transportation vehicle unit 20* for transporting the first end user 12a.

In some implementations, operation 746 may further include an operation 747 for receiving the one or more identities of the transportation vehicle unit for transporting the first end user, the transportation vehicle unit having been identified based, at least in part, on a determination that the transport of the first end user to a first end user destination location by the transportation vehicle unit will not result in the transportation vehicle unit to have an amount of passenger drop offs that exceed a predefined number of maximum allowable passenger drop-offs permitted for the transportation vehicle unit prior to drop-off of the second end user at a second end user destination location, the predefined number of maximum allowable passenger drop-offs being defined by the second end user. For instance, the transportation vehicle unit identity acquiring module 204* of the real-time carpooling coordinating system 10* of FIG. 2A or 2B receiving the one or more identities of the transportation vehicle unit 20a for transporting the first end user 12a, the transportation vehicle unit 20a having been identified based, at least in part, on a determination that the transport of the first end user 12a to a first end user destination location by the transportation vehicle unit 20a will not result in the transportation vehicle unit 20a to have an amount of passenger drop offs that exceed a predefined number of maximum allowable passenger drop-offs permitted for the transportation vehicle unit 20a prior to drop-off of the second end user 12b at a second end user destination location, the predefined number of maximum allowable passenger drop-offs being defined by the second end user 12b.

In the same or alternative implementations, the transportation vehicle unit identity receiving operation 504 may additionally or alternatively include an operation 748 for receiving the one or more identities of the transportation vehicle unit for transporting the first end user, the transportation vehicle unit having been identified based, at least in part, on a determination that transport of the first end user and at least the second end user by the transportation vehicle unit will not result in the transportation vehicle unit to have an amount of passenger drop-offs that exceed a predefined number of maximum allowable passenger drop-offs permitted for the transportation vehicle unit prior to drop-off of the first end user at a first end user destination location. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified (e.g., identified by the carpooling management system 16) based, at least in part, on a determination (e.g., as determined by the carpooling management system 16) that transport of the first end user 12a and at least the second end user 12b by the transportation vehicle unit 20a will not result in the transportation vehicle unit 20a to have an amount of passenger drop-offs that exceed a predefined number of maximum allowable passenger drop-offs permitted for the transportation vehicle unit 20a prior to drop-off of the first end user 12a at a first end user destination location. In some cases, the transportation vehicle unit confirming module 312 may confirm that transport of the first end user 12a and at least the second end user 12b by the transportation vehicle unit 20a will not result in the transportation vehicle unit 20a to have an amount of passenger drop-offs that exceed a predefined number of maximum allowable passenger drop-offs permitted for the transportation vehicle unit 20a prior to drop-off of the first end user 12a at a first end user destination location. If there is no confirmation, then the real-time carpooling coordinating system 10* may transmit a request for one or more identities of an alternative transportation vehicle unit 20* for transporting the first end user 12a.

In some implementations, operation 748 may in turn further include an operation 749 for receiving the one or more identities of the transportation vehicle unit for transporting the first end user, the transportation vehicle unit having been identified based, at least in part, on a determination that transport of the first end user and at least the second end user by the transportation vehicle unit will not result in the transportation vehicle unit to have an amount of passenger drop-offs that exceed a predefined number of maximum allowable passenger drop-offs permitted for the transportation vehicle unit prior to drop-off of the first end user at a first end user destination location, the predefined number of maximum allowable passenger drop-offs being defined by the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a having been identified based, at least in part, on a determination that transport of the first end user 12a and at least the second end user 12b (e.g., there may be other additional passengers) by the transportation vehicle unit 20a will not result in the transportation vehicle unit 20a to have an amount of passenger drop-offs that exceed a predefined number of maximum allowable passenger drop-offs permitted for the transportation vehicle unit 20a prior to drop-off of the first end user 12a at a first end user destination location, the predefined number of maximum allowable passenger drop-offs being defined by the first end user 12a.

Figure 7H:
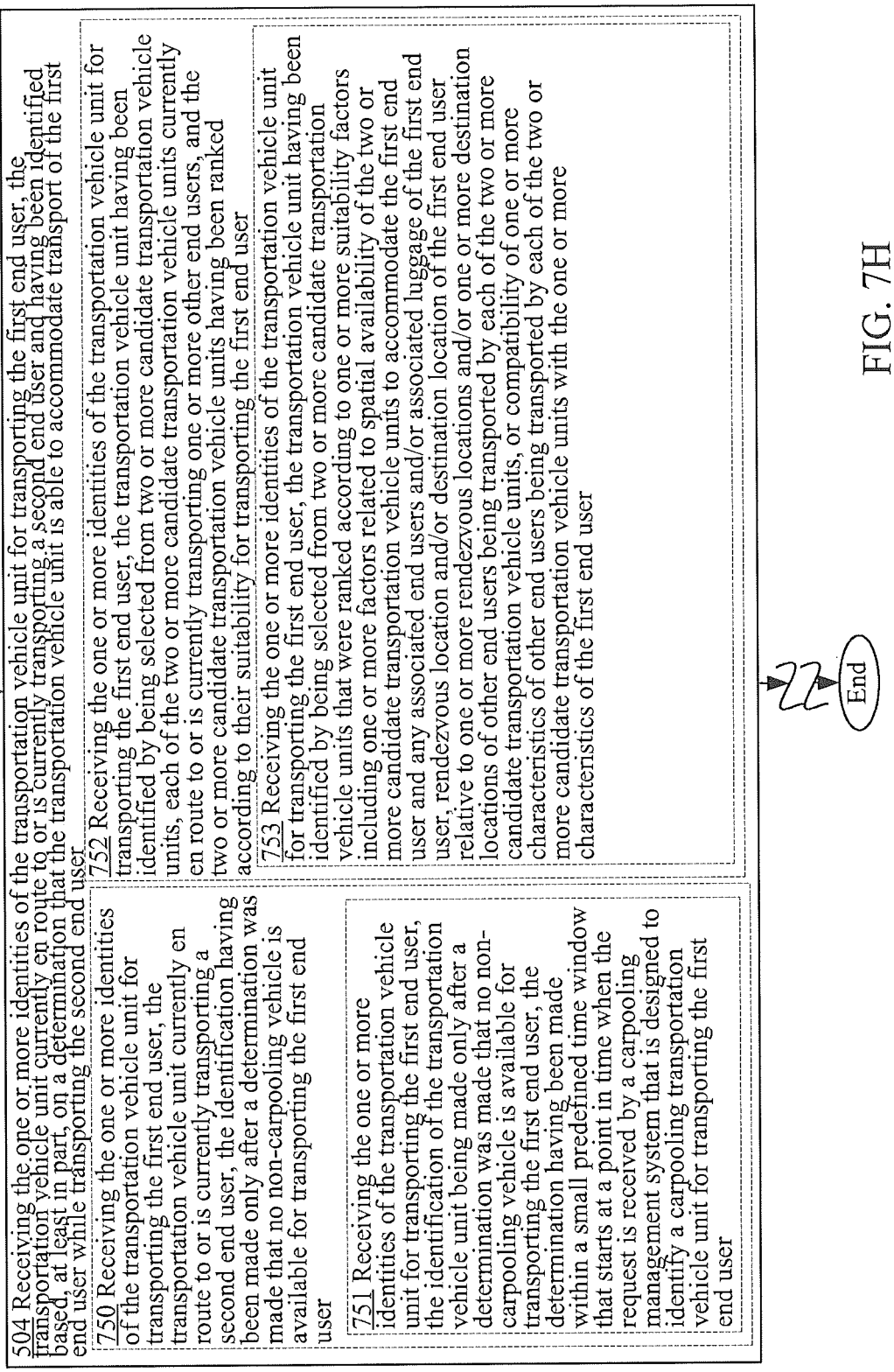
FIG. 7H is a high-level logic flowchart of a process depicting alternate implementations of the transportation vehicle unit identity receiving operation 504 of FIG. 5.
Figure 7I:
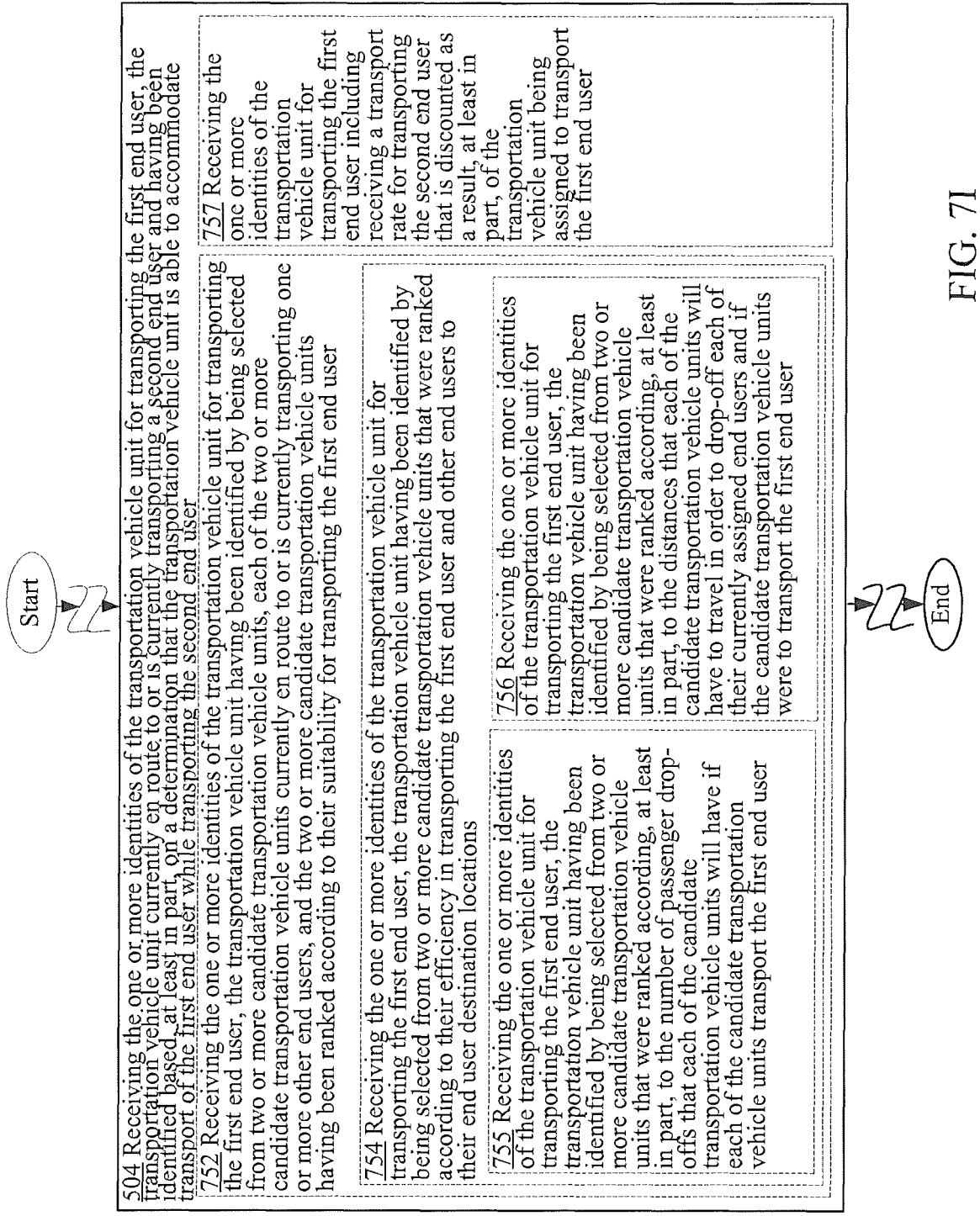
FIG. 7I is a high-level logic flowchart of a process depicting alternate implementations of the transportation vehicle unit identity receiving operation 504 of FIG. 5.

Referring now to FIG. 7H, in the same or alternative implementations, the transportation vehicle unit identity receiving operation 504 may additionally or alternatively include an operation 750 for receiving the one or more identities of the transportation vehicle unit for transporting the first end user, the transportation vehicle unit currently en route to or is currently transporting a second end user, the identification having been made only after a determination was made that no non-carpooling vehicle is available for transporting the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the transportation vehicle unit 20a currently en route to or is currently transporting a second end user 12b, the identification (e.g., identified by the carpooling management system 16) having been made only after a determination (e.g., as determined by the carpooling management system 16) was made that no non-carpooling vehicle (e.g., transportation vehicle unit 20a of FIG. 1) is available for transporting the first end user 12a.

In some cases, operation 750 may further include an operation 751 for receiving the one or more identities of the transportation vehicle unit for transporting the first end user, the identification of the transportation vehicle unit being made only after a determination was made that no non-carpooling vehicle is available for transporting the first end user, the determination having been made within a small predefined time window that starts at a point in time when the request is received by a carpooling management system that is designed to identify a carpooling transportation vehicle unit for transporting the first end user. For instance, the transportation vehicle unit identity acquiring module 204* of the real-time carpooling coordinating system 10* of FIG. 2A or 2B receiving or acquiring the one or more identities of the transportation vehicle unit 20a for transporting the first end user 12a, the identification of the transportation vehicle unit 20a being made only after a determination was made that no non-carpooling vehicle is available for transporting the first end user 12a, the determination having been made within a small predefined time window (e.g., a time window of 30 seconds or less) that starts at a point in time when the request is received by a carpooling management system 16 that is designed to identify a carpooling transportation vehicle unit (e.g., transportation vehicle unit 20a of FIG. 1) for transporting the first end user 12a.

In the same or alternative implementations, the transportation vehicle unit identity receiving operation 504 may additionally or alternatively include an operation 752 for receiving the one or more identities of the transportation vehicle unit for transporting the first end user, the transportation vehicle unit having been identified by being selected from two or more candidate transportation vehicle units, each of the two or more candidate transportation vehicle units currently en route to or is currently transporting one or more other end users, and the two or more candidate transportation vehicle units having been ranked according to their suitability for transporting the first end user. For instance, the transportation vehicle unit identity acquiring module 204\* of the real-time carpooling coordinating system 10\* of FIG. 2A or 2B receiving or acquiring the one or more identities of the transportation vehicle unit 20*a* for transporting the first end user 12*a*, the transportation vehicle unit 20*a* having been identified (e.g., identified by the carpooling management system 16) by being selected from two or more candidate transportation vehicle units (e.g., transportation vehicle units 20\* of FIG. 1), each of the two or more candidate transportation vehicle units 20\* currently en route to or is currently transporting one or more other end users, and the two or more candidate transportation vehicle units 20\* having been ranked by, for example, the carpooling management system 16 according to their suitability for transporting the first end user 12*a*.

In various implementations, operation 752 may further include an operation 753 for receiving the one or more identities of the transportation vehicle unit for transporting the first end user, the transportation vehicle unit having been identified by being selected from two or more candidate transportation vehicle units that were ranked according to one or more suitability factors including one or more factors related to spatial availability of the two or more candidate transportation vehicle units to accommodate the first end user and any associated end users and/or associated luggage of the first end user, rendezvous location and/or destination location of the first end user relative to one or more rendezvous locations and/or one or more destination locations of other end users being transported by each of the two or more candidate transportation vehicle units, or compatibility of one or more characteristics of other end users being transported by each of the two or more candidate transportation vehicle units with the one or more characteristics of the first end user. For instance, the transportation vehicle unit identity acquiring module 204\* of the real-time carpooling coordinating system 10\* of FIG. 2A or 2B receiving the one or more identities of the transportation vehicle unit 20*a* for transporting the first end user 12*a*, the transportation vehicle unit 20*a* having been identified by being selected from two or more candidate transportation vehicle units 20\* that were ranked according to one or more suitability factors including one or more factors related to spatial availability of the two or more candidate transportation vehicle units (e.g., transportation vehicle units 20\* of FIG. 1) to accommodate the first end user 12*a* and any associated end users and/or associated luggage of the first end user 12*a*, rendezvous location and/or destination location of the first end user 12*a* relative to one or more rendezvous locations and/or one or more destination locations of other end users being transported by each of the two or more candidate transportation vehicle units 20\*, or compatibility of one or more characteristics of other end users being transported by each of the two or more candidate transportation vehicle units 20\* with the one or more characteristics of the first end user 12*a*.

In the same or alternative implementations, operation 752 may additionally or alternatively include an operation 754 for receiving the one or more identities of the transportation vehicle unit for transporting the first end user, the transportation vehicle unit having been identified by being selected from two or more candidate transportation vehicle units that were ranked according to their efficiency in transporting the first end user and other end users to their end user destination locations. For instance, the transportation vehicle unit identity acquiring module 204\* of the real-time carpooling coordinating system 10\* of FIG. 2A or 2B receiving or acquiring the one or more identities of the transportation vehicle unit 20*a* for transporting the first end user 12*a*, the transportation vehicle unit 20*a* having been identified by being selected from two or more candidate transportation vehicle units (e.g., transportation vehicle units 20\* of FIG. 1) that were ranked according to their efficiency in transporting the first end user 12*a* and other end users to their end user destination locations (e.g., ranked according to which candidate transportation vehicle units can transport their passengers quickest if the first end user were to be assigned to them).

In some implementations, operation 754 may further include an operation 755 for receiving the one or more identities of the transportation vehicle unit for transporting the first end user, the transportation vehicle unit having been identified by being selected from two or more candidate transportation vehicle units that were ranked according, at least in part, to the number of passenger drop-offs that each of the candidate transportation vehicle units will have if each of the candidate transportation vehicle units transport the first end user. For instance, the transportation vehicle unit identity acquiring module 204\* of the real-time carpooling coordinating system 10\* of FIG. 2A or 2B receiving or acquiring the one or more identities of the transportation vehicle unit 20*a* for transporting the first end user 12*a*, the transportation vehicle unit 20*a* having been identified by being selected from two or more candidate transportation vehicle units 20\* that were ranked according, at least in part, to the number of passenger drop-offs that each of the candidate transportation vehicle units 20\* will have if each of the candidate transportation vehicle units 20\* transport the first end user 12*a* (e.g., ranking the candidate transportation vehicle units 20\* from the fewest to the greatest number of passenger drop-offs that the candidate transportation vehicle units 20\* will have if each were to transport the first end user 12*a*).

In the same or alternative implementations, operation 754 may additionally or alternatively include an operation 756 for receiving the one or more identities of the transportation vehicle unit for transporting the first end user, the transportation vehicle unit having been identified by being selected from two or more candidate transportation vehicle units that were ranked according, at least in part, to the distances that each of the candidate transportation vehicle unit will have to travel in order to drop-off each of their currently assigned end users and if the candidate transportation vehicle units were to transport the first end user. For instance, the transportation vehicle unit identity acquiring module 204\* of the real-time carpooling coordinating system 10\* of FIG. 2A or 2B receiving or acquiring the one or more identities of the transportation vehicle unit 20*a* for transporting the first end user 12*a*, the transportation vehicle unit 20*a* having been identified by being selected from two or more candidate transportation vehicle units 20\* that were ranked according, at least in part, to the distances that each of the candidate transportation vehicle units 20\* will have to travel in order to drop-off each of their currently assigned end users and if the candidate transportation vehicle units were to transport the first end user 12*a* (e.g., ranking the candidate transportation vehicle units 20\* from the shortest to the longest distances that the candidate transportation vehicle units 20* will have travel if each were to transport the first end user 12a).

In various implementations, the transportation vehicle unit identity receiving operation 504 may include an operation 757 for receiving the one or more identities of the transportation vehicle unit for transporting the first end user including receiving a transport rate for transporting the second end user that is discounted as a result, at least in part, of the transportation vehicle unit being assigned to transport the first end user. For instance, the transportation vehicle unit identity acquiring module 204* including the transport rate acquiring module 314 (see FIG. 3B) of the real-time carpooling coordinating system 10* of FIG. 2A or 2B receiving the one or more identities of the transportation vehicle unit 20a for transporting the first end user 12a including receiving or acquiring, by the transport rate acquiring module 314, a transport rate for transporting the second end user 12b that is discounted as a result, at least in part, of the transportation vehicle unit 20a being assigned to transport the first end user 12a (e.g., receiving a discount transport rate for the second end user 12b that is discounted from a transport rate that would have been charged if the transportation vehicle unit 20a was not assigned to transport the first end user 12a). In some alternative embodiments, the transport rate for transporting the second end user 12b may be generated (e.g., calculated) by the transport rate generating module 315 (see FIG. 3B) of the real-time carpooling coordinating system 10*.

Figure 7J:
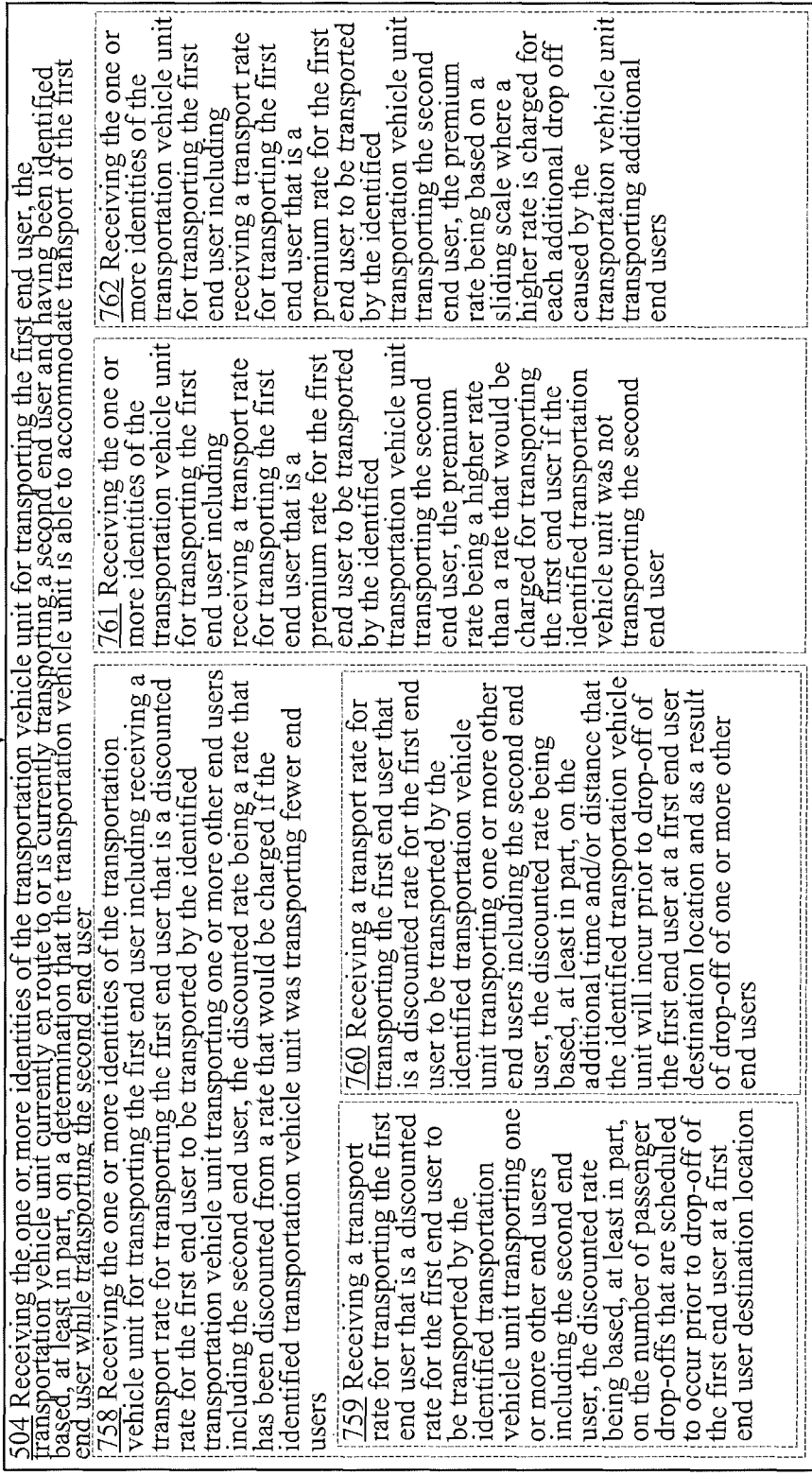
FIG. 7J is a high-level logic flowchart of a process depicting alternate implementations of the transportation vehicle unit identity receiving operation 504 of FIG. 5.

Turning now to FIG. 7J, in various implementations, the transportation vehicle unit identity receiving operation 504 may include an operation 758 for receiving the one or more identities of the transportation vehicle unit for transporting the first end user including receiving a transport rate for transporting the first end user that is a discounted rate for the first end user to be transported by the identified transportation vehicle unit transporting one or more other end users including the second end user, the discounted rate being a rate that has been discounted from a rate that would be charged if the identified transportation vehicle unit was transporting fewer end users. For instance, the transportation vehicle unit identity acquiring module 204* including the transport rate acquiring module 314 of the real-time carpooling coordinating system 10* of FIG. 2A or 2B receiving the one or more identities of the transportation vehicle unit 20a for transporting the first end user 12a including receiving or acquiring, by the transport rate acquiring module 314, a transport rate for transporting the first end user 12a that is a discounted rate for the first end user 12a to be transported by the identified transportation vehicle unit 20a transporting one or more other end users including the second end user 12b, the discounted rate being a rate that has been discounted from a rate that would be charged if the identified transportation vehicle unit 20a was transporting fewer end users. In some alternative embodiments, the transport rate for transporting the first end user 12a may be generated (e.g., calculated) by the transport rate generating module 315 of the real-time carpooling coordinating system 10*.

In some implementations, operation 758 may further include an operation 759 for receiving a transport rate for transporting the first end user that is a discounted rate for the first end user to be transported by the identified transportation vehicle unit transporting one or more other end users including the second end user, the discounted rate being based, at least in part, on the number of passenger drop-offs that are scheduled to occur prior to drop-off of the first end user at a first end user destination location. For instance, the transport rate acquiring module 314 of the real-time carpooling coordinating system 10* of FIG. 2A or 2B receiving or acquiring a transport rate for transporting the first end user 12a that is a discounted rate for the first end user 12a to be transported by the identified transportation vehicle unit 20a transporting one or more other end users including the second end user 12b, the discounted rate being based, at least in part, on the number of passenger drop-offs that are scheduled to occur prior to drop-off of the first end user 12a at a first end user destination location.

In the same or alternative implementations, operation 758 may additionally or alternatively include an operation 760 for receiving a transport rate for transporting the first end user that is a discounted rate for the first end user to be transported by the identified transportation vehicle unit transporting one or more other end users including the second end user, the discounted rate being based, at least in part, on the additional time and/or distance that the identified transportation vehicle unit will incur prior to drop-off of the first end user at a first end user destination location and as a result of drop-off of one or more other end users. For instance, the transport rate acquiring module 314 of the real-time carpooling coordinating system 10* of FIG. 2A or 2B receiving or acquiring a transport rate for transporting the first end user 12a that is a discounted rate for the first end user 12a to be transported by the identified transportation vehicle unit 20a transporting one or more other end users including the second end user 12b, the discounted rate being based, at least in part, on the additional time and/or distance that the identified transportation vehicle unit 20a will incur prior to drop-off of the first end user 12a at a first end user destination location and as a result of drop-off of one or more other end users.

In various implementations, the transportation vehicle unit identity receiving operation 504 may include an operation 761 for receiving the one or more identities of the transportation vehicle unit for transporting the first end user including receiving a transport rate for transporting the first end user that is a premium rate for the first end user to be transported by the identified transportation vehicle unit transporting the second end user, the premium rate being a higher rate than a rate that would be charged for transporting the first end user if the identified transportation vehicle unit was not transporting the second end user. For instance, the transportation vehicle unit identity acquiring module 204* including the transport rate acquiring module 314 of the real-time carpooling coordinating system 10* of FIG. 2A or 2B receiving the one or more identities of the transportation vehicle unit 20a for transporting the first end user 12a including receiving or acquiring, by the transport rate acquiring module 314, a transport rate for transporting the first end user 12a that is a premium rate for the first end user 12a to be transported by the identified transportation vehicle unit 20a transporting the second end user 12b, the premium rate being a higher rate than a rate that would be charged for transporting the first end user 12a if the identified transportation vehicle unit 20a was not transporting the second end user 12b. Note that in some alternative embodiments, the premium transport rate for transporting the first end user 12a may be generated (e.g., calculated) by the transport rate generating module 315 of the real-time carpooling coordinating system 10*.

In some implementations, the transportation vehicle unit identity receiving operation 504 may include an operation 762 for receiving the one or more identities of the transportation vehicle unit for transporting the first end user including receiving a transport rate for transporting the first end user that is a premium rate for the first end user to be transported by the identified transportation vehicle unit transporting the second end user, the premium rate being based on a sliding scale where a higher rate is charged for each additional drop offs caused by the transportation vehicle unit transporting additional end users. For instance, the transportation vehicle unit identity acquiring module 204* including the transport rate acquiring module 314 of the real-time carpooling coordinating system 10* of FIG. 2A or 2B receiving the one or more identities of the transportation vehicle unit 20*a* for transporting the first end user 12*a* including receiving or acquiring, by the transport rate acquiring module 314, a transport rate for transporting the first end user 12*a* that is a premium rate for the first end user 12*a* to be transported by the identified transportation vehicle unit 20*a* transporting the second end user 12*b*, the premium rate being based on a sliding scale where a higher rate is charged for each additional drop off caused by the transportation vehicle unit 20*a* transporting additional end users. Note again that in some alternative embodiments, the premium transport rate for transporting the first end user 12*a* may be generated (e.g., calculated) by the transport rate generating module 315 of the real-time carpooling coordinating system 10*.

Figure 8A:
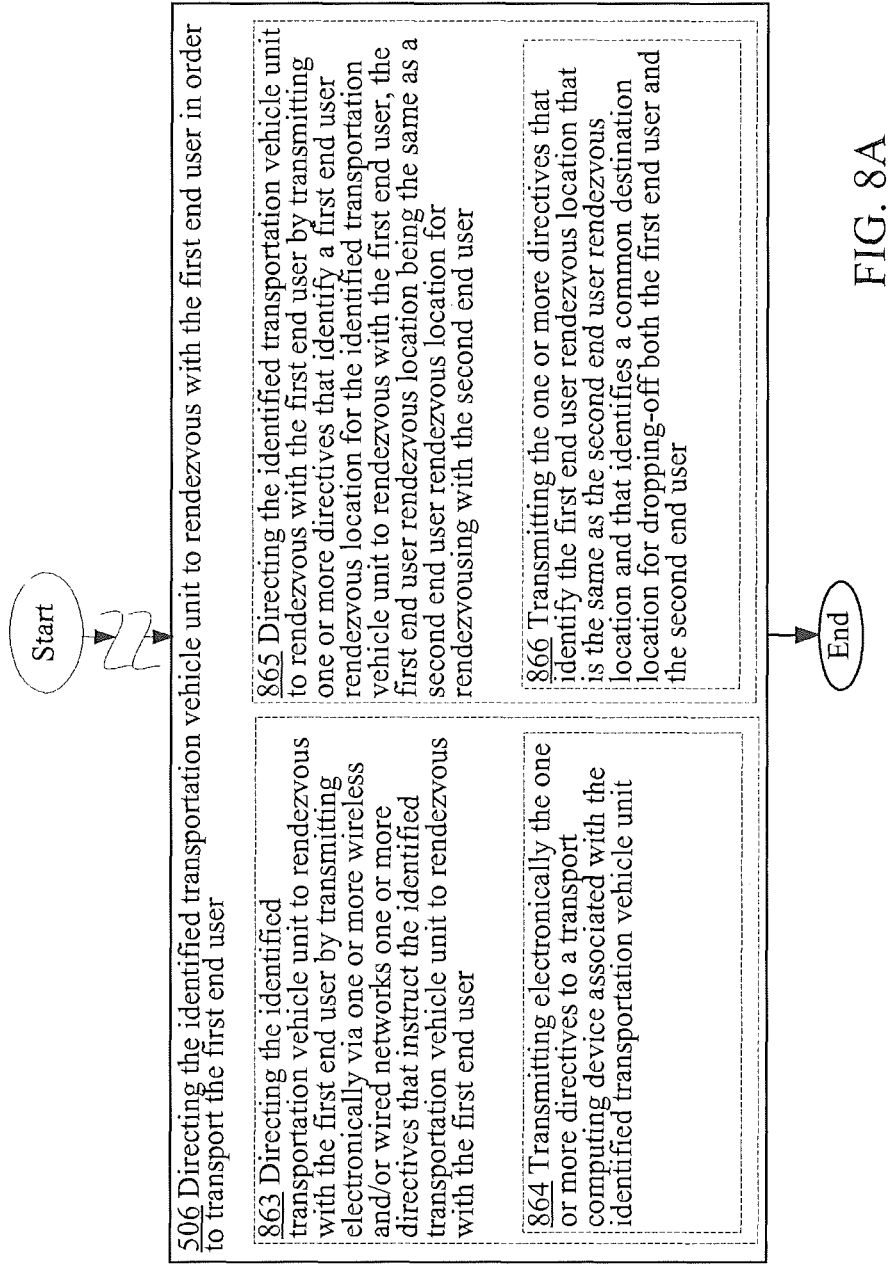
FIG. 8A is a high-level logic flowchart of a process depicting alternate implementations of the transportation vehicle unit directing operation 506 of FIG. 5.
Figure 8B:
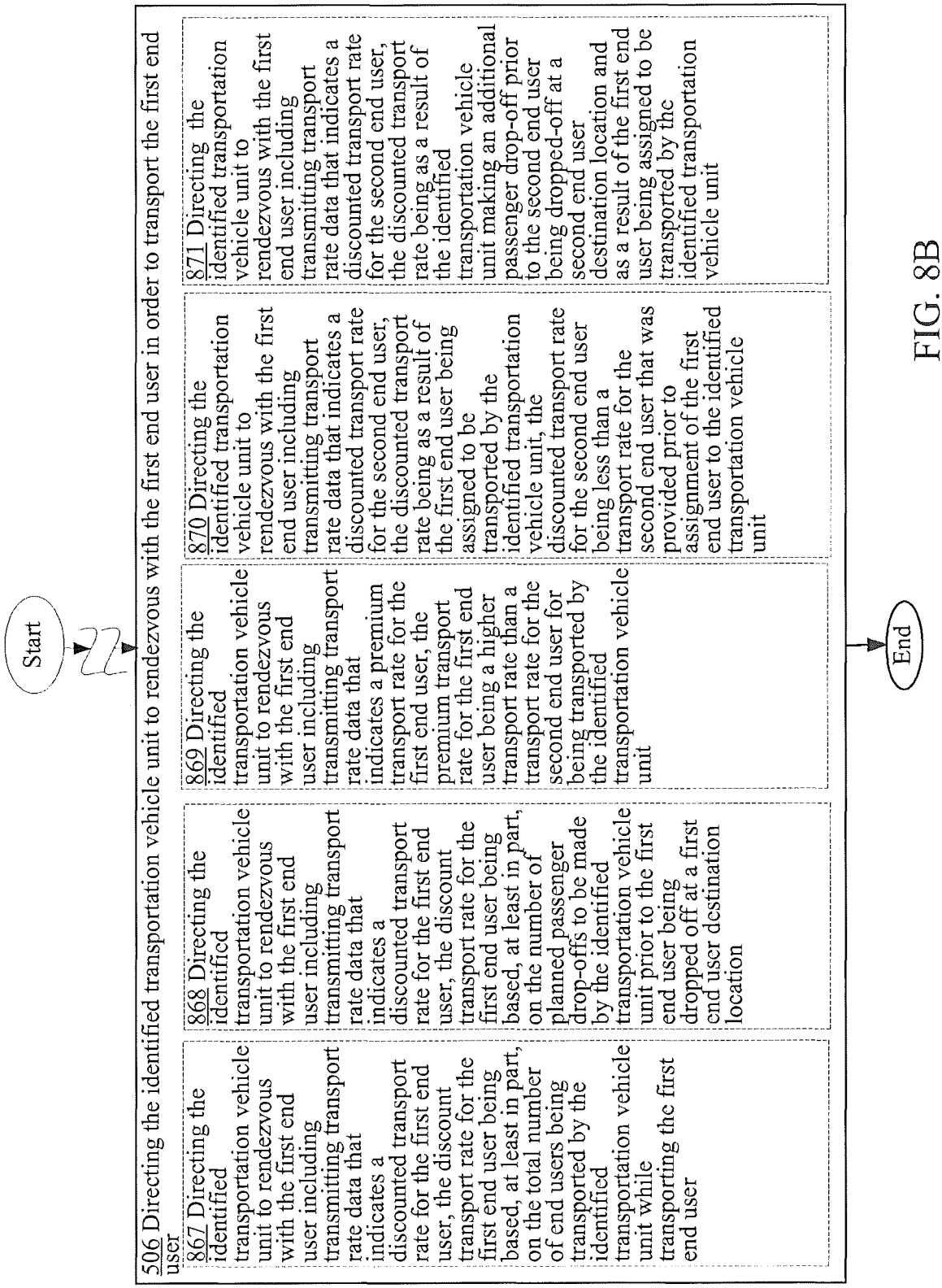
FIG. 8B is a high-level logic flowchart of a process depicting alternate implementations of the transportation vehicle unit directing operation 506 of FIG. 5.

Referring back to the transportation vehicle unit directing operation 506 of FIG. 5, the transportation vehicle unit directing operation 506 similar to the request transmitting operation 502 and the transportation vehicle unit identity receiving operation 504 of FIG. 5 may be executed in a number of different ways in various alternative embodiments as illustrated, for example, in FIGS. 8A and 8B. In some cases, for example, the transportation vehicle unit directing operation 506 may actually include an operation 863 for directing the identified transportation vehicle unit to rendezvous with the first end user by transmitting electronically via one or more wireless and/or wired networks one or more directives that instruct the identified transportation vehicle unit to rendezvous with the first end user as illustrated in FIG. 8A. For instance, the transportation vehicle unit directing module 206* including the directive transmitting module 316 (see FIG. 3C) of the real-time carpooling coordinating system 10* of FIG. 2A or 2B directing the identified transportation vehicle unit 20*a* to rendezvous with the first end user 12*a* by having the directive transmitting module 316 transmit electronically via one or more wireless and/or wired networks 18 one or more directives that instruct (e.g., providing an address and/or pick-up time) the identified transportation vehicle unit 20*a* to rendezvous with the first end user 12*a*. Note that in some alternative embodiments, the one or more directives may be displayed/presented through a user interface associated with the real-time carpooling coordinating system 10* (which may then be viewed by the human driver of the identified transportation vehicle unit 20*a*).

In some implementations, operation 863 may further include an operation 864 for transmitting electronically the one or more directives to a transport computing device associated with the identified transportation vehicle unit. For instance, the transportation vehicle unit directing module 206* including the directive transmitting module 316 of the real-time carpooling coordinating system 10* of FIG. 2A or 2B transmitting electronically the one or more directives to a transport computing device 22 (e.g., a laptop computer, a mobile device such as a tablet computer or smartphone, a dedicated computing device, and so forth) associated with the identified transportation vehicle unit 20*a*.

In the same or alternative implementations, the transportation vehicle unit directing operation 506 may include an operation 865 for directing the identified transportation vehicle unit to rendezvous with the first end user by transmitting one or more directives that identify a first end user rendezvous location for the identified transportation vehicle unit to rendezvous with the first end user, the first end user rendezvous location being the same as a second end user rendezvous location for rendezvousing with the second end user. For instance, the transportation vehicle unit directing module 206* including the directive transmitting module 316 of the real-time carpooling coordinating system 10* of FIG. 2A or 2B directing the identified transportation vehicle unit 20*a* to rendezvous with the first end user 12*a* when the directive transmitting module 316 transmits one or more directives that identify a first end user 12*a* rendezvous location for the identified transportation vehicle unit 20*a* to rendezvous with the first end user 12*a*, the first end user rendezvous location being the same as a second end user rendezvous location for rendezvousing with the second end user 12*b*.

In some cases, operation 865 may, in turn, further include an operation 866 for transmitting the one or more directives that identify the first end user rendezvous location that is the same as the second end user rendezvous location and that identifies a common destination location for dropping-off both the first end user and the second end user. For instance, the directive transmitting module 316 of the real-time carpooling coordinating system 10* of FIG. 2A or 2B transmitting the one or more directives that identify the first end user rendezvous location that is the same as the second end user rendezvous location and that identifies a common destination location for dropping-off both the first end user 12*a* and the second end user 12*b*.

Referring to FIG. 8B, in various implementations, the transportation vehicle unit directing operation 506 may include an operation 867 for directing the identified transportation vehicle unit to rendezvous with the first end user including transmitting transport rate data that indicates a discounted transport rate for the first end user, the discount transport rate for the first end user being based, at least in part, on the total number of end users being transported by the identified transportation vehicle unit while transporting the first end user. For instance, the transportation vehicle unit directing module 206* including the transport rate data transmitting module 318 (see FIG. 3B) of the real-time carpooling coordinating system 10* of FIG. 2A or 2B directing the identified transportation vehicle unit 20*a* to rendezvous with the first end user 12*a* including transmitting, by the transport rate data transmitting module 318, transport rate data that indicates a discounted transport rate for the first end user 12*a*, the discount transport rate for the first end user 12*a* being based, at least in part, on the total number of end users being transported by the identified transportation vehicle unit 20*a* while transporting the first end user 12*a*.

In the same or different implementations, the transportation vehicle unit directing operation 506 may additionally or alternatively include an operation 868 for directing the identified transportation vehicle unit to rendezvous with the first end user including transmitting transport rate data that indicates a discounted transport rate for the first end user, the discount transport rate for the first end user being based, at least in part, on the number of planned passenger drop-offs to be made by the identified transportation vehicle unit prior to the first end user being dropped off at a first end user destination location. For instance, the transportation vehicle unit directing module 206* including the transport rate data transmitting module 318 of the real-time carpooling coordinating system 10* of FIG. 2A or 2B directing the identified transportation vehicle unit 20a to rendezvous with the first end user 12a including transmitting, by the transport rate data transmitting module 318, transport rate data that indicates a discounted transport rate for the first end user 12a, the discount transport rate for the first end user 12a being based, at least in part, on the number of planned passenger drop-offs to be made by the identified transportation vehicle unit 20a prior to the first end user 12a being dropped off at a first end user destination location.

In the same or different implementations, the transportation vehicle unit directing operation 506 may additionally or alternatively an operation 869 for directing the identified transportation vehicle unit to rendezvous with the first end user including transmitting transport rate data that indicates a premium transport rate for the first end user, the premium transport rate for the first end user being a higher transport rate than a transport rate for the second end user for being transported by the identified transportation vehicle unit. For instance, the transportation vehicle unit directing module 206* including the transport rate data transmitting module 318 of the real-time carpooling coordinating system 10* of FIG. 2A or 2B directing the identified transportation vehicle unit 20a to rendezvous with the first end user 12a including transmitting, by the transport rate data transmitting module 318, transport rate data that indicates a premium transport rate for the first end user 12a, the premium transport rate for the first end user 12a being a higher transport rate than a transport rate for the second end user 12b for being transported by the identified transportation vehicle unit 20a. In this embodiment, the first end user 12a may be charged a higher transport rate than the second end user 12b for being allowed to join the fare of the second end user 12b (e.g., being allowed to join the second end user 12b in being transported by the identified transportation vehicle unit 20a).

In the same or different implementations, the transportation vehicle unit directing operation 506 may additionally or alternatively an operation 870 for directing the identified transportation vehicle unit to rendezvous with the first end user including transmitting transport rate data that indicates a discounted transport rate for the second end user, the discounted transport rate being as a result of the first end user being assigned to be transported by the identified transportation vehicle unit, the discounted transport rate for the second end user being less than a transport rate for the second end user that was provided prior to assignment of the first end user to the identified transportation vehicle unit. For instance, the transportation vehicle unit directing module 206* including the transport rate data transmitting module 318 of the real-time carpooling coordinating system 10* of FIG. 2A or 2B directing the identified transportation vehicle unit 20a to rendezvous with the first end user 12a including transmitting, by the transport rate data transmitting module 318, transport rate data that indicates a discounted transport rate for the second end user 12b, the discounted transport rate being as a result of the first end user 12a being assigned to be transported by the identified transportation vehicle unit 20a, the discounted transport rate for the second end user 12b being less than a transport rate for the second end user 12b that was provided prior to assignment of the first end user 12a to the identified transportation vehicle unit 20a.

In the same or different implementations, the transportation vehicle unit directing operation 506 may additionally or alternatively an operation 871 for directing the identified transportation vehicle unit to rendezvous with the first end user including transmitting transport rate data that indicates a discounted transport rate for the second end user, the discounted transport rate being as a result of the identified transportation vehicle unit making an additional passenger drop-off prior to the second end user being dropped-off at a second end user destination location and as a result of the first end user being assigned to be transported by the identified transportation vehicle unit. For instance, the transportation vehicle unit directing module 206* including the transport rate data transmitting module 318 of the real-time carpooling coordinating system 10* of FIG. 2A or 2B directing the identified transportation vehicle unit 20a to rendezvous with the first end user 12a including transmitting, by the transport rate data transmitting module 318, transport rate data that indicates a discounted transport rate for the second end user 12b, the discounted transport rate being as a result of the identified transportation vehicle unit 20a making an additional passenger drop-off prior to the second end user 12b being dropped-off at a second end user destination location and as a result of the first end user 12a being assigned to be transported by the identified transportation vehicle unit 20a.

Figure 9:
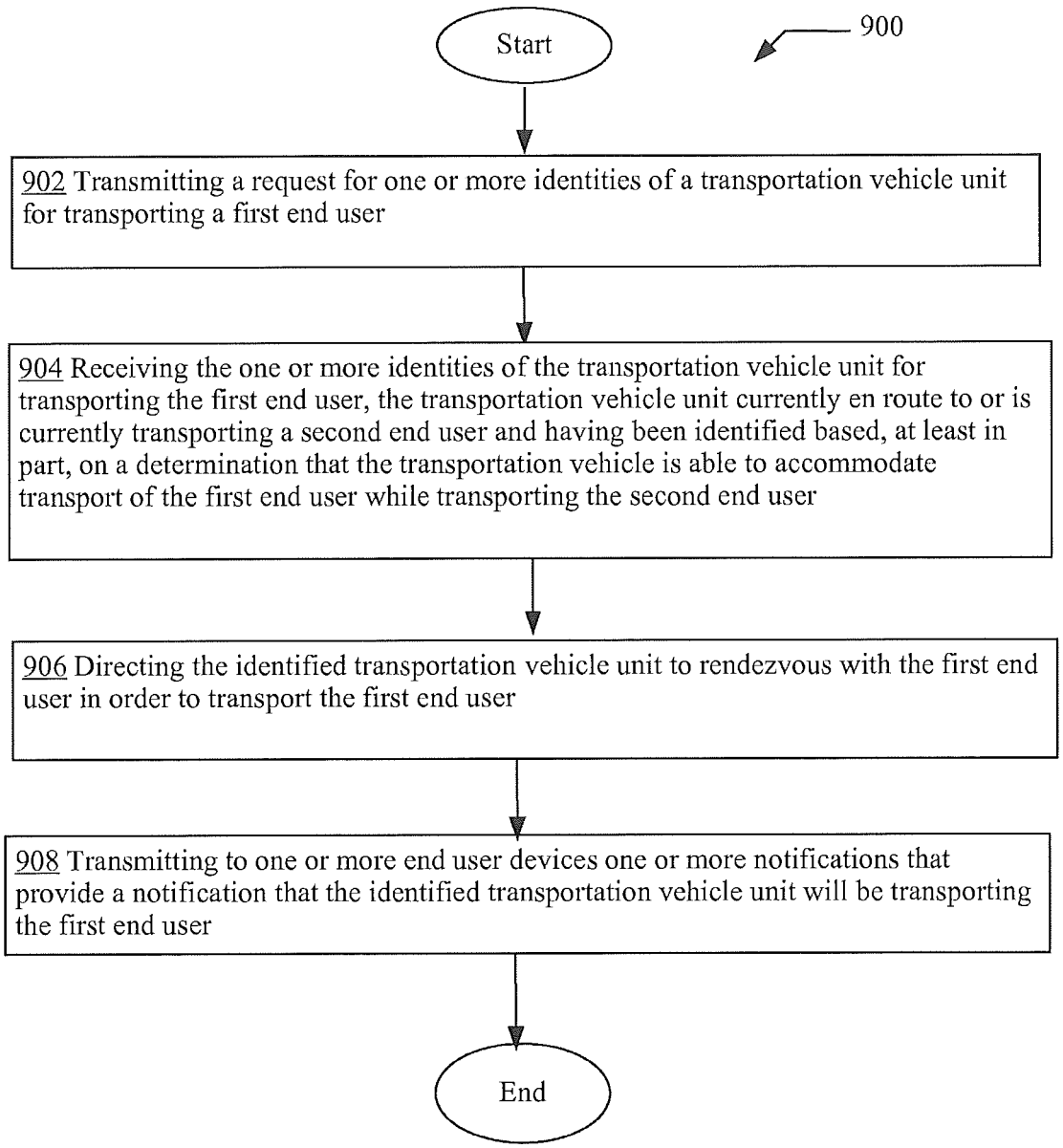
FIG. 9 is a high-level logic flowchart of another process, e.g., operational flow 900, according to some embodiments.

Turning now to FIG. 9 illustrating another operational flow 900. Operational flow 900 includes certain operations that mirror the operations included in operational flow 500 of FIG. 5. These operations include a request transmitting operation 902, a transportation vehicle unit identity receiving operation 904, and a transportation vehicle unit directing operation 906 that corresponds to and mirrors the request transmitting operation 502, the transportation vehicle unit identity receiving operation 504, and the transportation vehicle unit directing operation 506, respectively, of FIG. 5.

Figure 10:
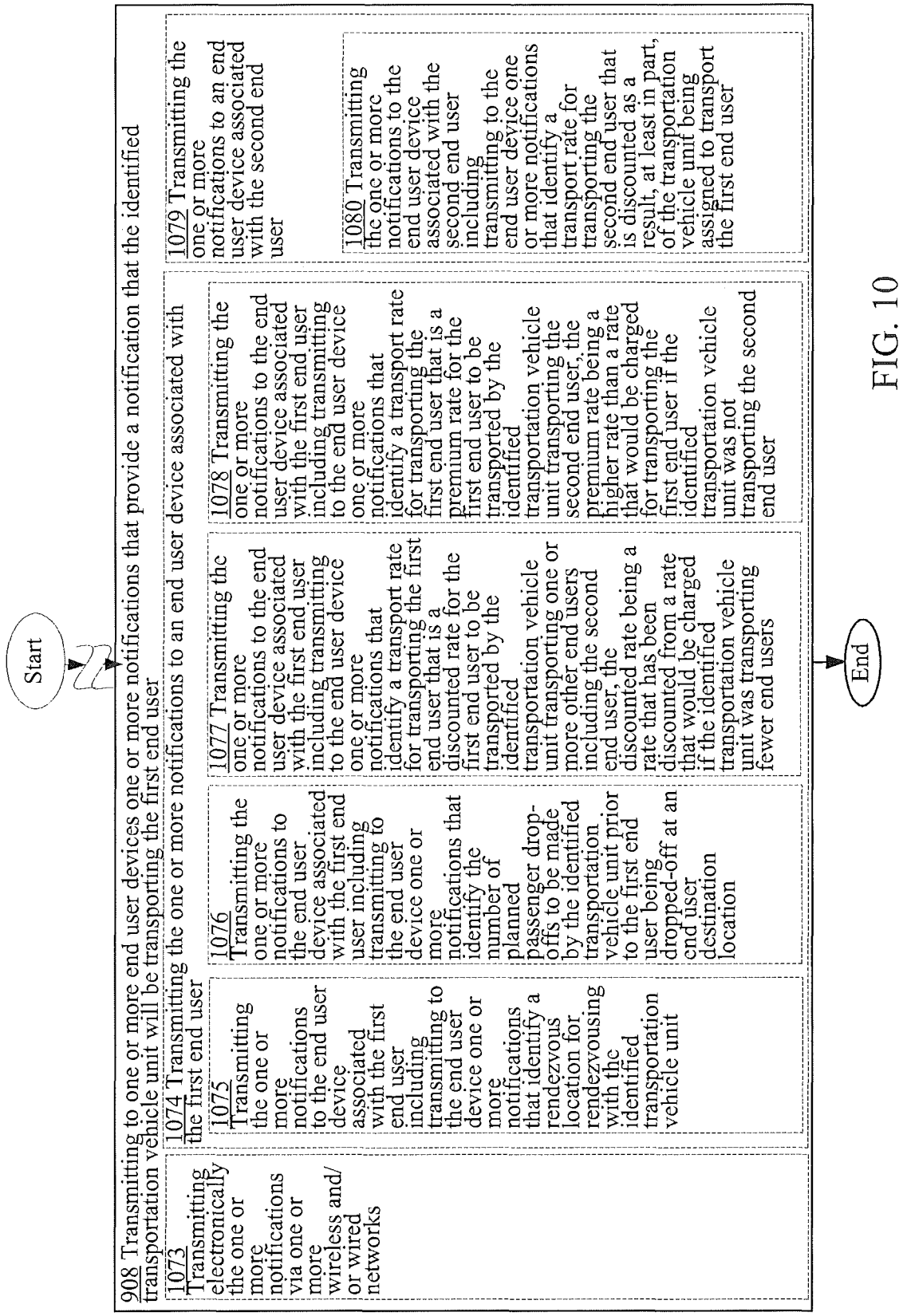
FIG. 10 is a high-level logic flowchart of a process depicting alternate implementations of the notification transmitting operation 908 of FIG. 9.

In addition, operational flow 900 further includes a notification transmitting operation 908 for transmitting to one or more end user devices one or more notifications that provide a notification that the identified transportation vehicle unit will be transporting the first end user as illustrated in FIG. 10. For instance, the notification transmitting module 208* of the real-time carpooling coordinating system 10* of FIG. 2A or 2B transmitting to one or more end user devices 14 (e.g., a desktop or laptop computer, a mobile device such as a tablet computer or a smartphone, and so forth) one or more notifications that provide a notification that the identified transportation vehicle unit 20a will be transporting the first end user 12a.

As further illustrated in FIG. 10, the notification transmitting operation 908 may be implemented in a variety of different ways in various alternative implementations. For example, in some implementations, the notification transmitting operation 908 may include an operation 1073 for transmitting electronically the one or more notifications via one or more wireless and/or wired networks. For instance, the notification transmitting module 208* of the real-time carpooling coordinating system 10* of FIG. 2A or 2B transmitting electronically the one or more notifications via one or more wireless and/or wired networks 18.

In the same or alternative implementations, the notification transmitting operation 908 may include an operation 1074 for transmitting the one or more notifications to an end user device associated with the first end user. For instance, the notification transmitting module 208* of the real-time carpooling coordinating system 10* of FIG. 2A or 2B transmitting the one or more notifications to an end user device 14 associated with the first end user 12a.

As further illustrated in FIG. 10, operation 1074 may be implemented in a variety of different ways in various alternative implementations. For example, in some cases, operation 1074 may include an operation 1075 for transmitting the one or more notifications to the end user device associated with the first end user including transmitting to the end user device one or more notifications that identify a rendezvous location for rendezvousing with the identified transportation vehicle unit. For instance, the notification transmitting module 208* of the real-time carpooling coordinating system 10* of FIG. 2A or 2B transmitting the one or more notifications to the end user device 14 associated with the first end user 12*a* including transmitting to the end user device 14 associated with the first end user 12*a* one or more notifications that identify a rendezvous location for rendezvousing with the identified transportation vehicle unit 20*a*.

In the same or alternative implementations, operation 1074 may additionally or alternatively include an operation 1076 for transmitting the one or more notifications to the end user device associated with the first end user including transmitting to the end user device one or more notifications that identify number of planned passenger drop-offs to be made by the identified transportation vehicle unit prior to the first end user being dropped-off at an end user destination location. For instance, the notification transmitting module 208* of the real-time carpooling coordinating system 10* of FIG. 2A or 2B transmitting the one or more notifications to the end user device 14 associated with the first end user 12*a* including transmitting to the end user device 14 associated with the first end user 12*a* one or more notifications that identify the number of planned passenger drop-offs to be made by the identified transportation vehicle unit 20*a* prior to the first end user 12*a* being dropped-off at an end user destination location.

In the same or alternative implementations, operation 1074 may additionally or alternatively include an operation 1077 for transmitting the one or more notifications to the end user device associated with the first end user including transmitting to the end user device one or more notifications that identify a transport rate for transporting the first end user that is a discounted rate for the first end user to be transported by the identified transportation vehicle unit transporting one or more other end users including the second end user, the discounted rate being a rate that has been discounted from a rate that would be charged if the identified transportation vehicle unit was transporting fewer end users. For instance, the notification transmitting module 208* of the real-time carpooling coordinating system 10* of FIG. 2A or 2B transmitting the one or more notifications to the end user device 14 associated with the first end user 12*a* including transmitting to the end user device 14 associated with the first end user 12*a* one or more notifications that identify a transport rate for transporting the first end user 12*a* that is a discounted rate for the first end user 12*a* to be transported by the identified transportation vehicle unit 20*a* transporting one or more other end users including the second end user 12*b*, the discounted rate being a rate that has been discounted from a rate that would be charged if the identified transportation vehicle unit 20*a* was transporting fewer end users.

In the same or alternative implementations, operation 1075 may include an operation 1078 for transmitting the one or more notifications to the end user device associated with the first end user including transmitting to the end user device one or more notifications that identify a transport rate for transporting the first end user that is a premium rate for the first end user to be transported by the identified transportation vehicle unit transporting the second end user, the premium rate being a higher rate than a rate that would be charged for transporting the first end user if the identified transportation vehicle unit was not transporting the second end user. For instance, the notification transmitting module 208* of the real-time carpooling coordinating system 10* of FIG. 2A or 2B transmitting the one or more notifications to the end user device 14 associated with the first end user 12*a* including transmitting to the end user device 14 associated with the first end user 12*a* one or more notifications that identify a transport rate for transporting the first end user 12*a* that is a premium rate for the first end user 12*a* to be transported by the identified transportation vehicle unit 20*a* transporting the second end user 12*b*, the premium rate being a higher rate than a rate that would be charged for transporting the first end user 12*a* if the identified transportation vehicle unit 20*a* was not transporting the second end user 12*b*.

In various implementations, the notification transmitting operation 908 may include an operation 1079 for transmitting the one or more notifications to an end user device associated with the second end user. For instance, the notification transmitting module 208* of the real-time carpooling coordinating system 10* of FIG. 2A or 2B transmitting the one or more notifications to an end user device 14 associated with the second end user 12*b*.

In some cases, operation 1079 may further include an operation 1080 for transmitting the one or more notifications to the end user device associated with the second end user including transmitting to the end user device one or more notifications that identify a transport rate for transporting the second end user that is discounted as a result, at least in part, of the transportation vehicle unit being assigned to transport the first end user. For instance, the notification transmitting module 208* of the real-time carpooling coordinating system 10* of FIG. 2A or 2B transmitting the one or more notifications to the end user device associated with the second end user including transmitting to the end user device one or more notifications that identify a transport rate for transporting the second end user that is discounted as a result, at least in part, of the transportation vehicle unit being assigned to transport the first end user 12*a*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A transport computing device comprising a computer processor and signal-bearing non-transitory storage medium, bearing one or more computer-executable instructions, wherein the instructions configure the processor to perform operations comprising:
    acquiring an identity of a transportation vehicle unit that is en route to a second rendezvous location or a second destination location;
    determining that the transportation vehicle unit is able to travel to a first rendezvous location while the transportation vehicle unit is en route to the second rendezvous location or the second destination location along a selected route; and
    directing the transportation vehicle unit to the first rendezvous location in order to travel to the first rendezvous location over a least a portion of the route.

2. The device of claim 1, wherein the processor includes circuitry associated with each operation and the computer system is a smartphone, table computer or other personal computer.

3. A method for arranging for carpooling utilizing a computer program product that via a computer processor electronically conducts steps comprising:
    acquiring an identity of a transportation vehicle unit that is en route to a second rendezvous location or a second destination location;
    determining that the transportation vehicle unit is able to travel to a first rendezvous location while the transportation vehicle unit is en route to the second rendezvous location or the second destination location along a selected route; and
    directing the transportation vehicle unit to the first rendezvous location in order to travel to the first rendezvous location over a least a portion of the route.

4. The method of claim 3, wherein:
the acquiring of the identity of the transportation vehicle unit includes transmitting a request for an identity of a transportation vehicle unit that is en route to the second rendezvous location or the second destination location; or
the acquiring of the identity of the transportation vehicle unit includes transmitting a request that includes preference data that indicates one or more carpooling preferences for an identity of a transportation vehicle unit that is en route to the second rendezvous location or
the second destination location; or the acquiring of the identity of the transportation vehicle unit includes identifying the transportation vehicle unit within a time window that starts when a request is received by a carpooling management system for traveling to the first rendezvous location.

5. The method of claim 3, wherein:
the determining that the transportation vehicle unit is en route to the second rendezvous location or the second destination location includes at least determining that the transportation vehicle unit is spatially approaching the second rendezvous location or the second destination location; or
the determining that the transportation vehicle unit is en route to the second rendezvous location or the second destination location includes at least determining that the transportation vehicle unit is within a predefined distance or travel time from the second rendezvous location or the second destination location.

6. The method of claim 3, wherein the determining that the transportation vehicle unit is able to travel to the first rendezvous location includes determining that the first rendezvous location is the same as the second rendezvous location or that travel to the first rendezvous location will not significantly delay travel to the second rendezvous location or the second destination location.

7. The method of claim 3, which further comprises determining transport data for travel from the first rendezvous location to the first destination location, with the transport rate data indicating either a discounted transport rate for the travel from the first rendezvous location to the first destination location which is based, at least in part, on the number of planned drop-offs to be made by the transportation vehicle unit prior to the travel to first destination location, or a premium transport rate for the travel from the first rendezvous location to the first destination location, the premium transport rate for the travel from the rendezvous location to the first destination location being a higher transport rate than a transport rate for the travel from the second rendezvous location to the second destination location.

8. The method of claim 3, which further comprises determining transport data for travel from the second rendezvous location to the second destination location, with the transport rate data indicating a discounted transport rate for the travel from the second rendezvous location to the second destination location, the discounted transport rate as a result of travel to the first rendezvous location or the first destination location assigned by the transportation vehicle unit, the discounted transport rate for the travel from the second rendezvous location to the second destination location being less than a transport rate for the travel from the second rendezvous location to the second destination location that was provided prior to the travel to the first rendezvous location or the first destination location assigned by the transportation vehicle unit as a result of the travel to the first rendezvous location or the first destination location assigned by the transportation vehicle unit or as a result of the transportation vehicle unit making an additional drop-off prior to the travel to the second destination location.

9. The method of claim 3, wherein the determining that the transportation vehicle unit en route to the second rendezvous location or the second destination location is able to travel to the first rendezvous location includes determining that the transportation vehicle unit is spatially available.

10. The method of claim 3, wherein the determining that the transportation vehicle unit is able to travel to the first rendezvous location includes at least determining that travel to the first rendezvous location by the transportation vehicle unit will not result in the transportation vehicle unit to have a total number of drop-offs that exceed a predefined number of maximum drop-offs allowed for the transportation vehicle unit during one trip traveling to one or more destination locations.

11. The method of claim 3, wherein the determining that the transportation vehicle unit is able to travel to the first rendezvous location includes determining that first destination location is the same as second destination location.

12. The method of claim 3, wherein the determining that the transportation vehicle unit is able to travel to the first rendezvous location includes determining that the transportation vehicle unit is currently en route to the second rendezvous location or second destination location and that is determined to be currently located within a predefined maximum allowable distance from the first rendezvous location.

13. The method of claim 3, wherein the determining that the transportation vehicle unit is able to travel to the first rendezvous location includes determining that the transportation vehicle unit is currently en route to the second rendezvous location or second destination location and that is determined to be currently located within a predefined allowable maximum travel time away from reaching the first rendezvous location.

14. The method of claim 3, wherein the determining that the transportation vehicle unit is able to travel to the first rendezvous location includes determining that travel to the first rendezvous location will not add more than a predefined amount of permitted additional distance for travel to the second destination location.

15. The method of claim 3, wherein the transportation vehicle unit is identified by being selected from two or more candidate transportation vehicle units, each of the two or more candidate transportation vehicle units currently en route to the second rendezvous location or the second destination location, and the two or more candidate transportation vehicle units having been ranked according to their suitability and efficiency for travel to the first rendezvous location.

16. The method of claim 3, wherein the transportation vehicle unit comprises a human driver, a robotic driver, or combinations thereof.

17. The method of claim 3, wherein the end users comprise human users, robotic users, or combinations thereof.

18. A transport computing device comprising a computer processor and signal-bearing non-transitory storage medium, bearing one or more computer-executable instructions, wherein the instructions configure the processor to perform operations comprising:
acquiring an identity of a transportation vehicle unit that is en route to a second location;

determining that the transportation vehicle unit is able to travel to a first location while the transportation vehicle unit is en route to the second location along a selected route; and directing the transportation vehicle unit to the first location in order to travel to the first location over a least a portion of the route.

19. A method for arranging for carpooling utilizing a computer program product that via a computer processor electronically conducts steps comprising:

acquiring an identity of a transportation vehicle unit that is en route to a second location;

determining that the transportation vehicle unit is able to travel to a first location while the transportation vehicle unit is en route to the second location along a selected route;

directing the transportation vehicle unit to the first location in order to travel to the first location over a least a portion of the route.

* * * * *